(12) United States Patent
Schnelle et al.

(10) Patent No.: US 6,233,592 B1
(45) Date of Patent: May 15, 2001

(54) SYSTEM FOR ELECTRONIC PUBLISHING

(75) Inventors: Christoph Schnelle; Abha Lessing; Peter Mariani, all of New South Wales (AU)

(73) Assignee: Time Base Pty Limited, New South Wales (AU)

( * ) Notice: Subject to any disclaimer, the term of this patent is extended or adjusted under 35 U.S.C. 154(b) by 0 days.

(21) Appl. No.: 09/108,999

(22) Filed: Jul. 1, 1998

Related U.S. Application Data

(63) Continuation of application No. PCT/AU98/00050, filed on Jan. 30, 1998.

(30) Foreign Application Priority Data

Jan. 31, 1997 (AU) .......................................... 04892

(51) Int. Cl.[7] .................................................. G06F 17/21
(52) U.S. Cl. ........................................... 707/513; 345/355
(58) Field of Search ................................... 707/513, 203, 707/100, 526; 345/327, 333, 348, 349, 355, 356

(56) References Cited

U.S. PATENT DOCUMENTS

| | | | |
|---|---|---|---|
| 4,558,413 | * | 12/1985 | Schmidt et al. ..................... 707/203 |
| 4,627,019 | * | 12/1986 | Ng ............................................ 707/8 |
| 4,714,992 | * | 12/1987 | Gladney et al. ..................... 707/206 |
| 4,853,843 | * | 8/1989 | Ecklund ............................... 707/203 |
| 4,875,159 | * | 10/1989 | Cary et al. ........................... 707/203 |
| 5,287,496 | | 2/1994 | Chen et al. .......................... 707/203 |
| 5,740,425 | * | 4/1998 | Povilus ................................ 707/100 |
| 5,835,087 | * | 11/1998 | Herz et al. ........................... 345/327 |
| 6,026,388 | * | 2/2000 | Liddy et al. .............................. 707/1 |

OTHER PUBLICATIONS

PCT/US96/17142 Jan. 5, 1997 WIPO International Publication No. WO 97/15890.
Adrienne Azaria "SGML: A Lifesaver in a Sea of Electronic Documents." Network World 11/50, Dec. 12, 1994.*

* cited by examiner

*Primary Examiner*—Stephen S. Hong
(74) *Attorney, Agent, or Firm*—Clifford W. Browning; Woodard Emhardt Naughton Moriarty & McNett

(57) ABSTRACT

The present invention relates to a method, apparatus and system for publishing electronic information. The system includes a plurality of predefined portions of data with each predefined portion being encoded with at least one linking means. For each predefined portion, each predefined portion is stored and, where such predefined portion has been modified, each such modified predefined portion is stored. Further, the system has a plurality of attributes. Each attribute is a point on an axis of a multidimensional space for organizing the data. The plurality of predefined portions of the data may be encoded using Standard Generalized Markup Language (SGML) OR XML. Still further, the data is encoded using one or more Document Type Definitions (DTD) or Style Sheet Mechanisms (SSM).

58 Claims, 15 Drawing Sheets

SYSTEM FOR ELECTRONIC PUBLISHING

CROSS-REFERENCE TO RELATED APPLICATION

The present application is a continuation of International Patent Application No. PCT/AU98/00050 filed Jan. 30, 1998 designating the United States of America.

FIELD OF THE INVENTION

The present invention relates to an electronic publishing system, and in particular to an electronic publishing system for the delivery of information which is not limited as to storage space and is not governed by predetermined pathways.

BACKGROUND

Conventionally, information is published in document form as a printed publication, or in electronic form but again using the document or book metaphor. In the past, the concept of a "multidimensional space" in electronic publishing has been intuitively understood (that is, instinctively desired). However, a comprehensive display, discussion or treatment has been rejected by publishers and information providers as too difficult to develop and manage. Instead, publishers and information providers have managed large amounts of data:

(1) by limiting the size or coverage of the information space; and (2) by setting or predetermining the path through that information space.

The effect of this is clearest when the dimension of time is considered. The conventional approach to information storage and publishing is centred on the notion that information is either "current information" (ie, present day) or "historical information" (ie, the day before the present day and all days prior to that). Thus, information is traditionally retained (stored) and/or published (sold) as either current or historical information.

The effect of this has been to leave the end user with a collection of non-integrated repositories and many additional tasks to do before the information is useful to them. For example, the end user is required to:

(1) make most of their own connections between related pieces of information;

(2) do their own analysis of the type and subject of information they require or are seeking; and (3) find information appropriate to the point in, or period of, time with which they are concerned.

To illustrate the disadvantages of conventional publishing systems, an example of using such conventional techniques and publishing systems to research information is provided. If a person were interested in information regarding the powers of the Secretary under Australian legislation with respect to couples in a family relationship, when and how the Secretary is restricted, and what did the relevant legislation provide prior to that, the person would refer to relevant legal information, which is the Social Security legislation of the Commonwealth of Australia. The relevant provisions are set forth in Table A under the heading "Example Research". This would be determined by the end user's own knowledge of the broad subject and/or reference to secondary material.

The relevant legislative provision is Section 4, which in conventional electronic legal publishing systems might be found by looking for words or phrases such as "family", "family relationships", and "family relationships" AND "social security", where AND is a logical operator.

Once the above is established, it can be seen from the information found that Section 4 of the Social Security Act, as at 9/8/96, has been amended ten times (see Table A: A1. AMENDMENTS TO SECTION AT 9/8/96.)

There is however nothing in the current Commonwealth Government Reprint, in either the electronic or print versions (see heading EXAMPLE RESEARCH of Table A), that allows the end user to see the text of those amendments or what part(s) of Section 4 were changed by them.

Thus, unless the end user is prepared to refer to many statute books, reading each piece of text against another, the end user is not able to see easily or reliably what section 4 looked like before it was amended by any one of a number of prior amending Acts. However, if the end user has a library complete enough to provide access to the prior amending Acts, the person would eventually determine that Act No 105 of 1995 is the relevant amending Act.

Further, it should be noted that, while the Commonwealth Government Reprint indicates that the Social Security Act was amended by Act No 105 of 1995, it does not indicate what section or schedule in Act No 105 of 1995 actually amended Section 4. This again requires the end user to have access to the amending Acts themselves and renders the information provided by the Reprint as to commencement (see Table A: B. COMMENCEMENT INFORMATION FOR ACT NO 105 OF 1995 CONTAINED IN REPRINT) of little utility without a copy of the amending Act No 105 of 1995 from which it can be established that Section 14 of Act No 105 amended Section 4 of the Social Security Act with respect to powers of the Commissioner (see Table A: D. AMENDING ACT 1995 NO 105 AMENDING SECTION 14).

Eventually, the required information can be found but several pieces of information need to be searched by the end user. This is an arduous, time consuming, tedious and complex task that must be manually repeated for each research topic and if the same search is to be carried out again.

Conventional publishing systems, including electronic publishing systems that typically are speeded-up, paper-based publishing systems, are based on a book-metaphor. The smallest piece of information used by such conventional publishing systems is either (I) an Act or Regulation (in the case of reprints, a whole Act or Regulation is printed again), or (II) a word. Typically, conventional publishing systems choose a word as the smallest piece when legislation is amended. To track such amendments, a lawyer or their assistant may actually use scissors to cut and paste pieces of legislation or the publisher cuts and pastes each word electronically. If a whole Act or Regulation is tracked as in (I) above, it is necessary to store each new version of an Act or Regulation in its entirety.

This has a number of consequences, including:

a) only a few versions of each Act or Regulation are stored;

b) the end user rarely searches more than one reprint at a time;

c) it is very difficult to know which particular section or schedule has changed, to track how that particular section or schedule has changed, to find the relevant section of the Amending Act or Regulation that effected the section or schedule as shown in the reprint;

d) if multiple changes have occurred on a particular section or schedule between reprints, the latest version of the section or schedule can only be seen in the reprint;

e) issues like commencement of the latest version of a particular section or schedule and so-called "Application, Saving or Transitional Provisions" are difficult to recreate; and f) it is difficult to come to a full understanding of the legislation by means of the reprints.

If every single word is tracked, as in (II) above, a level of complexity results that is difficult to administer and maintain without a large number of errors. For example, some legislative sections and schedules are amended several times annually.

Table 1 provides an example where Section 6 of the Income Tax Assessment Act has been amended 70 times:

TABLE 1

| S. 6 | am. No. 88, 1936; No. 30, 1939; No. 50, 1942; No. 3, 1944; No. 6, 1946; No. 44, 1948; No. 48, 1950; No. 1, 1953; No. 65, 1957; No. 55, 1958; No. 85, 1959; Nos. 18 and 108, 1969; No. 17, 1961; No. 69, 1963; No. 110, 1964; No. 103, 1965; No. 85, 1967; Nos. 4, 60 and 87, 1968; No. 93, 1969; No. 54, 1971; Nos. 51 and 164, 1973; No. 216, 1973 (as am. by No. 20, 1974); No. 126, 1974; Nos. 80 and 117, 1975; Nos. 50, 143 and 205, 1976; Nos. 87 and 172, 1978; No 27, 1979; No. 24, 1980; Nos. 108 and 154, 1981; No. 103, 1983; Nos. 47 and 123, 1984; No. 168, 1985; Nos. 41, 48, 52 and 154, 1986; No. 138, 1987; Nos. 73, 97, 105 and 107, 1989; Nos. 20, 35 and 135, 1990; Nos. 4, 5, 100 and 216, 1991; Nos. 80, 98 and 224, 1992; Nos. 17, 18, 57 and 82, 1993; Nos. 138 and 181, 1994; Nos. 5 and 169, 1995 |
|---|---|

It is both difficult and impractical to store the complete amendment history of every word and phrase within section 6. Trying to track all changes on such a detailed level leads to unmanageable complexity.

Largely, the split between historical and present information has come about because of the publishing and information industry's own development, and not because such is the desired or best way to manage information. Thus, a need clearly exists for an electronic publishing system that can overcome one or more of the disadvantages of conventional techniques and systems.

SUMMARY OF THE INVENTION

In accordance with a first aspect of the invention, there is provided a system for publishing electronic information, comprising:

a plurality of predefined portions of data with each predefined portion being encoded with at least one linking means, and, for each predefined portion, the each predefined portion is stored and, where such predefined portion has been modified, each such modified predefined portion is stored; and a plurality of attributes, each attribute being a point on an axis of a multidimensional space for organising the data.

In accordance with a second aspect of the invention, there is provided a recording medium for publishing electronic information, comprising:

a plurality of predefined portions of data with each predefined portion being encoded with at least one linking means, and, for each predefined portion, the each predefined portion is stored and, where such predefined portion has been modified, each such modified predefined portion is stored; and a plurality of attributes, each attribute being a point on an axis of a multidimensional space for organising the data.

In accordance with a third aspect of the invention, there is provided a method for publishing electronic information, comprising:

providing a plurality of predefined portions of data with each predefined portion being encoded with at least one linking means, and, for each predefined portion, the each predefined portion is stored and, where such predefined portion has been modified, each such modified predefined portion is stored; and providing a plurality of attributes, each attribute being a point on an axis of a multidimensional space for organising the data.

BRIEF DESCRIPTION OF THE INVENTION

A small number of embodiments of the invention are described with reference to the drawings, in which.

DETAILED DESCRIPTION

Figure 1:
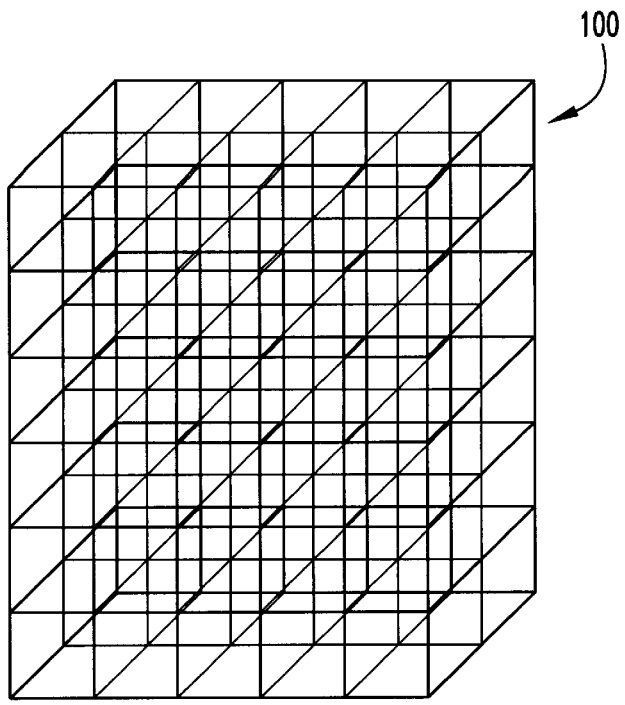
FIG. 1 illustrates a grid of a multidimensional space according to the first embodiment.

The present invention is directed towards a system of electronic publishing that can overcome the disadvantages of conventional information publishing, both in print and electronic form. The present invention reduces, if not eliminates, end user problems with conventional information publishing including:

(1) the connectivity between related pieces of information;

(2) analysis of the type and subject of information; and (3) finding information appropriate to the point in time with which they are concerned.

Overview of Embodiments

The embodiments of the invention provide an entirely new way of delivering, storing and publishing information. The embodiments allow publishers to add an arbitrary number of logical connections to a set of data, and even permit the publisher to display the precise evolution of that data set over time. This can be done without getting bogged down in the complexity of the logical connections and without limit as to storage space.

Frequently, people desire to have more "information" available. However, with the advent of the Internet and new technology, many people suffer from information overload. The embodiments of the invention provide an easy and effective way to navigate large complex volumes of information.

Conventionally, information may only contain very rudimentary (i.e., haphazard hyperlinks) or non existent logical connections. Thus, conventional techniques of investigating how a set of data has evolved and changed over time can only be done for small data sets and are very expensive.

However, with the embodiments of the invention, it is possible to list all logical connections within a data set no matter how complex those connections may be. The embodiments of the invention and the principles of those embodiments described hereinafter can be applied to many different types of information such as medical, scientific, pharmaceutical, etc. For ease of description, however, the embodiments are set forth in relation to legal information.

Conventionally, legislation is often purchased in two ways: (1) The individual Numbered Acts and Regulations that give each piece of legislation as it is passed; and (2) Consolidated legislation that provides the latest consolidated version.

In the embodiments of the invention, legislation is stored using every version of each Act or Regulation. The end user can search every version of any section, schedule, or provision. For example, the required version of a section is immediately available as is the opportunity to view every preceeding and subsequent version of the same section. Also, links are available to any relevant amending legislation commencing that change, as well as the one that repealed it. Relevant Application, Saving or Transitional Provisions can also be easily accessed.

In this manner, it is possible to come to a full understanding of the legislation just by looking at the data provided through the embodiments of the invention. In contrast, using conventional techniques, it would have been impossible or very hard, expensive and time consuming to do so.

Using conventional means, a person wishing to view a particular section of a particular Act (e.g., the Income Tax Assessment Act) as of a particular date (e.g., Jun. 30, 1996), a significant amount of work would be required to do so. The end user would need to track all Amendments since the last reprint of the legislation, which may take a long time and involve referring to many volumes. This may even possibly involve using scissors and paste to actually cut and replace words. Even to figure out which Acts amended a particular section and to trace those commencement dates can be difficult, time consuming and trying. However, a piece of research that may have taken an experienced researcher days or even weeks can be accomplished in minutes using the embodiments of the invention.

The ability to move through information in time is outlined above. The embodiments of the invention also give additional flexibility and scope to the end user. Further dimensions and interconnections may include: type, jurisdiction, subject, depth. Some examples are:

1. Doing research on the subject evidence at depth confession for types Acts and Case for time period 12 months.
2. Doing research on type cases within jurisdictions NSW and Queensland subject murder and depth statutes dealing with subject.

The ability to associate the relevance and interconnection contained within the information is highly advantageous to the end user.

A key aspect of the embodiments of the invention in successfully providing a multi-dimensional repository of information has been in deciding the "optimum storage unit". In the past publishers have chosen to either store new versions of the entire Act (too big) or new versions of each and every change, in a method similar to red lining (too complex). The first aspect of the invention was to analysis the data and choose to store every version of every section or provision level of legislation.

Structured Generalised Markup Language (SGML) is a recognised way to mark up data. SGML allows logical structure to be added to a document (unlike HTML and word processors which only allow the addition of visual content). SGML alone is not enough to deal with text-based data that contains a highly complex logical structure. The complexity increases exponentially until the complexity cannot be managed any more. Large legal publishers have stored their data in SGML, but those legal publishers that are successful in dealing with their SGML-based data have purposely kept their markup as simple as possible. When such publishers have tried to encode a complex structure on text-based data their costs of creating the data set and maintaining the data set simply went through the roof, and it became impossible to maintain the integrity of the data set.

In contrast, the embodiments of the invention allow SGML data to be encoded with a much more complex structure whilst remaining manageable. Alternatively, Extensible Markup Language (XML) may be used. For example, with SGML it is possible to encode all 71 versions of Section 6 of the Australian Federal Income Tax Assessment Act in a single file (that Act has about 6,000 sections) but this would be utterly unmanageable when applied to the 6,000 other sections of the Income Tax Assessment Act. It becomes even more unmanageable if anybody would try to use the above method on all the sections within all other Acts and Regulations of the Commonwealth. A significant problem with using SGML, even well executed SGML, is that it is possible to quickly get bogged down in unmanageable levels of complexity. The embodiments of the invention have overcome these problems.

Another key aspect of the invention is the use of database technologies in the management of the SGML encoded techniques. Database technology provides a large number of ready tools to deal with complex structured data. The embodiments combine these technologies (SGML, XML and database technologies) in an advantageous manner.

In the past, traditional publishers have been limited by the size and speed of available storage systems. Only a limited amount can be reproduced in paper and until recently hard disk costs prohibited the storing of multiple gigabytes of data, for both publishers and clients alike.

The embodiments of the invention have the ability to look at situations from a new and uptodate view point and therefore come up with innovative conclusions that can be radically different to processes employed in the past.

Thus, the embodiments of the invention provide a new computer publishing system that changes the availability of electronic information from being merely "speeded up paper" to being electronic information taking advantage of new electronic media by providing users with enhanced functionality of data retrieval and manipulation. The information included in the electronic format is of a publishable standard, meets cost constraints and is able to be accessed under any combination of dimensions from the multi-dimensional space (Acts, cases, time, jurisdiction, subject). The publishing system facilitates continual updates to the data contained in the databases, without any adverse effects on the operating capabilities that make the publishing system unique. Due to the extra functionality, the publishing system is also designed in such a way that it can still be made available in as many different electronic media as possible, and all search functions are able to operate in a time-efficient manner.

The embodiments of the invention organize, process and present information in a way that is significantly different than conventional structures, processes and presentation. They provide an information storage and publishing system, and in particular, an information storage and publishing system that stores and manages large and comprehensive amounts of information (eg, legal information).

Publication data, being preferably legal information, is encoded using Standard Generalized Markup Language (SGML) or Extensible Markup Language (XML) which adds codes to the publication data and provides functionality to the data. The publication data is processed as a plurality of predefined portions, which in the case of legislation is preferably at the section, schedule level, or provision level. A hierarchy of divisions of the legislation may be implemented. For each of the predefined portions, the system stores a copy of the predefined portion and a modified predefined portion in the first database whenever it is changed. A second (relational) database is preferably provided that comprises plural attributes for managing the information of the first database, with each attribute being a point on an axis of a multidimensional space for organising the data for publication. Alternatively, a single repository of information may be practised as described with reference to the second embodiment.

The system enables the first database to be searched for one of the predefined portions of the publication data using attributes of the second database by following one or more pathways through the multidimensional space. The plurality of attributes are connected to by the plurality of links. Once the desired predefined portion is located, the predefined portions can be retrieved using the attributes to define a point in the multidimensional space.

Preferably, the system implements, inter alia, time-based legislation in which sections of legislation that have been amended are not discarded and replaced with the current provision only as of the publication date. Instead, each version of an amended section is retained in the first database. Thus, the systems according to the embodiments of the invention are particularly advantageous in that legal information is published so that a user can obtain such sections or provisions at a particular time point.

The embodiments advantageously divide information into "suitably" small pieces (or blocks) of text, each of which is a predefined portion of data, and add to each piece of text, either expressly or implicitly, a number of attributes (characteristics or descriptors). The suitability as to size of text pieces is determined by an analysis of the information and its naturally occurring structure based on knowledge of how the information is used and consumed by the end user.

This makes it possible to locate each piece or block of text at a particular point in a "multidimensional space" using as coordinates the attributes added to the piece or block of text. Multidimensional space refers to an area not having boundaries and that is capable of, or involves, more than three dimensions.

FIG. 1 illustrates a multi-dimensional space 100 as used in embodiments of the invention. The multidimensional space is represented by a layered grid. The diagram represents axes or pathways as vertical and horizontal lines; in reality (in the case of more than two dimensions), they are at all angles and inclines.

Figure 2:
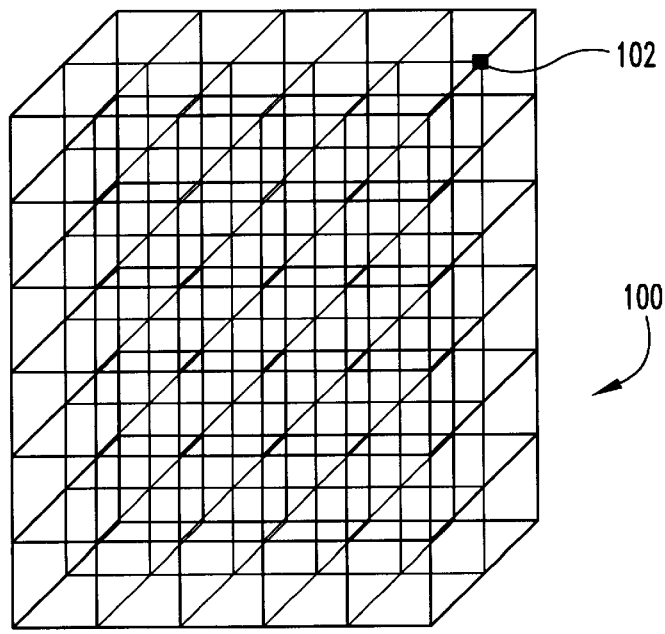
FIG. 2 illustrates the effect of the various axes.

Referring to FIG. 2, the ability to locate (assign) or map each node 102 (or key intersection point of the various axes or pathways) is a significant functional aspect of the embodiments of the invention. This mapping is explained further hereinafter. With such coordinates 102 known (located or mapped), it is possible to move easily between points in the multidimensional space 100.

Figure 3:
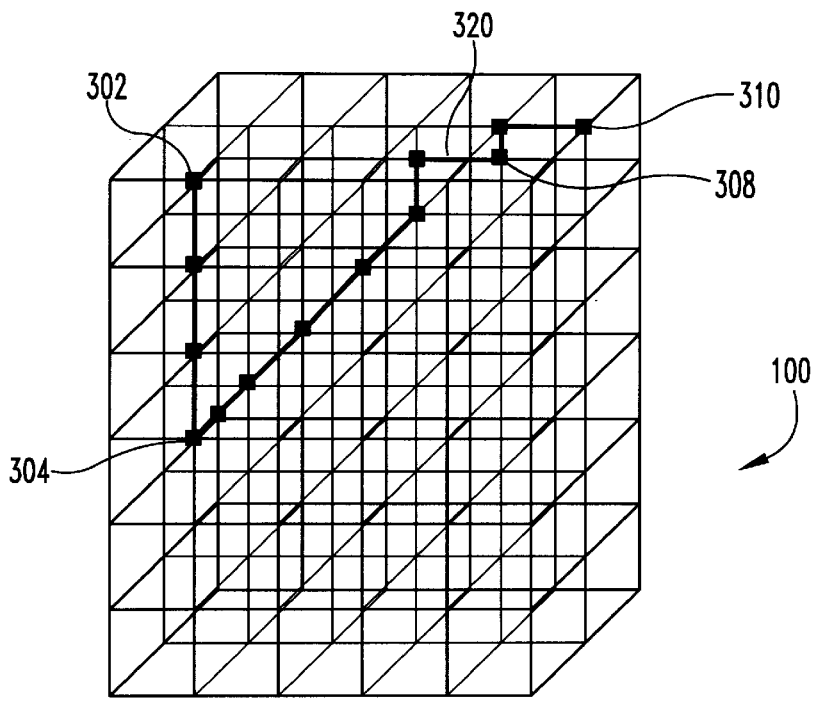
FIG. 3 illustrates the mapping of various axis intersection points, or nodes, that is used to organize, present, and find information (present and past) according to the first embodiment.

The effect of mapping nodes as shown in FIG. 3 is that a course 320 through the information represented in the three-dimensional space 100 can be easily plotted. The user begins the course 320 at node 302 and progresses vertically downward to the fourth node 304. Further, the plotted course 320 is flexible to the extent of the relationships a user chooses to follow or seek out.

First Embodiment

A first embodiment of the invention provides information management in the multidimensional space and allows movement along different axes or "pathways":

location of the information (its address);

type of information (its genesis);

jurisdiction (its class);

subject (its content description);

depth (extent of content); and time (the point in time at which the information is viewed).

In the first embodiment, coding of information or data for publication is based on SGML or XML and one or more specifically developed Document Type Definitions (DTD), which preferably is specifically designed for legal information. Alternatively, in the case of XML, a Style Sheet Mechanism (SSM) may be used. This coding can then be related back to information retained in a specifically developed database that enables the code information to be managed and updated. For a detailed description of this aspect of the invention, reference is made to Table C. The DTDs according to the first embodiment are set forth in detail in Table B. A DTD is used to define the structure of publication data, preferably being legislation, down to a comprehensive level. This is done by using information coded in conjunction with any one of a number of off-the-shelf, free-text retrieval software packages (eg, Folio Views or Dynatext) to deliver the information to the end user.

A DTD describes the markup for the SGML publication data, or "repository", which may contain legislation, case law, journal articles and other types of material that are stored in computer files. The files contain publication data in text form and the markup, which is extra information about the text included with the text. An example of a markup is '<BD+>' which indicates that "the data from this point on is bold". A further example is '<SECTION ID="CWACT-19950104-SEC-1" LBL="1">'. This markup indicates that: the data from this point on is part of a section of legislation; the section has an identifier of CWACT-19950104-SEC-1; and the section has a label of "1".

There are a number of different ways to add markup to data. The first embodiment adds markup to data using SGML. Alternatively, XML may be used. Still further, in the case of XML being used, an SSM may be used. Even within SGML, there are many ways to add markup to text. Each particular way of adding markup within SGML is described by using a DTD. In the first embodiment, the data for publication is marked up using a number of different DTDs. In particular, the DTDs are used to mark up the logical structure of the legislation, case law or journal articles. Significant amounts of information about the data for publication is stored in the markup. For example, the markup '<SECTION ID="CWACT-19950104-SEC-1" LBL="1">' provides the following information: the data is a piece of Commonwealth of Australia legislation (indicated by 'CW' at the beginning of the string); the section is part of an Act ('ACT' after 'CW') and not a regulation; the act is Act No. 104 of 1995 ('19950104' in the middle of the string), the data is a Section ('SEC') within the Act; and it is Section 1 ('1' at the end).

The preparation of such DTDs necessitates that the author has a sound knowledge of the data that will be marked up using the DTD. It is especially important that the underlying structure of the data to be marked up using the DTD be understood. The process of becoming acquainted with the structure of the data to be marked up is referred to hereinafter as "content analysis".

In particular, the section-level or schedule-level portion of legislation is used in the first embodiment. That is, the section-level portion is preferably the predefined portion of the publication data, which is the smallest piece of information to be tracked. This is unlike conventional publishing systems. For example, with reference to Table 1, the first embodiment stores every version of Section 6. In this manner, complexity (tracking every word) is reduced by increasing storage. However, unlike example (I) of conventional publishing systems, the first embodiment does not lose any pertinent information:

a) every version of each Act or Regulation is stored;

b) the end user can search every version of any section or schedule at the same time;

c) it is easy to know which particular section or schedule has changed, to track how that particular section or schedule has changed, and to find the relevant section of the Amending Act or Regulation that affected the section or schedule;

d) if multiple changes have occurred on a particular section or schedule, every version of the section or schedule can be seen;

e) issues like commencement of the latest version of a particular section or schedule and so-called "Application, Saving or Transitional Provisions" can easily be recreated;

f) it is possible to come to a full understanding of the legislation just by looking at the data provided through the first embodiment.

A further advantage of tracking every version of each section or schedule is that it is possible to store some of the information, not in the markup, but in a database, as noted hereinbefore. This simplifies the updating process.

While SGML is a powerful way of storing information, it is not a retrieval medium. Therefore, the stored information needs to be converted into a format that the end user of the information can access. The first embodiment uses an electronic format for retrieval. For this electronic retrieval, a software application called 'high-end text retrieval software' is used. Examples of high-end, text-retrieval software applications include Folio Views and Dynatext. In the first embodiment, Folio Views is used.

Folio Views has its own proprietary markup language, which is not part of the SGML family. A complete guide to the Folio Views markup language is provided in the text *Folio Views Infobase Production Kit Utilities Manual*, Version 3.1, Provo, Utah: Folio Corporation (Jun. 1, 1994). Storing the data for publication in SGML allows other retrieval software applications besides Folio Views to be used.

In the first embodiment, a process is implemented to convert the SGML marked-up data into the format used by the retrieval software application. The example given for Folio Views hereinafter is but one example of the process involved. The conversion program basically maps the SGML markup to Folio Views markup. For example, for the SGML markup '<SECTION ID="CWACT-19950104-SEC-1" LBL="1">', the conversion process marks all ID's substantively unchanged as Jump Destinations (JD's): '<JD:= "CWACT-19950104-SEC-1">'.

A Keying Guide for Australian Legislation Documents with instructions for the conversion process to Folio Views added is provided in Table D.

Movement through legal information can be as follows (the flexibility and scope is largely up to the end user):

(1) doing research on the subject of fences and boundaries at the depth fences that are hedges looking for types Acts and Regulations in jurisdictions NSW and Victoria for the time period last 20 years;

(2) doing research on the subject evidence at depth confession for types Acts and cases for time period last 12 months; or (3) doing research on type cases with jurisdictions NSW and Queensland, subject murder and depth statutes dealing with subject.

Figure 4:
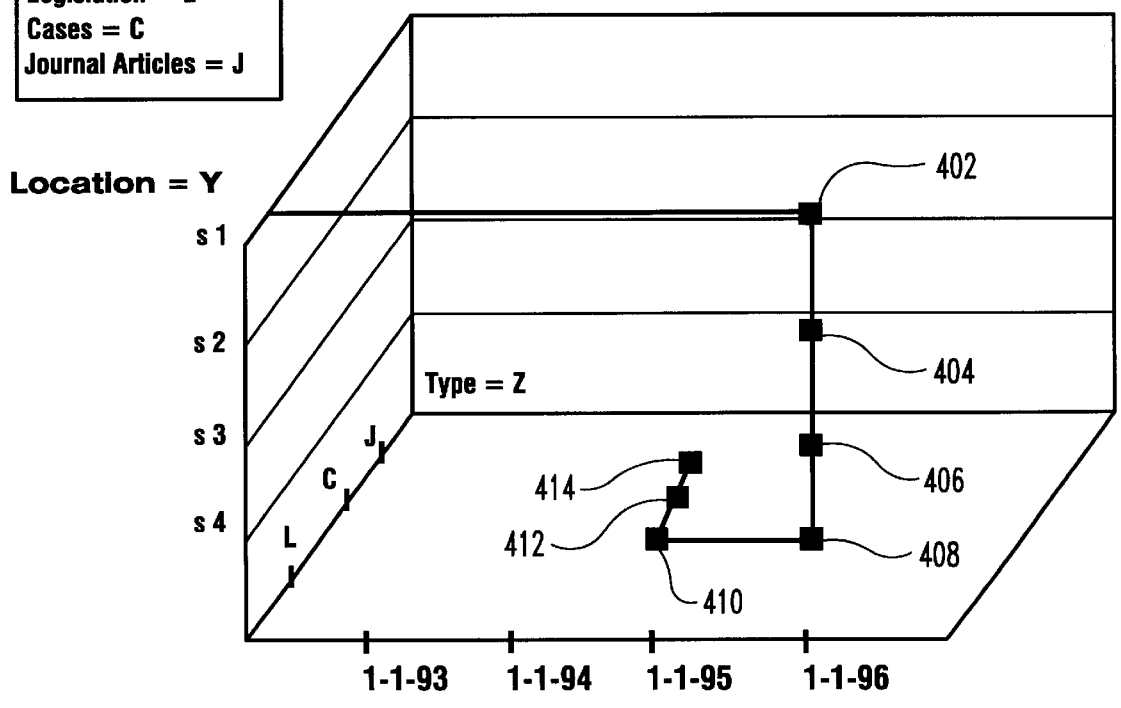
FIG. 4 illustrates the application of legal information to mapped nodes according to the first embodiment.

The application of legal information to mapped nodes is shown in FIG. 4. However, this is only one of numerous possible applications. Information from medical, technical and scientific areas are all open to the application of this invention. This diagram substitutes the technical terminology of FIG. 3 with legal terms to show the way information appears according to the first embodiment. Further, FIG. 4 provides an example of how legal information is navigated by an end user. The user may be seeking information on the following matters:

(1) Does NSW legislation on fences presently cover hedge rows between the boundary of a private property and a public road?

(2) If not, have such hedge rows ever come under NSW legislation?

(3) Are there any cases under current law or previous law?

(4) How have the cases been interpreted?

Some general assumptions are made about legal information for the purposes of this example. Broadly, legal information has two main primary sources: statute law (including subordinate legislation), and case law. There is also secondary information such as commentary which can be added to aid interpretation. Each of these sources is interconnected and relevant to the other in terms of both past and present information. This may also apply to future information in terms of bills or other forms of uncommenced legislation. It is the association of this relevance and interconnection that is advantageous to the end user.

In FIG. 4, the X-, Y-, and Z-axes indicate time (Time), the legislative provision (location), and type (eg, legislation=L, cases=C, and journal articles=J). To simplify the diagram, only three axes are illustrated, however, other axes may be included dependent upon the number of dimensions of the space. In the first embodiment, the multidimensional space also includes another three axes: jurisdiction=U, subject=V, and depth=W. Thus, the space according to the first embodiment has six dimensions. In the six-dimensional case, it is possible to move along each axis and at the points of intersection change direction, as well as find and/or follow new or additional information.

The end user begins at legislation (L) along the Z-axis, where the Fences and Boundaries Act is located and then selects Section 1 of legislation (indicated by L allowing the Z-axis) at node 402, as of Jan. 1, 1996. The user then follows a path in the legislation through nodes 404, 406 and 408 for Sections 2, 3 and 4, respectively, as of that same date (ie, the Y-axis), to find a definition of the term "fences". Node 408 contains Section 4 at Jan. 1, 1996 which contains the current definition of "fences". This would provide information in response to above query (1).

The user then selects Section 4 of the legislation as of Jan. 1, 1995, which in this case is an earlier version of the section prior to amendment, by moving to node 410 (along the X-axis). This provides information about the prior law for above query (2). The user can then move to other information on Section 4 as of Jan. 1, 1995 by going to nodes 412 and 414 for case and journal article information, respectively, along the Z-axis For example, a case on the earlier Section 4 might be identified at node 412 and articles on interpretation of Section 4 at node 414. The foregoing is only one possible route through the multidimensional space of information. Other more complicated and interrelated pathways involving axes U, V and W are possible. For example, the user can move to axis U (jurisdiction) and compare the definition in Section 4 of New South Wales with that in another jurisdiction (eg, Victoria).

Figure 6:
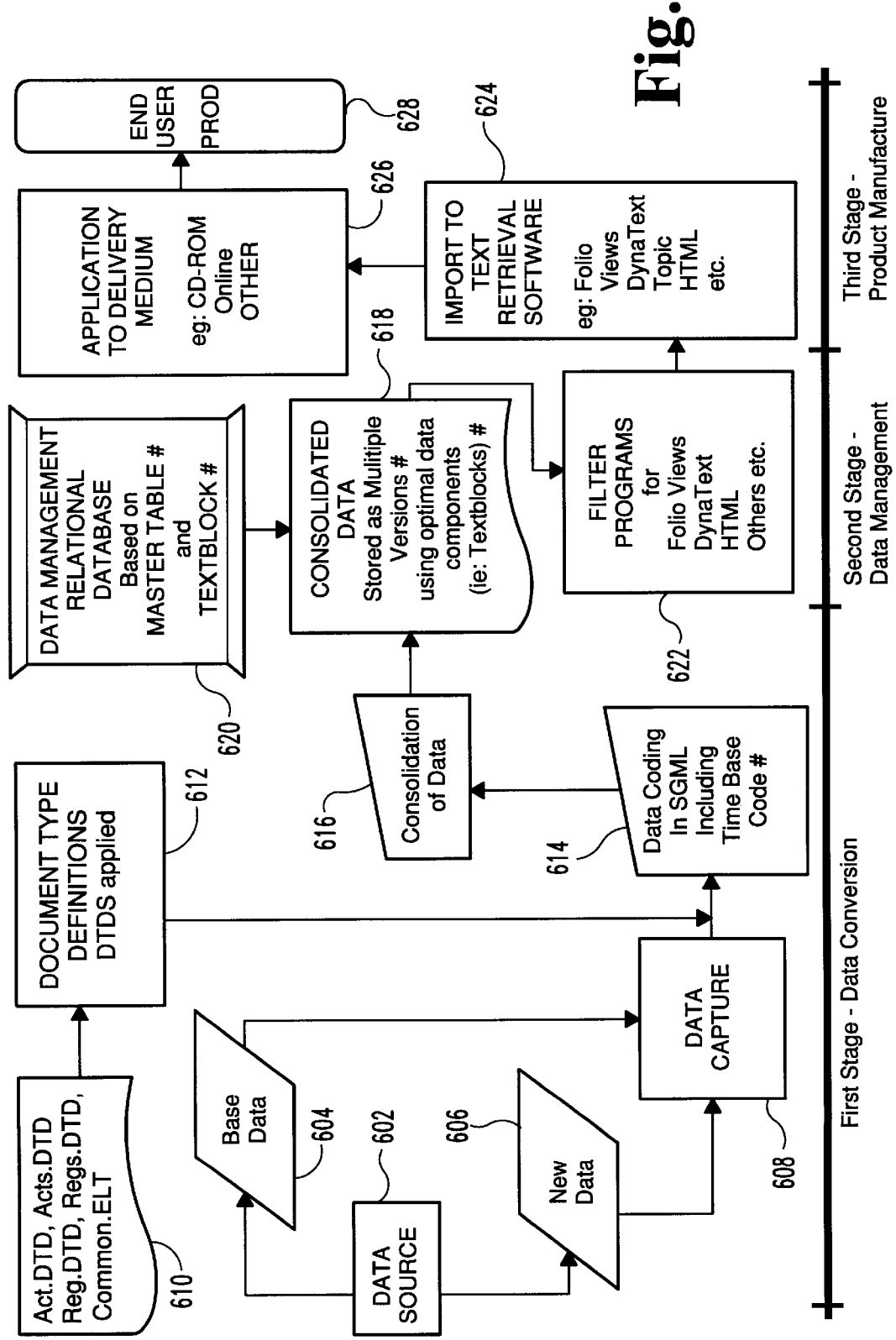
FIG. 6 is a flow diagram illustrating the method of electronic publishing according to the first embodiment.

FIG. 6 is a flow diagram illustrating the method of electronic publishing according to the first embodiment. A data source 602, preferably for legal information, is provided. In steps 604 and 606, base data and new data are input from the data source 602, respectively, and in step 608 the data is captured. The DTDs 610 are input to step 612. The DTDs 610 include Act.DTD, Acts.DTD, Reg.DTD, Regs.DTD, and Common.ELT, which are shown in detail in Table B. In step 612, the DTDs 610 are applied to the captured data from step 608. In step 614, the data is coded in SGML, including the Time Base Code. In step 616, the data is consolidated. As indicated in FIG. 6, steps/items 602 to 616 comprise the (first) data conversion stage.

A data management database 620 is provided to step 618. The database is based on a master table and a textblock table (see Table C for further detail). The output of step 616 is also provided to step 618. In step 618, the data is consolidated; the data is stored as multiple versions, if applicable, and uses the predefined portions of data (ie, textblocks). In step 622, a filter program(s) is applied to the consolidated data to convert the data from SGML to the relevant format for the retrieval software application, including Folio Views, DynaText, Topic, HTML, and the like. Steps/item 618 to 622 comprise the (second) data management stage.

The filtered data output by step 622 can then be provided to step 624. In step 624, the filter consolidated data is imported to the text retrieval software. In step 626, the data is provided to the delivery medium, which may include CD-ROM, DVD, magnetic tape, electronic online services, and other media. The output of this is the end user product 628. Steps/item 624 to 628 comprise the (third) product manufacture stage.

Figure 5:
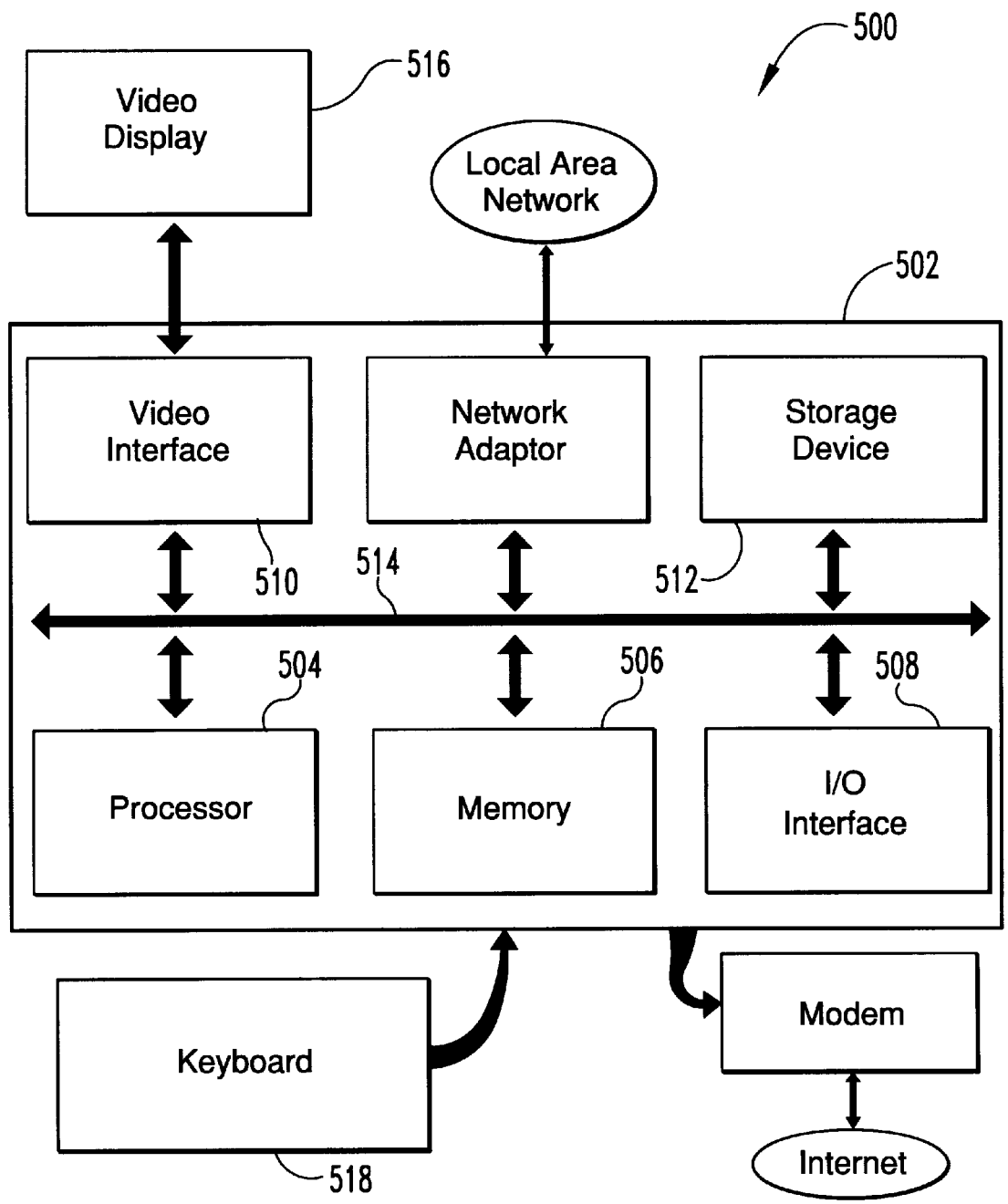
FIG. 5 is a block diagram illustrating a general purpose computer that can be used to implement the electronic publishing system according to the first embodiment.

The first embodiment is preferably practiced using a conventional general-purpose computer, such as the one shown in FIG. 5, wherein processes for providing and managing the information are carried out using software executing on the computer. In particular, the legislation database, the database and the DTD(s) may be stored after a filtering process on a CD-ROM used by the computer system, and the computer system is operated using Folio View. The computer system 500 includes a computer 502, a video display 516, and input devices 518. A number of output devices, including line printers, laser printers, plotters, and other reproduction devices, can be connected to the computer 502. Further, the computer system 500 can be connected to one or more other computers using an appropriate communication channel such as a modem communications path, a computer network, or the like.

The computer 502 consists of a central processing unit 504 (simply, processor hereinafter), an input/output interface 508, a video interface 510, a memory 506 which can include random access memory (RAM) and read-only memory (ROM), and one or more storage devices generally represented by a block 512 in FIG. 5. The storage device(s) 512 can consist of one or more of the following: a floppy disc, a hard disc drive, a magneto-optical disc drive, CD-ROM or any other of a number of non-volatile storage devices well known to those skilled in the art. Each of the components 504 to 512 is typically connected to one or more of the other devices via a bus 514 that in turn can consist of data, address, and control buses.

The video interface 510 is connected to the video display 516 and provides video signals from the computer 502 for display on the video display 516. User input to operate the computer 502 can be provided by one or more input devices. For example, a operator can use the keyboard 518 and/or a pointing device such as the mouse to provide input to the computer 502. Exemplary computers on which the embodiment can be practiced include Macintosh personal computers, Sun SparcStations, and IBM-PC/ATs and compatibles.

In an alternate embodiment of the invention, the computer system 500 can be connected in a networked environment by means of an appropriate communications channel. For example, a local area network could be accessed by means of an appropriate network adaptor (not shown) connected to the computer, or the Internet or an Intranet could be accessed by means of a modem connected to the I/O interface or an ISDN card connected to the computer 502 by the bus 514. In such a networked configuration, the electronic publishing system can be implemented partially on the user's computer 500 and a remote computer (not shown) coupled over the network. The legislation database, the database and the DTD(s) can be implemented on the remote computer and the computer system 500 can be operated using Folio View.

Figure 16:
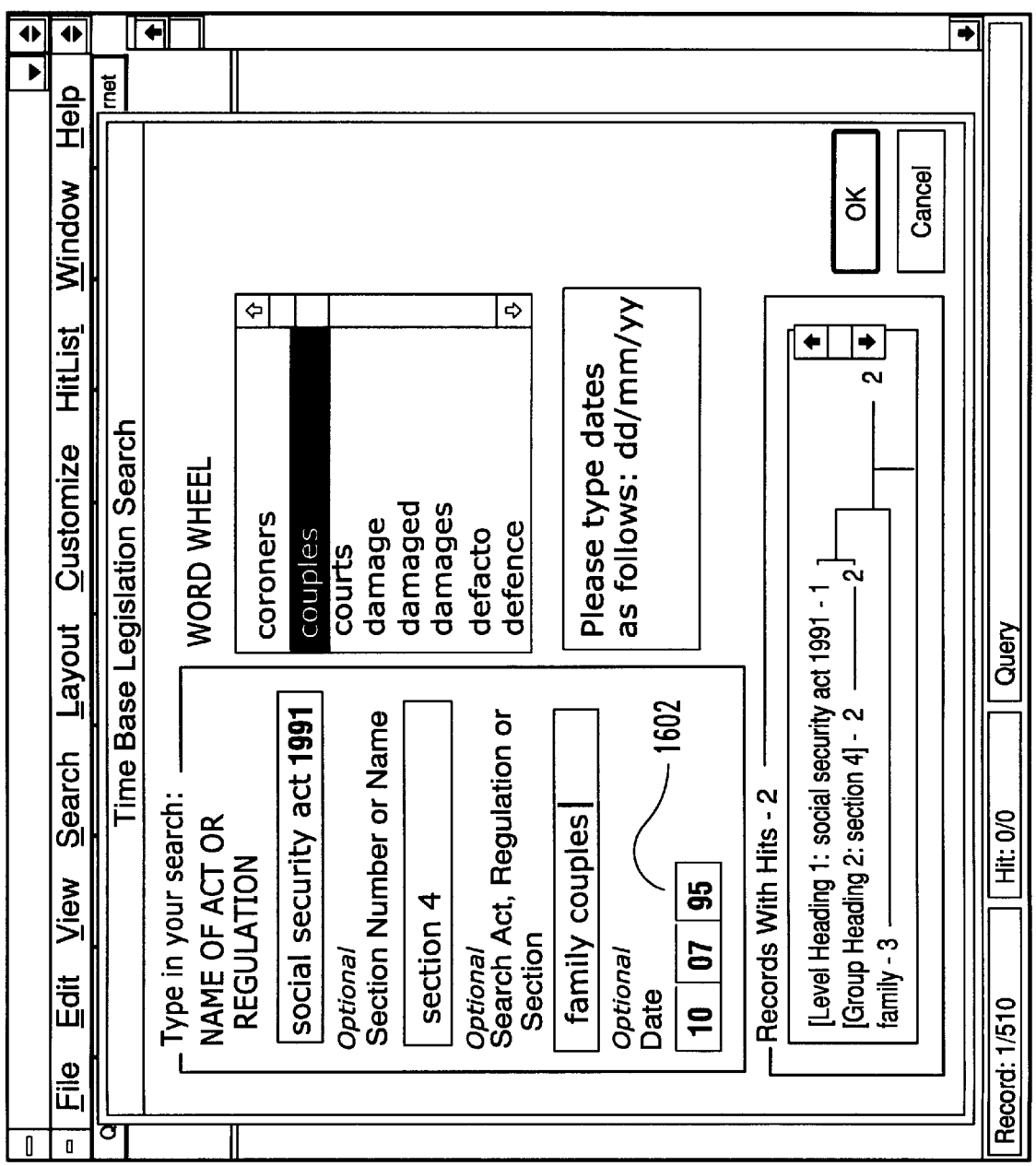
Figure 17:
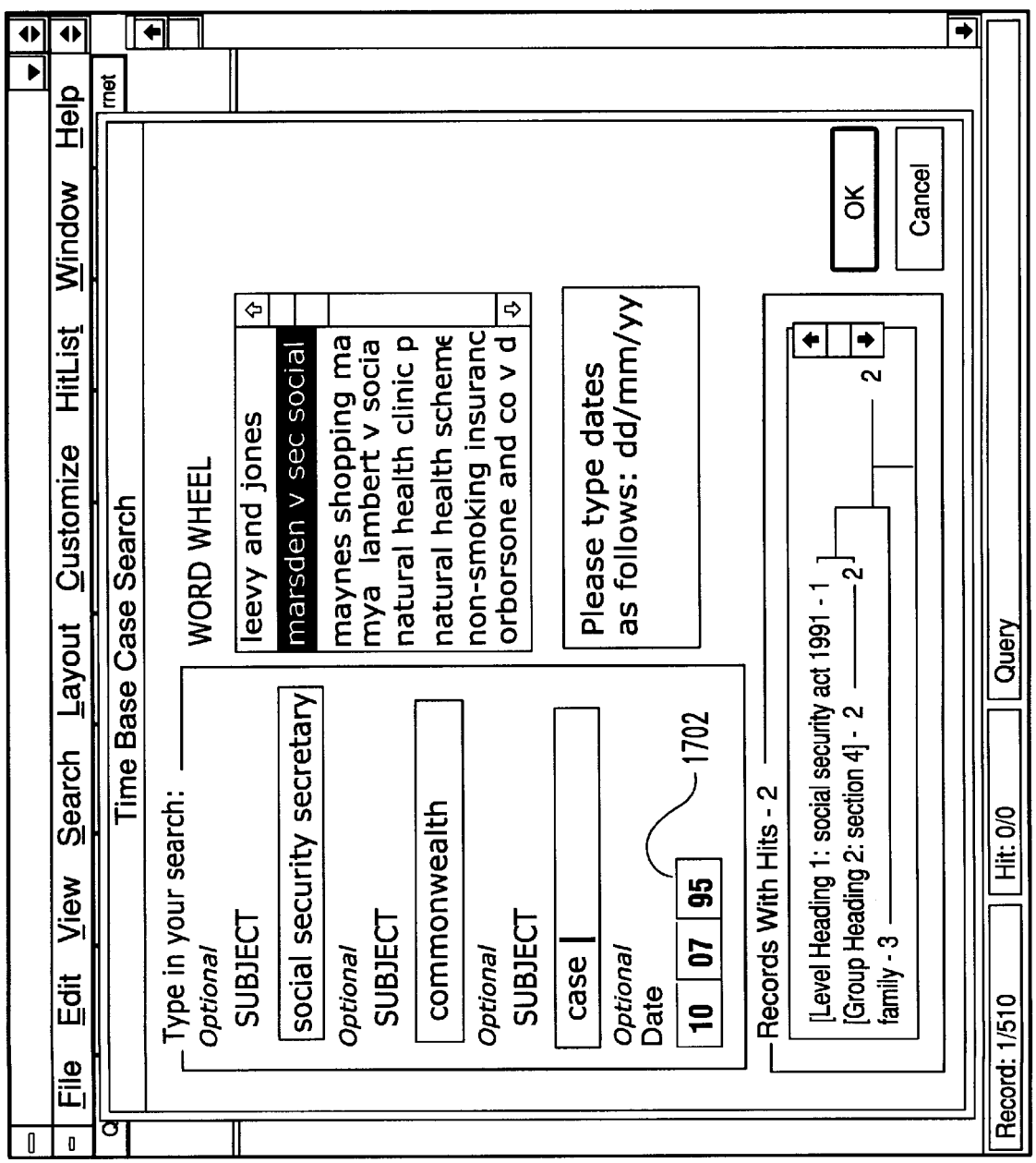

The operation of the first embodiment is described with reference to the screen shots shown in FIGS. 7 to 17. All screen shots are derived from the first embodiment which uses Folio Views as the retrieval software. Broadly, FIGS. 7 to 15 are screen shots illustrating navigation or movement around the information. FIGS. 16 and 17 are screen shots that show search capacities.

Figure 7:
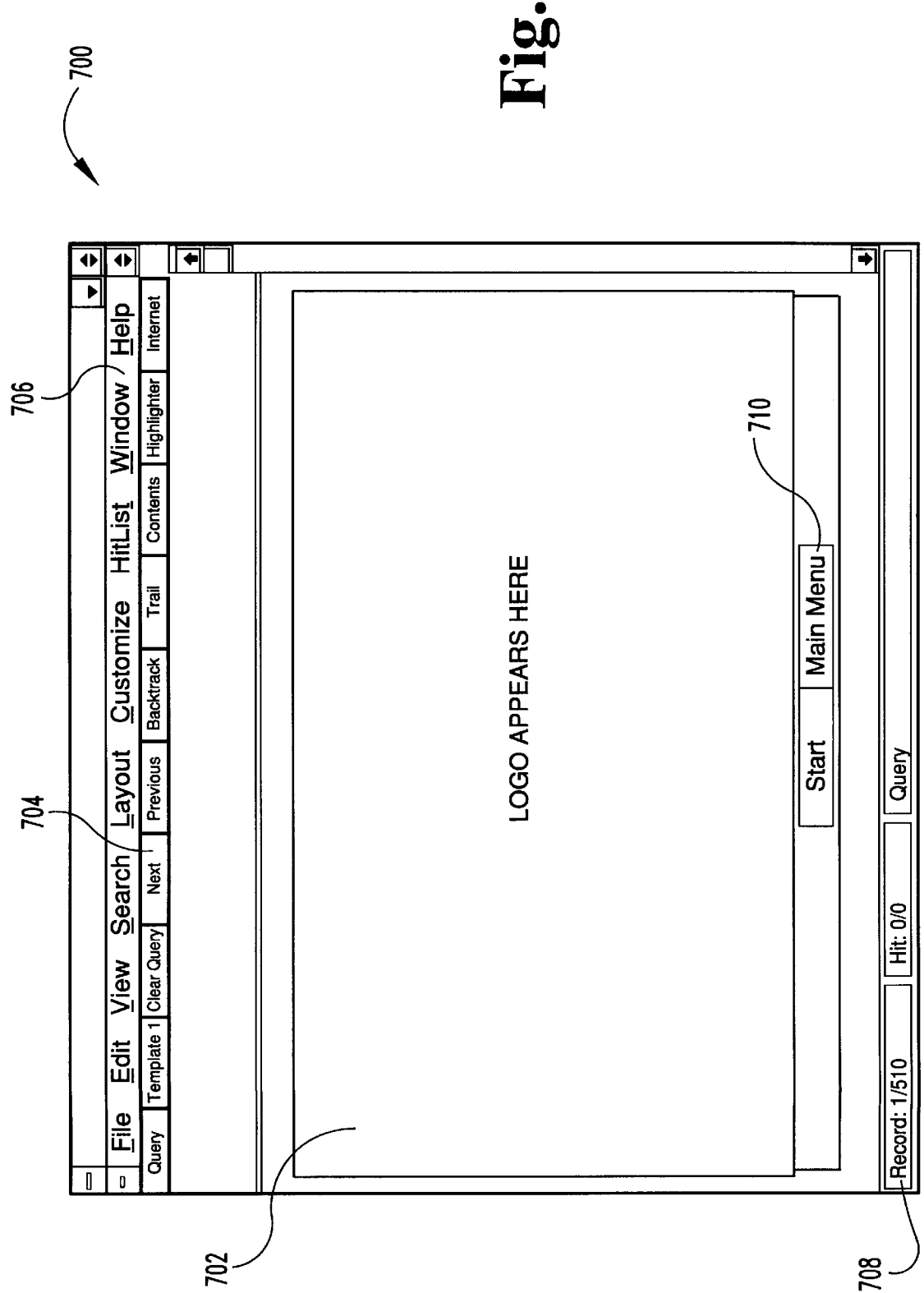
FIGS. 7 to 17 are screen shots illustrating operation of the first embodiment as a software application executing on a general purpose computer.

FIG. 7 shows the opening screen 700, which the end user sees when the program is started. The interface is a standard windows interface featuring drop menus that provide access to all functions. The functions include basic searching and customised search templates such as the ones shown in FIGS. 16 and 17 that allow users to exploit time-based and multidimensional searching.

The title screen 702 is presented when the process is commenced and is the first screen. A customisable toolbar 704 is provided for searching functions. Also, drop menus 706 are provided above the toolbar 704. In the lower portion of the screen 700 contains a status bar 708 showing information relevant to searching. The Start and Main menu buttons 710 in FIG. 7 are both navigational tools. The Start button takes a new user to information providing help on how to use the invention. The Main Menu button takes the end user to the menu shown in the second screen shot of FIG. 8.

Figure 8:
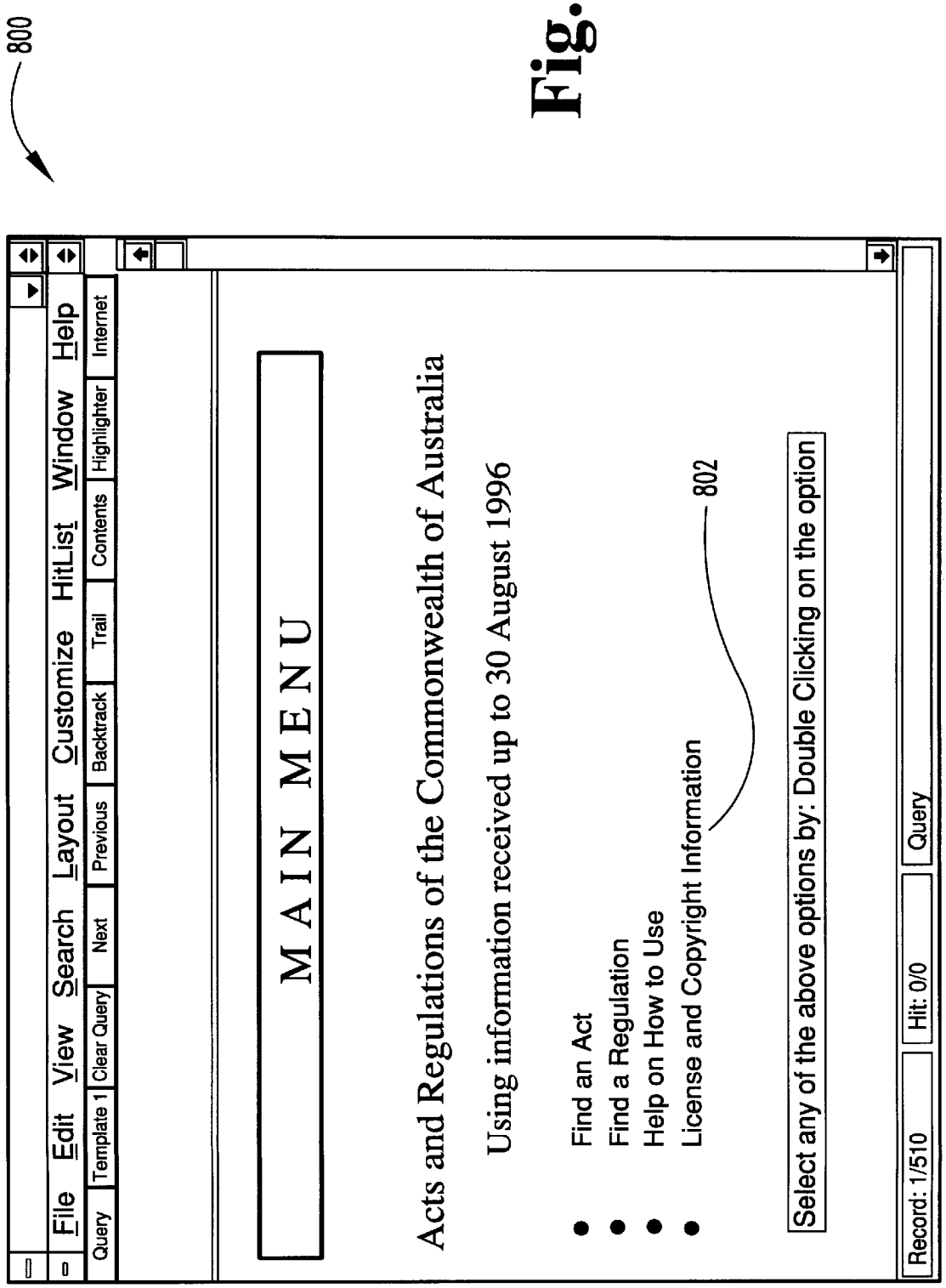

FIG. 8 shows a main selection menu 800. At this menu 800, the user can see the currency of the total information. The user is also able to make broad choices as to the type of information that the person might like to see. All items preceded by bullet points in the menu are jump links 802 which lead the user to further menus for the items selected. The jump links 802 also provide a uniform or consistent form of movement. Thus, if searching the Social Security Act, selecting the first jump link "Find an Act" takes the user to the next screen which would be the "Act Name Menu".

Figure 9:
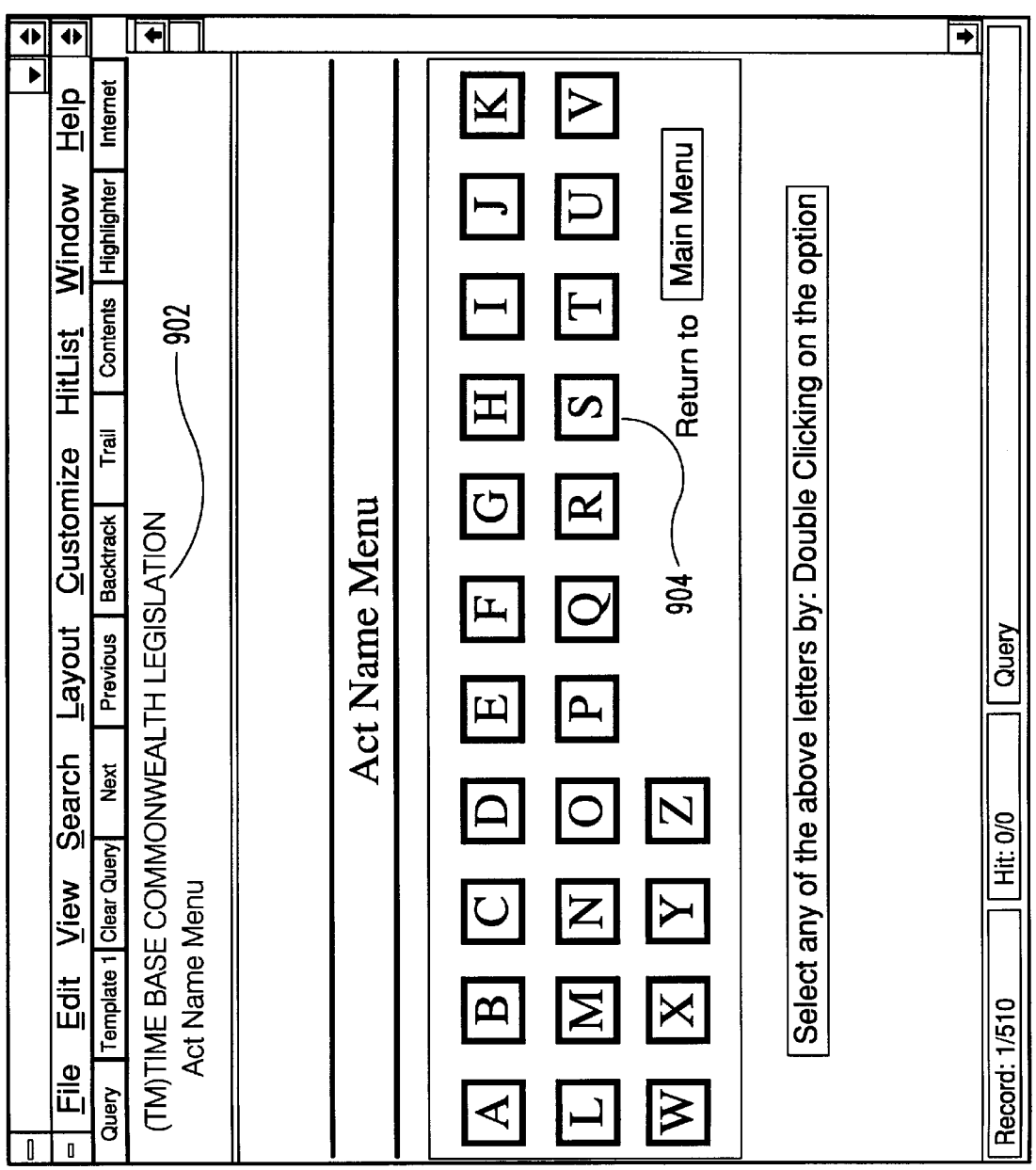

FIG. 9 shows the "Act Name Menu" screen 900. In this menu 900, all letter buttons are links 904 to Acts beginning with the letter selected. That is, the jump links 904 allow access to sub-menus for Acts with the corresponding selected letter. If "S" is clicked, this leads to the "Acts beginning with S" menu (see FIG. 10) where an entry linked to the most current version of the Social Security Act 1991 appears. A similar menu may be provided for Regulations. Further, locational information 902 is provided in the upper portion of the screen 900.

Figure 10:
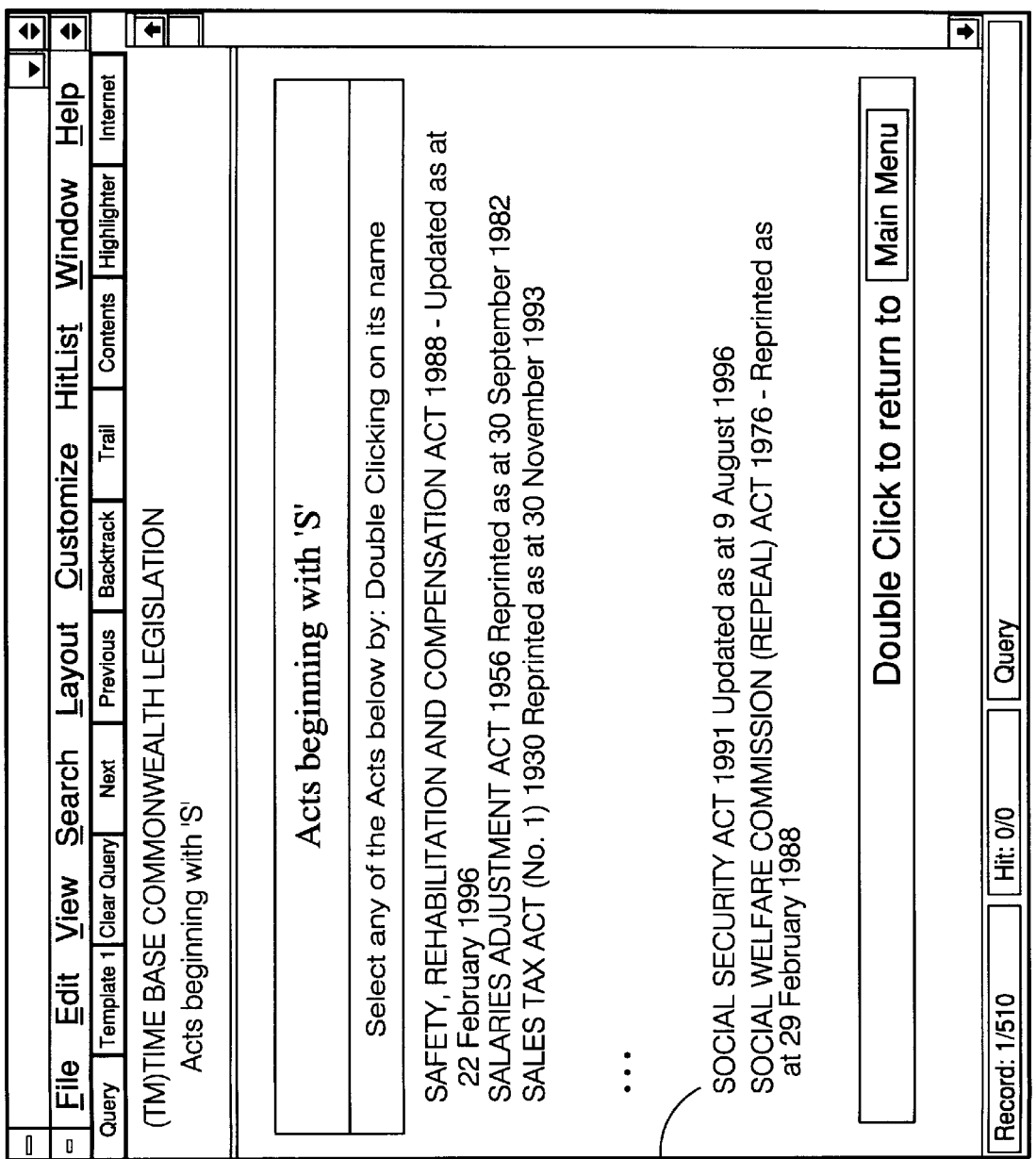

FIG. 10 illustrates acts beginning with "S", as selected in the screen 900 of FIG. 9. By selecting jump link 1002, the Social Security Act can be accessed. Likewise, other acts in this screen 1000 may be accessed using the respective jump link (e.g. Safety, Rehabilitation and Compensation Act.

Figure 11:
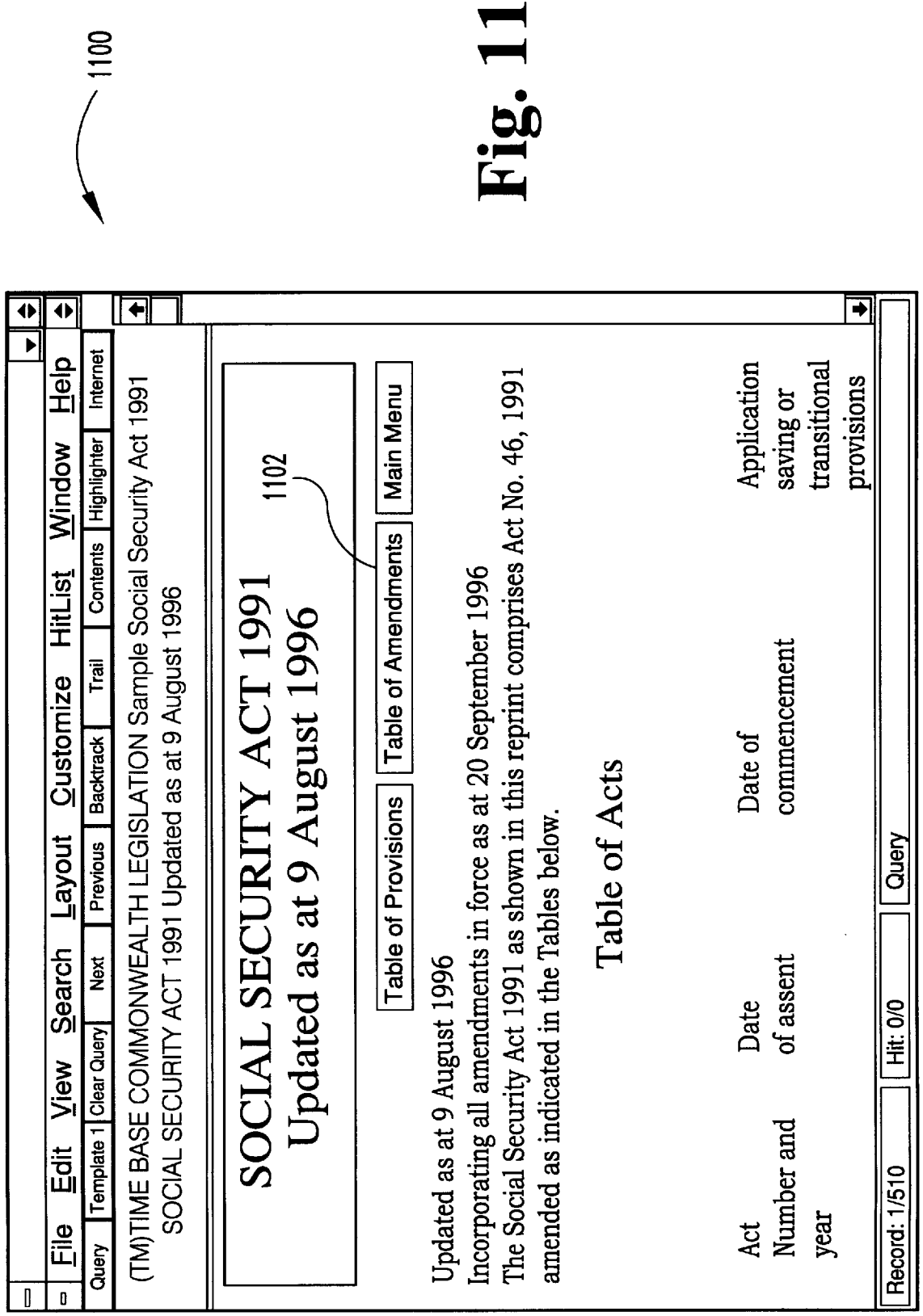
Figure 12:
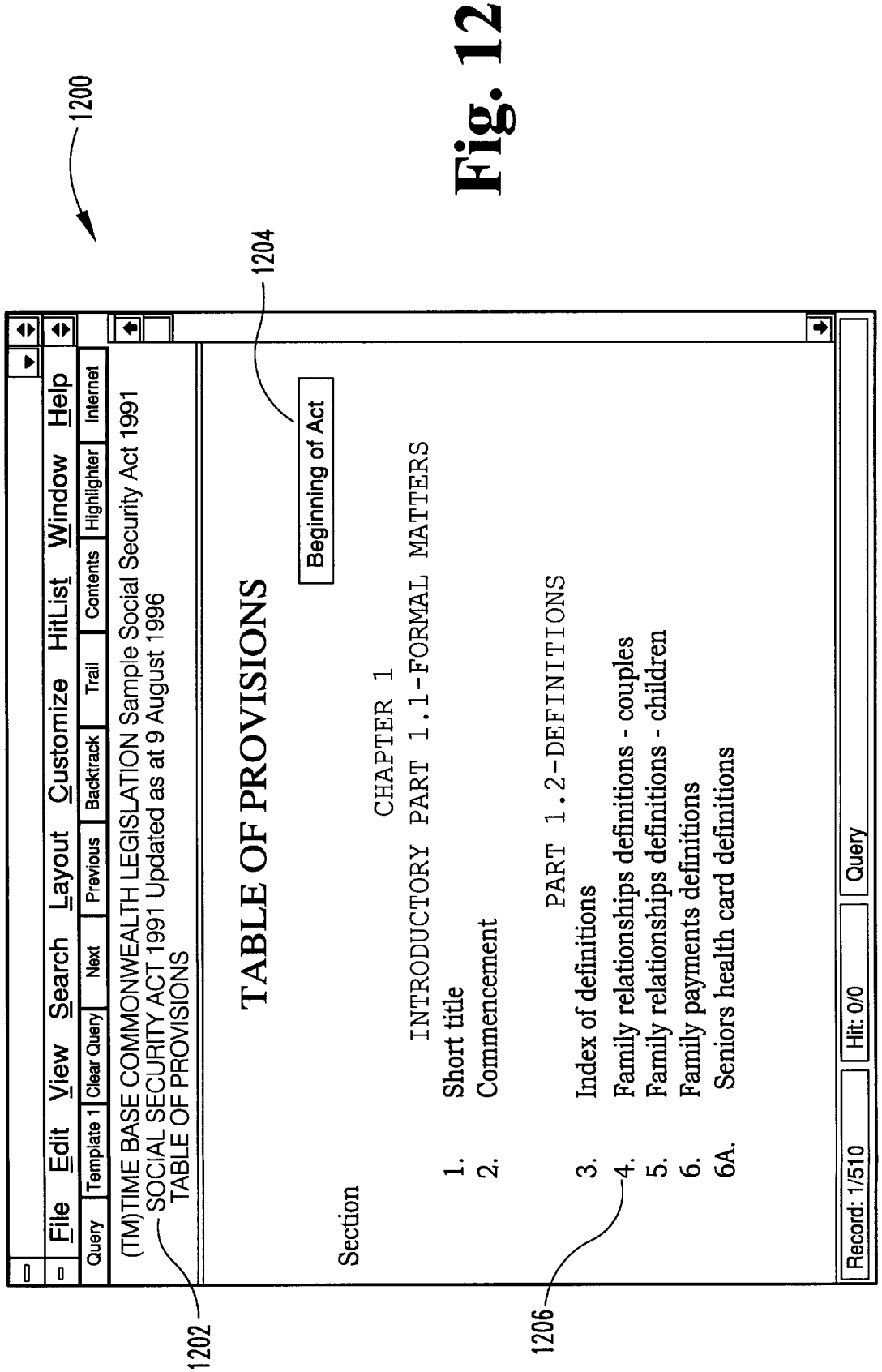

Assuming the appropriate jump link 1002 is selected in FIG. 10, FIG. 11 shows how the beginning of the Social Security Act appears in screen 1100, and the buttons that link the user to the provisions of the Act. This is the start of the most current version of the Social Security Act preferably. From this screen, provisions of the Act can be accessed. By accessing the Table of Provisions box, the Table of Provisions menu can be accessed. FIG. 12 shows the Table of Provisions screen 1200, and illustrates how a specific provision, say Section 4, can be accessed again using links 1206. Different sections of the Act (e.g. ss 3, 4 and 6A) may be accessed as well using corresponding jump links. Again, location information 1202 is provided in the upper portion of the screen. A return button 1204 is also provided that provides access back to the beginning of the Act.

Figure 13:
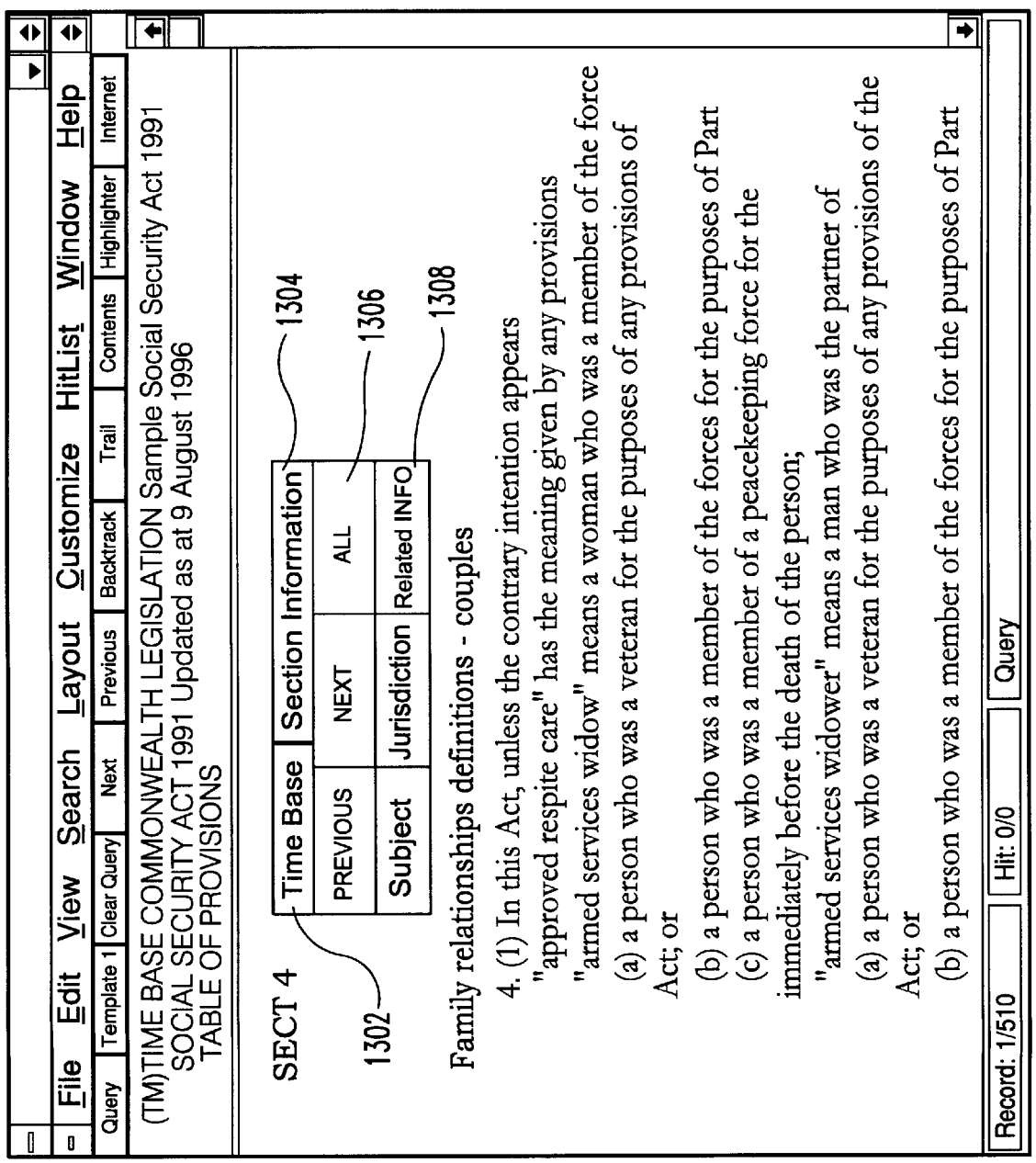

FIG. 13 shows screen 1300 containing the Time Base Toolbar 1302, which preferably provides eight buttons for accessing time based information. This Toolbar 1302 is not a feature of Folio Views, but is a designed addition added to Folio Views by the first embodiment. It is made possible by the way in which the publication data is coded. The Section Information button 1304 takes the user to an overview of information. The Previous, Next and All buttons 1306 allows the user to have access to the previous, next and all versions of the relevant section. The Subject, Jurisdiction and Related Info buttons 1308 allow the user to view and access sections dealing with a similar subject, or similar sections in other jurisdictions, or related information such as cases and articles on or about the section. This Toolbar 1302 allows a user to cycle through previous and subsequent versions of sections and as shown in screens in FIGS. 14 and 15 to refer to the text of sections amending the section. As well, the user can also call to the screen all versions of the section as one view (or display) using the "ALL" button.

Figure 14:
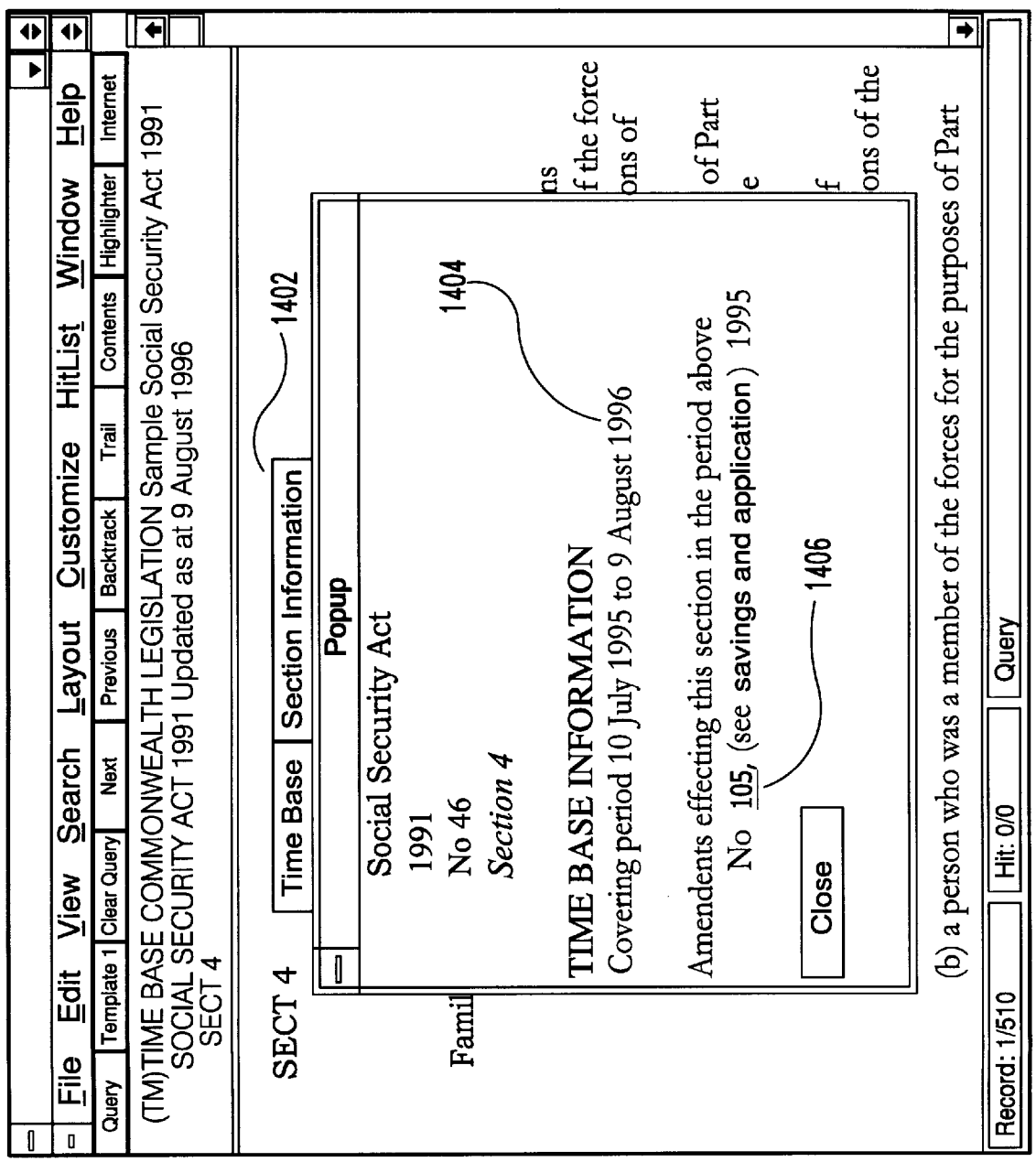

FIG. 14 illustrates a screen 1400 which appears when the user selects the Section Information button 1402 (button 1304 in FIG. 13). The resulting popup screen illustrates the time period or date range 1404 covered by this version of section 4. It also indicates the Year and Number jump link 1406 to text of the amending act which created this version of section 4.

Figure 15:
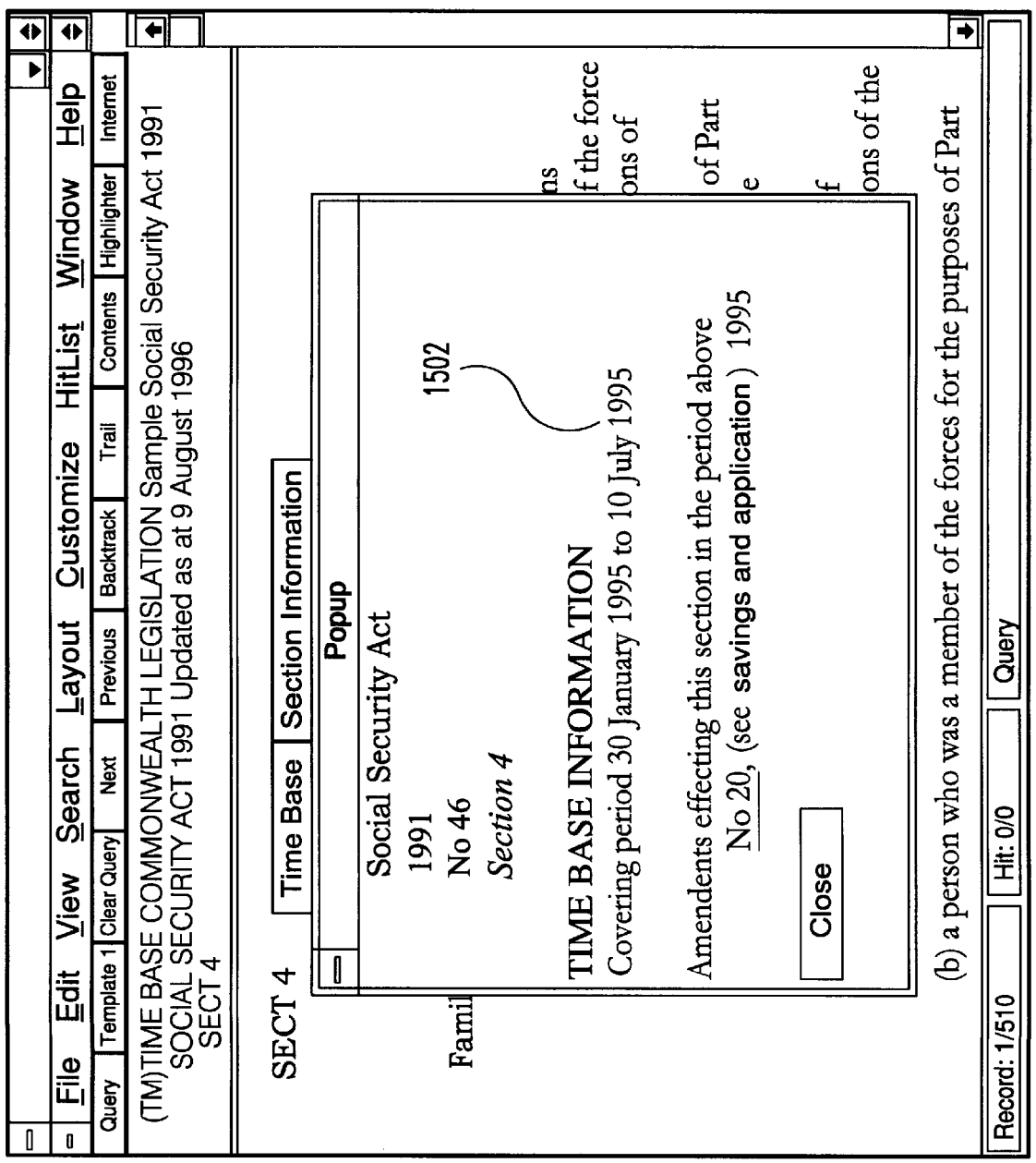

FIG. 15 illustrates a screen 1500 which appears when the user selects the previous button 1502 (not shown—it is located behind the popup screen), which corresponds to previous button 1306 of FIG. 13. This shows an earlier version of section 4 that the user can access by using the previous button 1502. The pop-up screen indicates that this version covers a different time span than that shown in FIG. 14.

The screen shots in FIGS. 7 to 15 display a step-through or navigation-based way of locating information. There is also the more direct approach of searching for terms using text retrieval. The screen shots in FIGS. 16 and 17 illustrate such searching provided by the first embodiment. Screen 1600 shown in FIG. 16 provides a customised search template 1602 that includes a time base option allowing a user to search for versions of a section, for example. Screen 1700 shown in FIG. 17 illustrates a customised search template 1702 for case law which includes a time base option connecting cases to legislation at a particular date, for example. Again, the ability to relate such to time and then to mix and match types of information from different sources (jurisdictions) is a feature provided by the coding technique used for the data and not the Folio Views software used to deliver the data to the end user.

Second Embodiment

The second embodiment stores all the information in a single repository which is marked up in SGML or XML. The information is divided in that repository into suitable pieces or blocks of text (as described in the first embodiment) and any relevant markup marks up a whole suitable piece or block of text by (a) choosing suitable pieces or blocks of text, and (b) demanding that relevant markup belongs to a whole suitable piece or block of text, the following becomes possible. A relational database consisting of records consisting of fields can be created with one and only one record per suitable piece or block of text where the actual text of each suitable piece or block of text is the content of one field of the above record and where each item of the markup is assigned its own field in the above record.

For example, a version of Section 6 of the Income Tax Assessment Act (ITAA) 1936 may be stored as a record in the above relational database. The first field of that record contains the actual text of that version of Section 6. The next field identifies it as Section 6 of the ITAA, the next field gives the date this version came into being, the next field contains the section of the amending act that created this particular version, the next field contains the day this version became superseded, another field contains the subject(s) this version addresses, another field contains the case(s) that have addressed this version of section 6 and so on. Storing the data in this way allows multidimensional database techniques to be applied to the data.

An XML DTD for implementing the second embodiment is set forth in Table E. It will be apparent to one skilled in the art that the second embodiment may be readily implemented in view of the foregoing description of the first embodiment, which is not repeated here for the purpose of brevity, and in view of the accompanying DTD set out in Table E.

The foregoing only describes a small number of embodiments of the invention, and modifications and changes apparent to those skilled in the art can be made thereto without departing from the scope and spirit of the invention. For example, the embodiments of the invention have been described with reference to SGML. The embodiments may alternatively be practiced with the extensible markup language (XML) as well. Also, the embodiments may alternatively be practiced with a Style Sheet Mechanism (SSM) instead of, or in addition to, one or more DTDs.

-19-

Table APPENDIX A

Example Research

SOCIAL SECURITY ACT 1991 No 46

Updated as at 9 August 1996

A 1. Amendments to Section at 9/8/96

S. 4    am. Nos. 74, 116 and 194, 1991; No. 81, 1992;

No. 36, 1993; Nos. 55, 63 and 184, 1994; Nos.

104 and 105, 1995

A 2. Amendments to Section at 10/7/95

S. 4    am. Nos. 74, 116 and 194, 1991; No. 81,

1992; No. 36, 1993; Nos. 55, 63 and 184,

1994

B. Commencement Information for Act No 105 of 1995 contained in Reprint

Social Security (Non-Budget Measures) Legislation Amendment Act 1995

| Number | Year | Date of Assent | Commencement |
|---|---|---|---|
| 105 | 1995 | 29 Sept 1995 | Subdiv. A of Div. 2 of Part 2 (s. 4): 1 July 1993 |
| | | | Ss. 8 and 9: 1 July 1995 |
| | | | S. 10: 1 Apr 1993 |
| | | | Div. 5 of Part 2 (ss. 12 and 13): 20 Sept 1994 (ze) |
| | | Ss. 17 (c), (d) and 18: 1 Jan 1996 | |
| | | Div. 15 of Part 2 (s. 37): 29 Nov 1993 | |
| | | Div. 18 of Part 2 (ss. 41-48): 20 Mar 1995 | |
| | | | S. 49 (a): 12 Mar 1992 |
| | | | S. 49 (b): 1 July 1992 |
| | | | S. 49 (c): 28 Jan 1993 |
| | | | S. 49 (d): 1 Mar 1993 |
| | | | S. 49 (e): 24 Dec 1993 |
| | | | S. 49 (f): 1 Jan 1994 |
| | | | Remainder: Royal Assent |

C 1. Text of Section at 9/8/96 bold text indicates amendments made by N0 105 0f 1995.

SECT 4

Family relationships definitions-couples 4. (1) (1) In this Act, unless the contrary intention appears:

"approved respite care" has the meaning given by subsection (9);

-20-

"armed services widow" means a woman who was the partner of:

(a) a person who was a veteran for the purposes of any provisions of the Veterans' Entitlements Act; or (b) a person who was a member of the forces for the purposes of Part IV of that Act; or (c) a person who was a member of a peacekeeping force for the purposes of Part IV of that Act;

immediately before the death of the person;

"armed services widower" means a man who was the partner of:

(a) a person who was a veteran for the purposes of any provisions of the Veterans' Entitlements Act; or (b) a person who was a member of the Forces for the purposes of Part IV of that Act; or (c) a person who was a member of a Peacekeeping Force for the purposes of Part IV of that Act;

immediately before the death of the person;

"illness separated couple" has the meaning given by subsection (7);

"member of a couple" has the meaning given by subsections (2), (3), (3A) [reference to new section added] and (6);

"partner", in relation to a person who is a member of a couple, means the other member of the couple;

"partnered" has the meaning given by subsection (11);

"partnered (partner getting benefit)" has the meaning given by subsection (11);

"partnered (partner getting neither pension nor benefit)" has the meaning given by subsection (11);

"partnered (partner getting pension)" has the meaning given by subsection (11);

"partnered (partner getting pension or benefit)" has the meaning given by subsection (11);

"partnered (partner in gaol)" has the meaning given by subsection (11);

"respite care couple" has the meaning given by subsection (8).

Member of a couple-general 4 (2) Subject to subsection (3), a person is a member of a couple for the purposes of this Act if:

(a) the person is legally married to another person and is not, in the Secretary's opinion (formed as mentioned in subsection (3)), living separately and apart from the other person on a permanent or indefinite [ Words added] basis; or (b) all of the following conditions are met:

(i) the person has a relationship [Words is living replaced] with a person of the opposite sex (in this paragraph called the "partner");

(ii) the person is not legally married to the partner;

(iii) the relationship between the person and the partner is, in the Secretary's opinion (formed as mentioned in subsections (3) and (3A)[Words added]), a marriage-like relationship;

(iv) both the person and the partner are over the age of consent applicable in the State or Territory in which they live;

(v) the person and the partner are not within a prohibited relationship for the purposes of section 23B of the Marriage Act 1961.

-21-

Note: a prohibited relationship for the purposes of section 23B of the Marriage Act 1961 is a relationship between a person and:

. an ancestor of the person; or

. a descendant of the person; or

. a brother or sister of the person (whether of the whole blood or the part-blood).

Member of a couple-criteria for forming opinion about relationship 4 (3) In forming an opinion about the relationship between 2 people for the purposes of paragraph (2) (a) or subparagraph (2) (b) (iii), the Secretary is to have regard to all the circumstances of the relationship including, in particular, the following matters:

(a) the financial aspects of the relationship, including:

(i) any joint ownership of real estate or other major assets and any joint liabilities; and (ii) any significant pooling of financial resources especially in relation to major financial commitments; and (iii) any legal obligations owed by one person in respect of the other person; and (iv) the basis of any sharing of day-to-day household expenses;

(b) the nature of the household, including:

(i) any joint responsibility for providing care or support of children; and (ii) the living arrangements of the people; and (iii) the basis on which responsibility for housework is distributed;

(c) the social aspects of the relationship, including:

(i) whether the people hold themselves out as married to each other; and (ii) the assessment of friends and regular associates of the people about the nature of their relationship; and (iii) the basis on which the people make plans for, or engage in, joint social activities;

(d) any sexual relationship between the people;

(e) the nature of the people's commitment to each other, including:

(i) the length of the relationship; and (ii) the nature of any companionship and emotional support that the people provide to each other; and (iii) whether the people consider that the relationship is likely to continue indefinitely; and (iv) whether the people see their relationship as a marriage-like relationship.

4 (3A) The Secretary must not form the opinion that the relationship between a person and his or her partner is a marriage-like relationship if the person is living separately and apart from the partner on a permanent or indefinite basis. [Subsection added]

C 2. Text of Section at 10/7/95 prior

SECT 4

Family relationships definitions - couples

4. SECT 4

Family relationships definitions-couples 4. (1) In this Act, unless the contrary intention appears:

"approved respite care" has the meaning given by subsection (9);

"armed services widow" means a woman who was the partner of:

(a) a person who was a veteran for the purposes of any provisions of the Veterans' Entitlements Act; or (b) a person who was a member of the forces for the purposes of Part IV of that Act; or (c) a person who was a member of a peacekeeping force for the purposes of Part IV of that Act;

immediately before the death of the person;

"armed services widower" means a man who was the partner of:

(a) a person who was a veteran for the purposes of any provisions of the Veterans' Entitlements Act; or (b) a person who was a member of the Forces for the purposes of Part IV of that Act; or (c) a person who was a member of a Peacekeeping Force for the purposes of Part IV of that Act;

immediately before the death of the person;

"illness separated couple" has the meaning given by subsection (7);

"member of a couple" has the meaning given by subsections (2), (3), and (6);

"partner", in relation to a person who is a member of a couple, means the other member of the couple;

"partnered" has the meaning given by subsection (11);

"partnered (partner getting benefit)" has the meaning given by subsection (11);

"partnered (partner getting neither pension nor benefit)" has the meaning given by subsection (11);

"partnered (partner getting pension)" has the meaning given by subsection (11);

"partnered (partner getting pension or benefit)" has the meaning given by subsection (11);

"partnered (partner in gaol)" has the meaning given by subsection (11);

"respite care couple" has the meaning given by subsection (8).

Member of a couple-general 4 (2) Subject to subsection (3), a person is a member of a couple for the purposes of this Act if:

(a) the person is legally married to another person and is not, in the Secretary's opinion (formed as mentioned in subsection (3)), living separately and apart from the other person on a permanent basis; or

-23-

(b) all of the following conditions are met:

(i) the person with a person of the opposite sex (in this paragraph called the "partner");

(ii) the person is not legally married to the partner;

(iii) the relationship between the person and the partner is, in the Secretary's opinion (formed as mentioned in subsections (3)), a marriage-like relationship;

(iv) both the person and the partner are over the age of consent applicable in the State or Territory in which they live;

(v) the person and the partner are not within a prohibited relationship for the purposes of section 23B of the Marriage Act 1961.

Note: a prohibited relationship for the purposes of section 23B of the Marriage Act 1961 is a relationship between a person and:

. an ancestor of the person; or

. a descendant of the person; or

. a brother or sister of the person (whether of the whole blood or the part-blood).

Member of a couple-criteria for forming opinion about relationship 4 (3) In forming an opinion about the relationship between 2 people for the purposes of paragraph (2) (a) or subparagraph (2) (b) (iii), the Secretary is to have regard to all the circumstances of the relationship including, in particular, the following matters:

(a) the financial aspects of the relationship, including:

(i) any joint ownership of real estate or other major assets and any joint liabilities; and (ii) any significant pooling of financial resources especially in relation to major financial commitments; and (iii) any legal obligations owed by one person in respect of the other person; and (iv) the basis of any sharing of day-to-day household expenses;

(b) the nature of the household, including:

(i) any joint responsibility for providing care or support of children; and (ii) the living arrangements of the people; and (iii) the basis on which responsibility for housework is distributed;

(c) the social aspects of the relationship, including:

(i) whether the people hold themselves out as married to each other; and (ii) the assessment of friends and regular associates of the people about the nature of their relationship; and (iii) the basis on which the people make plans for, or engage in, joint social activities;

(d) any sexual relationship between the people;

(e) the nature of the people's commitment to each other, including:

(i) the length of the relationship; and (ii) the nature of any companionship and emotional support that the people provide to each other; and (iii) whether the people consider that the relationship is likely to continue indefinitely; and (iv) whether the people see their relationship as a marriage-like relationship.

D. Amending Act 1995 No 105 amending Section 14

SOCIAL SECURITY (NON-BUDGET MEASURES) LEGISLATION AMENDMENT ACT 1995 No. 105
of 1995 - SECT 14
Family relationships definitions-couples

SECT

14. Section 4 of the Principal Act is amended:

(a) by inserting in the defintion of "member of a couple" in subsection (1) ", (3A)" after "(3)";

(b) by inserting in paragraph (2)(a) "or indefinite" after "permanent";

(c) by omitting from subparagraph (2)(b)(i) "is living" and substituting "has a relationship";

(d) by omitting from subparagraph (2)(b)(iii) "subsection (3)" and substituting "subsections (3) and (3A)";

(e) by inserting after subsection (3):

"(3A) The Secretary must not form the opinion that the relationship between a person and his or her partner is a marriage-like relationship if the person is living separately and apart from the partner on a permanent or indefinite basis.".

Table ~~APPENDIX B~~

CODING - Document Type definitions (dtds)

ACT.DTD

```
<!-- *******************************************************
    Document Type Definition for a set of acts
    Typical invocation :
        <!DOCTYPE acts PUBLIC "-//SGMLSE//DTD 1.0 Acts//EN" >
    Copyright Aunty Abha's Electronic Publishing Pty. Ltd. 1996, 1997
******************************************************** -->
<!ENTITY % CONSOL "IGNORE">
<!-- ****** Include common element and entity definitions ********* -->
<!ENTITY % common
    PUBLIC "-//SGMLSE//ELEMENTS 2.0 Common Elements//EN" >
%common;
<!-- ****** End common element and entity definitions ********* -->
<!ELEMENT acts    - - (title, header?, act+)
>
<!ENTITY % act PUBLIC "-//SGMLSE//DTD 1.0 Act//EN" >
%act;
```

ACTS.DTD

```
<!-- *******************************************************
    Document Type Definition for a set of acts
    Typical invocation :
        <!DOCTYPE acts PUBLIC "-//SGMLSE//DTD 1.0 Acts//EN" >
    Copyright Aunty Abha's Electronic Publishing Pty. Ltd. 1996, 1997
******************************************************** -->

<!ENTITY % CONSOL "IGNORE">
<!-- ****** Include common element and entity definitions ********* -->
<!ENTITY % common
    PUBLIC "-//SGMLSE//ELEMENTS 2.0 Common Elements//EN" >
%common;
<!-- ****** End common element and entity definitions ********* -->
<!ELEMENT acts    - - (title, header?, act+)
```

-26-

```
>
<!ENTITY % act PUBLIC "-//SGMLSE//DTD 1.0 Act//EN" >
%act;
```

REG.DTD

```
<!-- ******************************************************************
    Document Type Definition for a Regulation
    Typical invocation :
        <!DOCTYPE regact PUBLIC "-//SGMLSE//DTD 1.0 Regulation Act//EN" >
    Copyright Aunty Abha's Electronic Publishing Pty. Ltd. 1996, 1997
    REVISION History
    ****************
    190197    TH    Since RULE, REG and SECTION are all equivalent, removed REG
    from this DTD
            Added long-title
    ************************************************************** -->

<!ELEMENT reg    -    -    (title, notes?, provisions?, (preamble|long-title)?,
((order+|(section|schedule)+|chapter+|part+),schedule*))>
<!ATTLIST reg id ID #REQUIRED
        date CDATA #IMPLIED   -- used in numacts --
        %status;
        %subject;
>
```

REGS.DTD

```
<!-- ******************************************************************
    Document Type Definition for a set of regulations
    Typical invocation :
        <!DOCTYPE regs PUBLIC "-//SGMLSE//DTD 1.0 Regulations//EN" >
    Copyright Aunty Abha's Electronic Publishing Pty. Ltd. 1996, 1997

REVISION History
    ****************
    ********************************************************************** -->
```

-27-

```
<!ENTITY % CONSOL "IGNORE">
<!ELEMENT regs     - - (title, header?, reg+) >
<!-- ****** Include common element and entity definitions ********* -->
<!ENTITY % common
    PUBLIC "-//SGMLSE//ELEMENTS 2.0 Common Elements//EN" >
%common;
<!-- ****** End common element and entity definitions ********* -->
<!ENTITY % reg PUBLIC "-//SGMLSE//DTD 1.0 Regulation//EN" >
%reg;
```

COMMON.ELT

<!-- ********************************************************************

Common element, attribute and entity definitions.
Typical invocation :
<!ENTITY % common PUBLIC
    "-//SGMLSE//ELEMENTS 3.0 Common Elements//EN" >
%common;
VERSION 3    19 Jan 1997
Copyright Aunty Abha's Electronic Publishing Pty. Ltd. 1996, 1997

REVISION History
****************

| | | | |
|---|---|---|---|
| 141096 | TH | Added p* to definition of schedule | |
| 151096 | TH | Added %reqid; %reqlbl; attributes to RULE, ORDER, DIVISION, SUB-DIVISION | |
| | | Added P+ and SUB+ to rule definition | |
| 251096 | TH | Added ststus entity for amendment information | |
| 291096 | TH | Changed definition for ORDER | |
| 141196 | TH | Added <ALTERED> element | |
| 261196 | TH | Too many changes to mention - Designated Version 2 | |
| 150197 | TH | Too many changes to mention - Designated Version 3 | |
| 190197 | TH | Changed contents of SECTION and SCHEDULE to (title, (%unstruct-cont;)) | |
| | TH | Since RULE, REG and SECTION are all equivalent, renamed all to SECTION and added attribuute TYPE to designate which type of section they are | |

-28-

TH    Added entity SUBJECT to allow each element to belong to 1 or more
subjects
    TH    Added entity CONSOL which is invoked in the consolidation DTD using
marked sections
************************************************************** -->
<!--
++++++++++++++++++++++++++++++++++++++++++++++++++++++++++++++++++++ -->
<!--   ISO Character Entity Set Declarations and references        -->
<!--
++++++++++++++++++++++++++++++++++++++++++++++++++++++++++++++++++++ -->
<!ENTITY % ISOnum PUBLIC "ISO 8879:1986//ENTITIES Numeric and
        Special Graphic//EN"                    >
<!ENTITY % ISOpub PUBLIC "ISO 8879:1986//ENTITIES
        Publishing//EN"                         >
<!ENTITY % ISOtech PUBLIC "ISO 8879:1986//ENTITIES
        General Technical//EN"                  >
<!ENTITY % ISOlat1 PUBLIC "ISO 8879:1986//ENTITIES
        Added Latin 1//EN"                      >
<!ENTITY % ISOgrk3 PUBLIC "ISO 8879:1986//ENTITIES
        Greek Symbols//EN"                      >
%ISOnum;
%ISOpub;
%ISOtech;
%ISOlat1;
%ISOgrk3;
<!-- ***************** End Character entities *********************** -->
<!-- ************* Parameter Entities ****************** -->

<!ENTITY % consol "">
<![ %CONSOL [
<!ENTITY % consol     "cai   NAMES    #IMPLIED
            -- Creating amending act ID (IDs) --
            eai   NAMES    #IMPLIED
            -- Ending amending act ID (IDs) --
              "
    >

```
]]>

<!ENTITY % status
         "insert-date    NUMBER    #IMPLIED -- insert date --
          insert-leg     IDREF     #IMPLIED -- link to the inserting legislation --
          repeal-date    NUMBER    #IMPLIED -- repeal date --
          repeal-leg     IDREF     #IMPLIED -- link to the repealing legislation --
          amend-date     NUMBER    #IMPLIED -- amended date --
          amend-leg      IDREF     #IMPLIED -- link to the amending legislation --
          "
>

<!ENTITY % reqid      "id       ID       #REQUIRED"
   -- required id --
>
<!ENTITY % reqlbl     "lbl      CDATA    #REQUIRED"
   -- required label --
>

<!ENTITY % emph       "bold | ital"
   -- emphasised text --
>
<!ENTITY % refs       "xref | rngref | tempref | noteref"
   -- references --
>
<!ENTITY % inline     "quote | ileqn | %emph; | %refs; | super | subscr"
   -- inline text elements --
>
<!ENTITY % text       "#PCDATA | %inline;"
   -- inline text elements plus character data --
>
<!ENTITY % ref-cont   "#PCDATA"
   -- content of references --
>
<!ENTITY % plevel     "p | dpeqn | tblblk | list | blockquote | form"
   -- paragraph level (block) elements --
>
<!ENTITY % tblcon     "p | dpeqn | list"
```

-30-

```
-- content of table cells --
>

<!ENTITY % para-cont    "(%plevel;)+"
   -- content of long-title or section level elements --
>

<!ENTITY % unstruct-cont   "((%plevel;)|article|chapter|part|notes)*">

<!ENTITY % subject     "subject     NAMES     #IMPLIED"
   -- optional subject --
>
<!-- ************** End Parameter Entities ******************* -->

<!-- ******************* Include Maths and Table elements ************ -->

<!ENTITY % atimath PUBLIC "-//SGMLSE//ELEMENTS Math Equation Structures//EN">
%atimath;

<!ENTITY % atitbl PUBLIC "-//SGMLSE//ELEMENTS Table Structures//EN">
%atitbl;

<!-- ******************* End Maths and Table elements ******** -->

<!-- Main elements -->

<!ELEMENT part - - (title, (%plevel;)*, (chapter+|division+|section+)*, notes?)
>
<!ATTLIST part %reqid;
          %reqlbl;
          %status;
          %subject;
          %consol;
>

<!ELEMENT order - - (title, (division|section|part|schedule)+)
   -- in numregs --
>
```

-31-

```
<!ATTLIST order  %reqid;
          %reqlbl;
           %status;
           %subject;
           %consol;
>

<!ELEMENT division - - (title, (sub-division+|section+))
-- in numregs --
>
<!ATTLIST division  %reqid;
          %reqlbl;
           %status;
           %subject;
           %consol;
>

<!ELEMENT sub-division - - (title, section+)
-- in numregs --
>
<!ATTLIST sub-division  %reqid;
          %reqlbl;
           %status;
           %subject;
           %consol;
>

<!ELEMENT chapter - - (title, (%plevel;)*, (part+|section+|article+)?)
-- part+ and section+ for numacts --
>
<!ATTLIST chapter  %reqid;
           %reqlbl;
           %status;
           %subject;
           %consol;
>

<!ELEMENT article - - (title, (%plevel)*, notes?)
```

-32-

```
        >
        <!ATTLIST article %reqid;
                    %reqlbl;
                    %status;
 5              %subject;
        >

<!ELEMENT section - - (title, (%unstruct-cont;))>
        <!ATTLIST section
10        %reqid;
                    %reqlbl;
                    %status;
                 astprov NAMES #IMPLIED
                 type (section|rule|reg)  section
15              %subject;
                    %consol;
        >

<!ELEMENT schedule  - - (title?, (%unstruct-cont;))
20        -- Schedule of an Act --
        >
        <!ATTLIST schedule %reqid;
                    %reqlbl;
                    %status;
25              %subject;
                    %consol;
        >

<!-- ******************************************************** -->
30
        <!ELEMENT provisions - - (title, tblblk+)
                -- provisions --
        >
        <!ATTLIST provisions
35              %subject;
        >

<!ELEMENT form - - (title, formreg, front, back?)>
```

```
     <!ATTLIST form  %reqid;
             %reqlbl;
             %status;
             parastyle CDATA #IMPLIED
5            %subject;
     >

<!ELEMENT formreg - - (#PCDATA)
     -- Regulation --
10   >
     <!ATTLIST formreg
             %subject;
     >

15   <!ELEMENT front - - (asis)
     -- front of form --
     >
     <!ATTLIST front
             %subject;
20   >

<!ELEMENT back - - (asis)
     -- back of form --
     >
25   <!ATTLIST back
             %subject;
     >

<!ELEMENT asis - - (#PCDATA)
30   -- text as is --
     >
     <!ATTLIST asis
             %subject;
     >
35
     <!-- ****************** Header elements ********************-->

<!ELEMENT header   - - (scope?, updated?)>
```

-34-

```
     <!ATTLIST header
             %subject;
     >

5   <!ELEMENT scope - - (%text;)+>
     <!ATTLIST scope
             %subject;
     >

10   <!ELEMENT updated - - (%text;)+>
     <!ATTLIST updated
             %subject;
     >

15   <!ELEMENT notes   - o (note+)>
     <!ATTLIST notes
             %subject;
     >

20   <!ELEMENT note - - (%plevel;)+
     >
     <!ATTLIST note    id    ID    #REQUIRED
             %subject;
     >
25
     <!-- ***************** End Header elements ******************-->

<!-- ***************** structural elements ******************-->

30   <!ELEMENT title    - - (%text;)+
         -- Generic title --
     >

<!-- ***************** End structural elements ******************-->
35
     <!-- ***************** plevel elements ******************-->

<!ELEMENT blockquote    - - (%unstruct-cont;)+
```

-35-

```
      >
      <!ATTLIST blockquote parastyle CDATA #IMPLIED
              %subject;
      >
 5
      <!ELEMENT p      - - (%text;)+
         -- paragraph - a line of text terminated by a carriage return in
            the hardcopy --
      >
10    <!ATTLIST p parastyle CDATA #IMPLIED
              %subject;
      >
      <!ELEMENT list   - - (li)+
      >
15    <!ATTLIST list parastyle CDATA #IMPLIED
              %subject;
      >
      <!ELEMENT li     - - (p | blockquote | tblblk | list)+
         -- item in a list --
20    >
      <!ATTLIST li     lbl    CDATA #REQUIRED
              %status;
              %subject;
      >
25    <!ELEMENT tblblk   - - (title?, (table|#PCDATA))
         -- table block --
      >
      <!ATTLIST tblblk parastyle CDATA #IMPLIED
              %subject;
30    >
      <!ELEMENT dpeqn   - - (fd)
         -- display equation --
      >
      <!ATTLIST dpeqn parastyle CDATA #IMPLIED>
35
      <!-- ****************** End plevel elements ********************-->

<!-- ****************** inline elements ********************-->
```

-36-

```
    <!ELEMENT xref    - - (%ref-cont;)+
        -- cross reference to a single target point --
    >
    <!ATTLIST xref   ref   IDREF   #REQUIRED
5   >
    <!ELEMENT noteref   - O EMPTY
        -- cross reference to a note --
    >
    <!ATTLIST noteref   ref   IDREF   #REQUIRED
10  >
    <!ELEMENT rngref   - - (%ref-cont;)+
        -- cross reference to a sequential range of target points --
    >
    <!ATTLIST rngref   startref   NAME   #REQUIRED
15             endref     NAME   #REQUIRED
    >
    <!ELEMENT tempref   - - (%ref-cont;)+
        -- cross reference to a single target point where the idstring is unknown --
    >
20  <!ELEMENT ileqn   - - (f)
        -- inline equation --
    >
    <!ELEMENT super   - - (%text;)+   -(super,subscr)
        -- superscript --
25  >
    <!ELEMENT subscr   - - (%text;)+   -(super,subscr)
        -- subscript --
    >
    <!ELEMENT quote   - - (%text;)+
30  >
    <!ELEMENT bold    - - (%text;)+   -(bold)
        -- text set in bold which is not a title or a label --
    >
    <!ELEMENT ital    - - (%text;)+   -(ital)
35      -- text set in italic which is not a title or a label --
    >
    <!ELEMENT altered - O EMPTY>
    <!ATTLIST altered by CDATA #REQUIRED>
```

```
<!-- ****************** End inline elements ******************** -->
<!ELEMENT long-title - - (%para-cont;)>
<!ELEMENT preamble - - (%para-cont;)>
```

CONSOL.DTD

```
<!-- *********************************************************
     Document Type Definition for the consolidation
     Typical invocation :
     <!DOCTYPE consol PUBLIC "-//SGMLSE//DTD 1.0 Colsolidation//EN" >
     Copyright Aunty Abha's Electronic Publishing Pty. Ltd. 1996, 1997

REVISION History
     ****************
     ************************************************************* -->
<!ENTITY % CONSOL "INCLUDE">
<!-- ****** End common element and entity definitions ********* -->
<!ELEMENT consol     - - (act|reg)+
>
<!-- ****** Include common element and entity definitions ********* -->
<!ENTITY % common
     PUBLIC "-//SGMLSE//ELEMENTS 2.0 Common Elements//EN" >
%common;
<!ENTITY % reg PUBLIC "-//SGMLSE//DTD 1.0 Regulation//EN" >
%reg;
<!ENTITY % act PUBLIC "-//SGMLSE//DTD 1.0 Act//EN" >
%act;
```

-38-

Table ~~APPENDIX C~~

Relational Database Specifications

TABLE OF CONTENTS

*Database Tables Entry Procedure*

[A] GENERAL

[A 01]    Introduction
[A 02]    General Purpose and Structure of the Database
[A 03]    General Note about Dates Required for Fields in Database Tables

[B] MASTER TABLE

[B 01]      ID FIELD
[B 02]      Date of Assent/Date of Notification Field
[B 03]      Short Title Field
[B 04]      Date of Commencement Field
[B 04.1]    Other forms of commencement or notification
[B 05]      Date of Expiry Field
[B 06]      Type Field
[B 07]      Reprint No Field
[B 08]      Reprint Date Field

[C] TEXTBLOCK TABLE

[C 01]    When the should it be used?
[C 02]    ID Field
[C 03]    Textblock ID1
[C 04]    Textblock ID2
[C 05]    Date of Commencement Field
[C 06]    Date of Expiry Field

COMMONWEALTH PROJECT

CHAPTER XX - Database Tables Entry Procedure
*[A] GENERAL*

[A 01] Introduction
- This Chapter is divided into three topics;

[A] This General topic,

[B] The Master Table of the Data Base; and

[C] The Textblock Table of the Data Base.

- All text like this in 10pt Arial font size is "explanatory text and notes" on the data base.
- All text in Courier 9pt font size with a rule on the left hand side is the text used for examples, the text is taken from the Commonwealth data where possible to make it look like the real thing, however, some examples have been created for the purposes of explanation and do not exist in the data itself.
- References in capitals to ACT(S) or REGULATION(S) are references to the whole Acts or Regulations. The word regulation when written with a lower case "r" will refer to a numbered regulation (eg: regulation 2). Note: this does not apply to the text of examples which have been left as they appear in the data.
- The word Section written with a capital "S" will refer to the numbered section of an ACT (eg: Section 2). Note: this does not apply to the text of examples which have been left as they appear in the data.
- The word Part written with a capital "P" will refer to the means of dividing an ACT known as a Part (eg: Part 2 or Part II). Note: this does not apply to the text of examples which have been left as they appear in the data.
- Note: the reference to Sections in Commonwealth ACTS and regulations in Commonwealth REGULATIONS is by way of the lowest piece of text first, eg: 8(8)(a) would be written "paragraph 8(8)(a)" not "Section 8(8)(a)".

Note: Fields are out of database structure order in the examples because they appear at different places in the legislation to the structure used in the database tables.

[A 02] General Purpose and Structure of the Database
*Purpose*

To provide a means of managing, monitoring and checking the content of the Commonwealth Legislation Consolidation.

-40-

To allow the time based (versioning) capacity of the DTD and SGML coding being under taken to be realised.

*Basic Structure*

The database is to consist of two tables.

These Tables will be known as MASTER and TEXTBLOCK.

The specific purpose of each Table will be as follows:-

MASTER will focus on fields that collect data about an ACT or REGULATION as a whole.

TEXTBLOCK will focus on specific sub-elements of the whole of an ACT or REGULATION.

[A 03] General Note about Dates Required for Fields in Database Tables

Dates in the Database will be used primarily to identify two things:
- the beginning of a whole or part of an ACT or REGULATION, or
- the end of the whole or part of an ACT or REGULATION Entries for dates will all be in the dd/mm/yy formula.

There are 3 ways dates will be appear in the legislation:
- *specific* - are stated in the legislation itself (for example, Date of Assent)
- *to be advised* - are to be published or advised elsewhere (for example, proclaimed in Gazette)
- *conditional* - are based on something else happening (for example, the commencement of another ACT or REGULATION, the creation of or termination of an organisation, the happening of an event)

*[B] MASTER TABLE*

[B 01] ID FIELD

This is the most important field in the database as it ties all the remaining fields and their information together.

For the example used here, that is, the Social Security Act this will be Act-19910046.

This is arrived at by combining, (i) the *type of legislation*, in this case an ACT - see (a) *below*, then
(ii) the *year of enactment*/creation, in this case 1991 - see (b) *below*, and finally,
(iii) the *ACT'S Number* - see (c) *below*.

-41-

All three parts of the ID are important. Inputting the right type, that is, Act for ACTS and Reg for REGULATION etc., and the right year and number is critical as only the correct combination of all three will give the required accuracy.

In the ID field the year and number are separated by a hyphen. Also four digits must be used for the year number, thus 0046 and not 46 is used for the ACT'S number in this example.

An important point to note is that it is possible for an ACT or REGULATION to be known as say the Federal Law Act 1996 but to be Act No 2 of 1997, so that its ID then will be Act-19970002

```
$$#

$$T
SOCIAL SECURITY (a)ACT 1991
- Updated as at 10 July 1995

$$T
*1*    The Social Security Act 1991 as shown in this reprint comprises Act
No. (c)46, (b)1991 amended as indicated in the Tables below.<
```

[B 02] Date of Assent/Date of Notification Field

This will appear in different places according to the style and type of information.

For ACTS use the Table of Acts at the column Date of Assent. The entry for Act No 46,1991 being the entry for the principal ACT, that is the Social Security Act, is the place to look and the second column shows the date of assent as 23 Apr 1991(see (d) *below*).

```
Table of Acts<
    Act         Date         Date of      Application<
    Number and  of assent                 commencement saving or<
    year                                  transitional<
                                          provisions<

Social Security Act 1991<
    46, 1991  (d)23 Apr 1991    1 July 1991<
```

For REGULATIONS use the Table of Statutory Rules at the column Date of Notification.

-42-

The entry for REGULATION No 36,1990 being the entry for the principal REGULATIONS, that is the Cash Transactions Reports Regulations, is the place to look and the second column shows the date of notification as 27 Feb 1990 (see (e) *below*).

```
*1* The Cash Transaction Reports Regulations (in force under the Cash
Transaction Reports Act 1988) as shown in this reprint comprise
Statutory Rules 1990 No. 36 amended as indicated in the Tables below.

Table of Statutory Rules

Year and  Date of        Date of        Application,
number    notification   commencement   saving or
          in Gazette                    transitional
                                        provisions
1990 No. 36    (e)27 Feb 1990 27 Feb 1990
```

[B 03] Short Title Field

This usually appears in Section 1 of an ACT or regulation 1 of a REGULATION. This is the best place to take the name from as it is the legislated/official way that the ACT, REGULATION etc., is to be referred to etc. See (f) *below*.

The name should be entered in full (no abbreviations). You should include the year even though it is part of the ID and also the words ACT or REGULATION. This will firstly, provide a cross check as normally these should match. It will also indicate those ACTS or REGULATIONS where the Short Title Year is different to the Year and Number in the ID field.

```
$$A
$$T
SOCIAL SECURITY ACT 1991 - SECT 1<
Short title $$T $$NSECT
   1. This Act may be cited as the (f)Social Security Act 1991.*1*
$$S
```

-43-

[B 04]  Date of Commencement Field

This information usually appears in Section 2 for an ACT and regulation 2 for a REGULATION.

This is the best place to take the date of commencement from as here it is part of the legislation/the law and therefore always correct (even if its wrong). If taken from the Table of Acts or Table of Regulations an error would not be correct even if not made by us because technically; Tables, Title Pages and even side/margin notes are not considered part of legislation.

See (g) *below* for an example.

```
$$T
SOCIAL SECURITY ACT 1991 - SECT 2<
Commencement $$T $$NSECT
  2. This Act commences on (g) 1 July 1991.
$$A
$$T
```

[B 04.1]  Other forms of commencement or notification

The example given at (g) above is a simple form of commencement in that one date is stated in Section 2.

There are other forms of commencement as follows:-

- ACTS or REGULATIONS *where no date of commencement is specified* enacted on or before 31/12/1937 (that is, there is no Section 2 and no other section dealing with commencement) commence on the day on which the ACT was assented to for ACTS (for example, the Acts Interpretation Act 1901 assented to on 12/7/1901). These Acts require no entry in the MASTER TABLE as the Date of Commencement and Date of Assent are the same.

- ACTS or REGULATIONS *where no date of commencement is specified* enacted on or after 1/1/1938 (that is, there is no Section 2 and no other section dealing with commencement) then the Act by default commences on 28th day after the Date of Assent. These Acts do require an entry in the MASTER TABLE as the Date of Commencement and Date of Assent are not the same.

- ACTS or REGULATIONS where various Parts, Sections, regulations etc., commence on different dates or on dates to be proclaimed or notified in Gazette.

- ACTS or REGULATIONS where various Parts, Sections, regulations etc., commence the commencement of another ACT, REGULATION or Part or Section of another ACT or REGULATION etc.

Note: With respect to the calculation of time (as for example, in the case of commencement 28 days after assent) Section 36 of the Acts Interpretation Act affects how this is done. Section 36 provides:

- Where in an ACT any period of time, dating from a given day, act, or event, is prescribed or allowed for any purpose, the time shall, unless the contrary intention appears, be reckoned exclusive of such day or of the day of such act or event.

- Where the last day of any period prescribed or allowed by an ACT for the doing of anything falls on a Saturday, on a Sunday or on a day which is a public holiday or a bank holiday in the place in which the thing is to be or may be done, the thing may be done on the first day following which is not a Saturday, a Sunday or a public holiday or bank holiday in that place.

The above will be handled in Australia with respect ot those ACTS or REGULATIONS to which this applies.

[B 05] Date of Expiry Field

This is the opposite of commencement; that is, it indicates when the whole of an ACT or REGULATION or some Part, Section or regulation in an ACT or REGULATION ceases to have effect.

Note: because the expiry is provided for in the ACT or REGULATION itself, this is different to a repeal. The effect is however, the same.

Sections or Regulations relevant to this field are headed "Sunset clause" or "Sunset provision" see (h) *below*.

-45-

Note: the use of the words "unless sooner repealed" in the examples *below*. This means entries will need to be checked or reviewed to ensure that ACT or REGULATION has not been sooner repealed.

The date or timing of expiry is indicated/expressed in a few different ways:
by a specific date , see (i) *below.*
by a period of years, see (j) *below.*

- Examples of expiry of the whole ACT by a specific date.

```
AUSTRALIAN MEAT AND LIVE-STOCK (QUOTAS) ACT 1990 - Updated as at
18 July 1995
.......................
SECT 9
Sunset clause (h)
9. This Act, unless sooner repealed, shall cease to be in force at the
(i)end of 30 June 1998.
```

Note: the example *above* uses the words "cease to be in force" and the one *below* the words "ceases to have effect". The result is still the same for our purpose.

```
MEAT AND LIVE -STOCK INDUSTRY ACT 1995 No. 67 of 1995 - Assented
to 30 June 1995
.......................
SECT 227
Sunset clause
227. This Act, unless sooner repealed, ceases to have effect at
the end of 30 June 1998.
```

- Example of expiry of Part, Division, Subdivision or Section of ACT after a specified period of years.

```
NATIVE TITLE ACT 1993
Updated as at 30 June 1995
............................
SECT 207
```

-46-

```
Sunset provision
207. This Part ceases to be in force at the (j)end of 5 years
after the Parliamentary Joint Committee is first appointed.
```

- Examples of expiry of a portion of a REGULATION

```
FEDERAL COURT RULES
Updated as at 22 March 1996
.............................
ORDER 75 NATIVE TITLE RULES
   NATIVE TITLE ACT 1993
.................................
ORDER 75
RULE 21
Sunset provision
21. Order 75 ceases to be in force on 1 March 1997.

MIGRATION (1993) REGULATIONS - Updated as at 25 July 1994
.................................................
REG 2A
10A
Sunset provision
2A.10A. No application may be made under this Division on or
after 1 July 1993.
```

[B 06] Type Field

This Field provides more specific information about the type of legislation.

It is different to the ID Field described above which gives the legislation a unique ID.

This Field uses three single character codes to describe the legislation.

These are as follows:

P = *Principal* ACTS or REGULATIONS.

It indicates that this is the main or Principal ACT or REGULATION.

OR In other words the ACT or REGULATION which gets amended.

Principal ACTS or REGULATIONS can be either in existence (enacted in previous years) or newly enacted (created in the current year).

There is nothing specifically unique or different in a principal ACT or REGULATION that makes it easy to identify. By elimination it is however, possible to say what is not a Principal ACT or REGULATION. This is done by looking at the ACT or REGULATION'S title information. Amending Acts or Regulations (which are dealt with next) usually contain the word's "Amending", "Amendment", "Repeal" or "Statute Law Revision" in their Short Title. Another indicator in the case of ACTS is that the Long Title will also contain the word's "Amending", "Amendment", "Repeal" or "Statute Law Revision" (REGULATIONS however, do not have a Long Title).

The example marked (K) and (J) *below* shows the Long and Short Titles for a Principal Act known as the Trade Practices Act. (Compare these examples with the ones marked (L) and (M) *below*).

```
LONG TITLE(K)
An Act relating to certain Trade Practices

PART I-PRELIMINARY

SECT 1
Short title(J)
1. This Act may be cited as the Trade Practices Act 1974.*1*
SEE NOTES TO FIRST ARTICLE OF THIS CHAPTER .
```

Note: A principal ACT or REGULATION can contain amendments to other ACTS or REGULATIONS. It therefore, still needs to be considered for its effect on other ACTS.
A = *Amending* ACTS or REGULATIONS.
It indicates that this is a changing or Amending ACT or REGULATION.
OR In other words the ACT or REGULATION which does the amending.

Amending ACTS or REGULATIONS will not generally exist in their own right in the consolidated information for which we are creating the data base. The changes they effect will nearly always become part of the Principal ACT or REGULATION.

There are some rare exceptions to the above point however, which will need to be identified - (the way to do this most effectively will be to identify them in Australia and provide a list or table of what these ACTS and REGULATIONS are).

As already stated the best ways to identify an Amending ACT or REGULATION are:

-48-

Amending ACTS or REGULATIONS will nearly always contain the word's "Amending", "Amendment", "Repeal" or "Statute Law Revision" in their Short Title.

For Acts (but not Regulations) there is also a Long Title at the very beginning of the Act (usually before Section 1) which will also contain the word's "Amending" "Amendment", "Repeal" or "Statute Law Revision".

The example marked (L) and (M) *below* shows the Long and Short Titles for the Amending ACT known as the Trade Practices (Secondary Boycotts) Amendment Act 1979.

```
LONG TITLE(L)
An Act to amend the Trade Practices Act 1974 with respect
Secondary Boycotts and other industrial practices.

PART I-PRELIMINARY

SECT 1
Short title(M)
1. This Act may be cited as the Trade Practices (Secondary
Boycotts) Amendment Act 1979.*1*
SEE NOTES TO FIRST ARTICLE OF THIS CHAPTER .
```

Note: An Amending ACT or REGULATION can be amended itself by a further amending ACT or REGULATION.

More Examples of Amending ACTS and REGULATIONS
Following are some more examples of Amending ACTS and REGULATIONS and what to look for.

*Statute Law Revision Acts*
Below are two examples of these. Usually, this is clean up legislation which makes many changes and often effects a larger number of ACTS. They can be specific as in the case of the Decimal Currency example or they can be general as in the case of the 1973 example.
They can both change (amend Parts, Divisions and Sections of ACTS and REGULATIONS) and/or delete (repeal) whole ACTS and REGULATION or Parts, Divisions and Sections.

-49-

```
Statute Law Revision (Decimal Currency) Act 1966
Statute Law Revision Act 1973
```

There are other form of Amending ACT similar to the Statute Law Revision Acts as follows:

```
A.C.T. Self-Government (Consequential Provisions) Regulations
1989 No. 3
Defence Legislation Amendment Act 1984
Fringe Benefits Tax (Miscellaneous Provisions) Act 1986
Statute Law (Miscellaneous Provisions) Act (No. 1) 1986
Taxation Laws Amendment Act (No. 3) 1986
```

The above can usually be spotted by the use of words such as "Consequential Provisions" "Laws Amendment", "Legislation Amendment", "Miscellaneous Provisions" in their Short Titles.

*Repeal Acts*

Below are two examples of these. One where the term Legislation is used in the title indicating that more many ACTS are being repealed. Again this is often clean up legislation which repeals many ACTS whose purpose or reason for being has lapsed. Alternatively, as the second example indicates Repeal ACTS can be specific, effecting the repeal of only one ACT.

```
Egg Export Legislation Repeal Act 1984
National Welfare Fund Repeal Act
```

*N = Not known*

Indicates that the type of the ACT or REGULATION is not known or cannot be deterimined. These records will the be handled in Australia.

[B 07]Reprint No Field

The information required for this field does not appear in the Commonwealth Data as presently supplied to/held by us. It will need initially to be obtained in the form of a list of existing reprints and their numbers and be added to both the Commonwealth data and the data base as a once only job. It will then need to be maintained on a monthly basis using the two AGPS Pamphlet Publications known as ACTS TABLES for Acts and STATUTORY RULES TABLES for Regulations, the last page in each contains this information for the current year. Note: where the Pamphlets are not available or the reprint number is not known or unavailable then the number 999 should be used to indicate this.

Each of the two tables from the Pamphlets contains the name of the Reprinted ACT or REGULATION in alphabetical order (but see Statutory Rules example below) followed by the date of reprint, then followed by the words "Reprint No." and a number. It is this last number that needs to be entered.

ACTS TABLE entry example

*National Health Act 1935* (20 September 1996) Reprint No. 5

STATUTORY RULES TABLE entry example
Note: Statutory Rules are listed by their parent Act (the Act under which the are made appearing in Italic as shown in the example below).

*Banks (Shareholdings) Act 1972* --
    Banks (Shareholdings) Regulations (2 August 1995) Reprint No. 2

[B 08] Reprint Date Field
Like the Reprint Number discussed in [B 07] *above* the information required for this field does not appear in the Commonwealth Data as presently supplied to/held by us. It too will need initially to be obtained in the form of a list of existing reprints and be added to both the Commonwealth data and the data base as a once only job. It will then need to be maintained on a monthly basis using the two AGPS Pamphlet Publications known as ACTS TABLES for ACTS and STATUTORY RULES TABLES for Regulations, the last page in each contains this information for the current year.

Each of the two tables contains the name of the Reprinted ACT or REGULATION in alphabetical order (but see Statutory Rules example below) followed by the date of reprint, then followed by the words "Reprint No." and a number.

For this field it is the Date preceding the Reprint Number that needs to be entered.
For examples see the examples at [B 07] *above*.

Note: Again where the Pamphlets are not available or the reprint date is not known or unavailable then the date 00/00/00 should be used to indicate this.

-51-

[C] TEXTBLOCK TABLE

[C 01] When the should it be used?

TEXTBLOCK entries will not normally be required for ACTS or REGULATIONS which are either Principal *or* Reprinted ACTS or REGULATIONS. But note that in the case of Principal ACTS there are exceptions, namely; where the Principal ACT or REGULATION also amends or repeals other ACTS or REGULATIONS.

[C 02] ID FIELD

This field simply repeats the information obtained in [B 01] above. Its purpose is to link this Table with the MASTER TABLE by way of the same ID. For the example, in [B 01] for the Social Security Act the ID was Act-19910046. This ID would be repeated in this field.

[C 03] Textblock ID1

This field is for the ID of the specific Part, Section or regulation in an Amending ACT or REGULATION that causes a change (amendment) to happen.

Textblock ID2 (see [C 04] *below*) on the other hand records the ID of the specific Part, Section or regulation in an Amending Act or Regulation that is changed (amended).

EXAMPLE 1

Following is an example of an amendment to the Social Security Act which shows how the information required for this field is obtained.

*Please note* there are several ways in which Amending ACTS and REGULATIONS are presented. However, the information required for this ID field is present in all cases. This first example shows the things to look for and the next example show some of the variations possible.

(N) The first thing required is an indication as to type. The example is an Amending Act.
(O) The second thing required is the relevant year. In the example this is 1995.
(P) The third thing required is the Act or Reg Number. In this example this is 104.
(Q) The fourth thing required is the specific Part, Section or regulation doing the amending. In this example this is SCH1 (ie: Schedule 1).

The ID entry for this example would then be as follows:
   ACT-19950104-SCH-1

SOCIAL SECURITY LEGISLATION (N)AMENDMENT ACT (No. 1) (O)1995 No. (P)104 of 1995 -

-52-

```
                    (Q)SCHEDULE 1                          Section 4<
             AMENDMENT OF THE SOCIAL SECURITY ACT 1991 RELATING TO<
                          THE DEFINITION OF INCOME<
1. After Paragraph 8(8)(zf):<
Insert:<
"(zfa) a payment of financial supplement made to the person<
under the Student Financial Supplement Scheme;".<
```

EXAMPLE 2

This example shows a different style of amendment to Example 1.

The ID entry for this example would be as follows: ACT-19950105-SEC-4

It would be made up of the following:

(R)  Indication of Amending Act. (This would be Reg if we were dealing with a Regulation).

(S)  Year of Act is 1995.

(T)  Act or Reg Number is 105.

(U)  Specific Part, Section or regulation doing the amending is SEC4. Note: there is no reference to a Schedule (SCH) because Section 4 is doing the amending.

```
SOCIAL SECURITY (NON-BUDGET MEASURES) LEGISLATION (R)AMENDMENT ACT (S)1995 No.
(T)105 of 1995

$$NSECT
(U)4. Section 198 of the Principal Act is amended by inserting after subsection
(1A):
$$P
<
  "(1B) Subject to subsection (1C), if:<
  (a) a person (the 'carer') is personally providing constant care for a
severely handicapped person; and<
  (b) the handicapped person is temporarily absent from Australia for a period
of not more than 3 months; and<
  (c) the carer accompanies the handicapped person on his or her absence from
Australia;<
the carer does not cease to be qualified for a carer pension merely because of
that absence from Australia.
$$P
```

-53-

```
<
   "(1C) If, during a calendar year, the carer has accompanied the handicapped
person outside Australia on more than one occasion, the carer ceases to be
qualified for carer pension under subsection (1B) in that calendar year after he
or she has, during that calendar year, qualified for carer pension under that
subsection for periods that together add up to 3 months.".
$$A
```

[C 04] Textblock ID2

This field is for the ID of the specific Part, Section or regulation in an Amending ACT or REGULATION that is changed (amended).

Textblock ID1 (see [C 03] *above*) on the other hand records the ID of the specific Part, Section or regulation in an Amending ACT or REGULATION that causes a change (amendment) to happen.

EXAMPLE 1

Following is an example of an amendment to the Social Security Act which shows how the information required for this field is obtained.

*Please note,* as with Textblock ID1, there are several ways in which Amending ACTS and REGULATIONS are presented. However, the information required for this ID field is present in all cases. This first example shows the things to look for and the next example shows some of the variations possible.

(V) Again the first thing is an indication as to type. The example is an Amending Act.
(W) The second thing required is the relevant year. In the example this is 1991.
(X) The third thing required is the Act or Reg Number. In this example this is 46.
(Y) The fourth thing required is the specific Part, Section or Regulation that is being amended. In this example this is SEC8.

The ID entry for this example would then be as follows:
  ACT-19910046-SEC-8

```
SOCIAL SECURITY LEGISLATION AMENDMENT ACT (No. 1) 1995 No. 104 of 1995 -
........................
SCHEDULE 1                                              Section 4<
         AMENDMENT OF THE SOCIAL SECURITY (V)ACT (W)1991
```

-54-

(X) [if not available/reproduced in the Amendment text can be obtained from the main ID field in MASTER TABLE]

```
                            RELATING TO<
                            THE DEFINITION OF INCOME<
1. After Paragraph (Y)8(8)(zf):<
Insert:<

"(zfa) a payment of financial supplement made to the person<
under the Student Financial Supplement Scheme;".<
```

EXAMPLE 2

This example shows a different style of amendment to Example 1.

The ID entry for this example would be as follows: ACT-19950105-SEC-198

It would be made up of the following:

(Z) Indication of Amending ACT. (This would be Reg if we were dealing with a REGULATION).

(AA) Year of ACT is 1991.

(BB) The third thing required is the ACT or REGULATION Number.

In this example this is 46.

(CC) Specific Part, Section or regulation being amended is SEC198.

```
SOCIAL SECURITY (NON-BUDGET MEASURES) LEGISLATION AMENDMENT ACT 1995 No. 105 of
1995
```

(Z) (AA) (BB) [if not available/reproduced in the Amendment text can be obtained from the main ID field in MASTER TABLE]

```
$$NSECT
4. Section (CC)198 of the Principal Act is amended by inserting after
subsection (1A):
$$P
<
  "(1B) Subject to subsection (1C), if:<
   (a) a person (the 'carer') is personally providing constant care for a
severely handicapped person; and<
   (b) the handicapped person is temporarily absent from Australia for a period
of not more than 3 months; and<
   (c) the carer accompanies the handicapped person on his or her absence from
Australia;<
```

-55-

```
the carer does not cease to be qualified for a carer pension merely because of
that absence from Australia.
$$P
<
"(1C) If, during a calendar year, the carer has accompanied the handicapped
person outside Australia on more than one occasion, the carer ceases to be
qualified for carer pension under subsection (1B) in that calendar year after he
or she has, during that calendar year, qualified for carer pension under that
subsection for periods that together add up to 3 months.".
$$A
```

[C 05] Date of Commencement Field

This field is for the date an amendment or repeal of a specific Part, Section or regulation commenced. See also [B 04] for information on commencement.

EXAMPLE

Below is an example of a commencement provision from an amending ACT. Note how various sections of the amending ACT are allocated a date of commencement. Using the Section identified in TEXTBLOCK ID1 the date of commencement can be identified and entered in this field.

Thus if the TEXTBLOCK ID1 field were ACT-19950105-SEC-8 then the date information required for this field would be 1 July 1995. See (DD) below.

```
SOCIAL SECURITY (NON-BUDGET MEASURES) LEGISLATION AMENDMENT ACT 1995 No. 105 of
1995 - SECT 2<
Commencement<

$$T $$NSECT
  2.(1) Subject to this section, this Act commences on the day on which it
receives the Royal Assent.
$$P
<
  (2) Subdivision A of Division 2 of Part 2 is taken to have commenced on 1 July
1993.
$$P
```

-56-

```
<
    (3) Sections 8 and 9 are taken to have commenced on (DD)1 July 1995.
$$P
<
    (4) Section 10 is taken to have commenced on 1 April 1993.
$$P
```

[C 06]Date of Expiry Field

This field provides for amendments that are enacted for a period of time, for example; during a special event such as the Olympics.

Note: Expiry provisions are rare and should only be added if clearly specified in the data as in the example below.

EXAMPLE
See (EE) below.

```
OLYMPIC SECURITY (NON-BUDGET MEASURES) LEGISLATION AMENDMENT ACT 1997 No. 109 of
1995

$$NSECT
    4. Section 298 of the Principal Act is amended for the period commencing at
midnight on 1 July 1997 and ending on midnight (EE)25 July 1997 by inserting
after subsection (2A):
$$P
<
    "(2B) Subject to subsection (2C), if:<
    (a) a person (the 'carer') is personally providing constant care for a
severely handicapped person; and<
    (b) the handicapped person is temporarily absent from Australia for a period
of not more than 3 months; and<
    (c) the carer accompanies the handicapped person on his or her absence from
Australia;<
the carer does not cease to be qualified for a carer pension merely because of
that absence from Australia.
$$P
<
```

-57-

"(2C) If, during a calendar year, the carer has accompanied the handicapped person outside Australia on more than one occasion, the carer ceases to be qualified for carer pension under subsection (1B) in that calendar year after he or she has, during that calendar year, qualified for carer pension under that subsection for periods that together add up to 3 months.".

$$A

-58-

APPENDIX D

Keying Guide for Australian Legislation Documents

General
Validation
All files produced must be parsed against the relevant DTD and each table should be viewed using a suitable Table renderer to make sure that they have been coded correctly.

DTD modifications
No local modifications must be made to the supplied DTD's. If there are any situations in which it is thought that a change to a DTD is required then the requested change and the reasons for it must be submitted to SGMLSE. If a change is deemed necessary, then the DTD will be changed in the UK and resupplied. This is necessary to maintain consistency in the DTD's being used at both ends in the process.

Files
The SGML files that will be supplied have already been partially processed but will be invalid according to the DTD (especially the tables).

Each file should omit the document type declaration and begin directly with the root element.

Carriage return characters
Carriage return characters must not appear in any element which has #PCDATA within its content model. If it is wished to use carriage return characters to shorten line lengths, then they must be placed in positions where they will be ignored by an SGML parser e.g. in places where #PCDATA is not allowed, or within start and end tags in places where separator characters are allowed.

Case
Element and attribute names are case-insensitive. They may be entered in either uppercase, lowercase or a mixture.

Attribute values are usually case-insensitive. The only time that they are case-sensitive is when they have a declared type of CDATA, in which case the string values should be entered directly as they appear in the text.

-59-

Markup minimisation

No non-empty elements have omissible start or end tags, but the empty end tag </> can be used to end the currently open element. A carriage return character can not occur within an empty end tag.

DTD structure

There are four DTDs and a common element declaration that are used to define the structure of the legislation.

REGS.DTD

This DTD has the public identifier "-//SGMLSE//DTD 1.0 Regulations//EN" and contains the declaration for the regulations. It has two parameter entity references which include "-//SGMLSE//DTD 1.0 Act//EN" and "-//SGMLSE//DTD 1.0 Regulation//EN".

The file *regs.sgm* produced by the Perl script *regs.pl* conforms to regs.dtd and calls in all acts as parameter entities.

ACTS.DTD

This DTD has the public identifier "-//SGMLSE//DTD 1.0 Acts//EN" and contains the declaration for the acts. It has a parameter entity references which includes "-//SGMLSE//DTD 1.0 Act//EN".

The file *acts.sgm* produced by the Perl script *acts.pl* conforms to acts.dtd and calls in all acts as parameter entities.

ACT.DTD

This DTD has the public identifier "-//SGMLSE//DTD 1.0 Act//EN" and contains the declaration of an act.

REG.DTD

This DTD has the public identifier "-//SGMLSE//DTD 1.0 Regulation//EN" and contains the declaration of a regulation.

COMMON.ELT

This list of elements has the public identifier "-//SGMLSE//ELEMENTS 1.0 Common Elements//EN" and includes element and entity definitions common to all document types.

Character entities

The character entities allowed have been selected from the ISO public sets isogrk1, isogrk3, isolat1, isonum, isopub and isotech.

*These characters are translated one-to-one to the equivalent character in the Times New Roman True Type font.*

The <quote> or <blockquote> elements should be used instead to surround any quoted text.

*Use Quotes (") at the beginning and at the end of these elements.*

-60-

Labels and identifiers

The major structural elements - act, reg, part, schedule, section, sub, s-sub, ss-sub, ...
all have a required label attribute (lbl). Unique identifiers should be generated for these
elements. The label for these elements is the preceding number or letter WITHOUT any
punctuation or parentheses. For example :

1979 No. 141 The charge to income tax - REG 1

Income Tax

1. Fred ...

1. (1) This is ...

```
<section type="reg" lbl="1" ID="CWACT-19790141-SEC-1">
<title>Income Tax</>
<list>
<li lbl="1"><p>Fred ...</>
<list>
<li lbl="1"><p>This is ...</>
</list>
</li>
</list>
</section>
```

*Convert list and li items back to the original look in Folio Views, ie to*

*1. Fred ...*

*1. (1) This is ...*

Cross references

All cross references point directly to a target by providing the id of the target as the value
of an attribute of the xref element. For details of the format of cross reference identifier
strings, see the description of the xref element below.

*All ID's are marked unchanged as Jump Destinations (JD's).*

*<SECTION ID="CWACT-19950104-SEC-1" LBL="1">*

*becomes:*

*<JD:" ="CWACT-19950104-SEC-1">*

REGS DTD ELEMENT
REGS

This is the root element of the Regulations. Its definition is :

```
<!ELEMENT    regs - - (title, header?, reg+) >
```

That is, it contains a required title element, followed by an optional header element
followed by 1 or more act element.

-61-

*Not translated*

ACTS DTD ELEMENT
ACTS

This is the root element of the Acts. Its definition is :

```
<!ELEMENT    acts - -  (title, header?, act+) >
```

That is, it contains a required title element, followed by an optional header element followed by 1 or more act element.

*Not translated*

REG DTD ELEMENTS
REG

This is the root element of the dtd for a Regulation. Its definition is :

```
<!ELEMENT reg - - (title, notes?, provisions?, (preamble|long-title)?,
((order+|(section|schedule)+|chapter+|part+),schedule*))>
<!ATTLIST    reg  id  ID  #REQUIRED
                 lbl           CDATA    #REQUIRED
                 insert-date   NUMBER   #IMPLIED
                 insert-leg    IDREF    #IMPLIED
                 repeal-date   NUMBER   #IMPLIED
                 repeal-leg    IDREF    #IMPLIED
                 amend-date    NUMBER   #IMPLIED
                 amend-leg     IDREF    #IMPLIED
>
```

The insert-date attribute should be used to insert the date YYYYMMDD that the REG was inserted. The insert-leg should be used to insert the ID of the legislation that inserted the REG.

The repeal-date attribute should be used to insert the date YYYYMMDD that the REG was repealed. The repeal-leg should be used to insert the ID of the legislation that repealed the REG.

The amend-date attribute should be used to insert the date YYYYMMDD that the REG was amended. The amend-leg should be used to insert the ID of the legislation that amended the REG.

*The title gets marked up as Level "Heading Level 1". The period between the insert-date and the repeal-date or amend-date (that is the period during which the above element was in force) gets marked up as follows:*

*The Folio Views markup used is Groups. See the manual for explanations. We will use three kinds of groups: Inforce-yyyy, Inforce-yyyy-mm and Inforce-yyyy-mm-dd (yyyy can* be any year, mm can be any month from 1 - 12 and dd can be any day from 1 - 31). If the element was valid throughout a year yyyy, the element becomes a member of the Inforce-yyyy group. If the element was valid only for some months within a year, it becomes a member of the relevant Inforce-yyyy-mm groups. If the element was only valid for some days within a month, the element becomes a member of the relevant Inforce-yyyy-mm-dd groups. Example:

If the element was valid from 1/7/94 to 7/4/96, then the element belongs to the following groups:

Inforce-94-07, Inforce-94-08, Inforce-94-09, Inforce-94-10, Inforce-94-11, Inforce-94-12, Inforce-95, Inforce-96-01, Inforce-96-02, Inforce-96-03, Inforce-96-04-01, Inforce-96-04-02, Inforce-96-04-03, Inforce-96-04-04, Inforce-96-04-05, Inforce-96-04-06 and Inforce-96-04-07.

Note that the element is not part of the Inforce-94 group because the element wasn't in force throughout of 1994. Nor is the element part of the Inforce-96-04 group because the element wasn't in force throughout April 1996.

If the enduser wants to search for all elements that are valid as of a particular date then the enduser can enter that date in a Query Template in the form DD/MM/YYYY. The Query Template then searches the Folio Views infobase for all elements that belong to the groups Inforce-yyyy, Inforce-yyyy-mm and Inforce-yyyy-mm-dd.

ACT DTD ELEMENTS

ACT

This is the root element of the dtd for an Act. Its definition is :

```
<!ELEMENT act - - (title, notes?, provisions?, (preamble|long-
title)?, (section+|chapter+|part+|sub+)*, schedule*)>
<!ATTLIST    act id ID #REQUIRED
                date CDATA #IMPLIED
                insert-date  NUMBER    #IMPLIED
                insert-leg   IDREF     #IMPLIED
                repeal-date  NUMBER    #IMPLIED
                repeal-leg   IDREF     #IMPLIED
                amend-date   NUMBER    #IMPLIED
                amend-leg    IDREF     #IMPLIED
>
```

That is, it contains a required title element, followed by optional notes, provisions, and preamble and either one or more reg, order, rule, section, chapter or part elements. It has a required id attribute and implied date attribute

-63-

The insert-date attribute should be used to insert the date YYYYMMDD that the ACT was inserted. The insert-leg should be used to insert the ID of the legislation that inserted the ACT.

The repeal-date attribute should be used to insert the date YYYYMMDD that the ACT was repealed. The repeal-leg should be used to insert the ID of the legislation that repealed the ACT.

The amend-date attribute should be used to insert the date YYYYMMDD that the ACT was amended. The amend-leg should be used to insert the ID of the legislation that amended the ACT.

Examples

1979 No. 141 The charge to income tax

```
<act lbl="141" ID="CWACT-19790141-TXT-0">
<title>1979 No. 141 The charge to income tax</>
```

**1979 No. 141 The charge to income tax*1***

```
<act lbl="141" ID="CWACT-19790141-TXT-0">
<title>1979 No. 141 The charge to income tax<noteref ref="CWACT-19790141-note-1"></>
```

*The noteref gets marked up as a popup link. The text of the note becomes the text within the popup link.*

*Treated the same as Reg DTD Elements. See there for details.*

COMMON ELEMENTS

PART

```
<!ELEMENT part - - (title, (%plevel;)*,
(chapter+|division+|section+)*, notes?)
<!ATTLIST    part id   ID      #REQUIRED
                  lbl  CDATA   #IMPLIED
                  insert-date  NUMBER  #IMPLIED
                  insert-leg   IDREF   #IMPLIED
                  repeal-date  NUMBER  #IMPLIED
                  repeal-leg   IDREF   #IMPLIED
                  amend-date   NUMBER  #IMPLIED
                  amend-leg    IDREF   #IMPLIED
>
```

The insert-date attribute should be used to insert the date YYYYMMDD that the PART was inserted. The insert-leg should be used to insert the ID of the legislation that inserted the PART.

-64-

The repeal-date attribute should be used to insert the date YYYYMMDD that the PART was repealed. The repeal-leg should be used to insert the ID of the legislation that repealed the PART.

The amend-date attribute should be used to insert the date YYYYMMDD that the PART was amended. The amend-leg should be used to insert the ID of the legislation that amended the PART.

Example

```
<PART lbl="1" ID="CWACT-19790141-PT-1">
<title></title>
<p>
```

*The title gets marked up as Level "Heading Level 2". Dates get treated the same way as in Regs DTD Elements. See there for details.*

ORDER

```
<!ELEMENT order - - (title,
(division|section|part|schedule)+)>
<!ATTLIST   order     id ID #REQUIRED
            lbl CDATA #IMPLIED
            insert-date      NUMBER      #IMPLIED
            insert-leg       IDREF       #IMPLIED
            repeal-date      NUMBER      #IMPLIED
            repeal-leg       IDREF       #IMPLIED
            amend-date       NUMBER      #IMPLIED
            amend-leg        IDREF       #IMPLIED
>
```

The insert-date attribute should be used to insert the date YYYYMMDD that the ORDER was inserted. The insert-leg should be used to insert the ID of the legislation that inserted the ORDER.

The repeal-date attribute should be used to insert the date YYYYMMDD that the ORDER was repealed. The repeal-leg should be used to insert the ID of the legislation that repealed the ORDER.

The amend-date attribute should be used to insert the date YYYYMMDD that the ORDER was amended. The amend-leg should be used to insert the ID of the legislation that amended the ORDER.

Example

1979 No. 140 FEDERAL COURT RULES - ORDER 3<
                ORDER 3<
                  TIME<
$$T

```
$$A
$$T
1979 No. 140 FEDERAL COURT RULES - RULE 1<
<ORDER lbl="3" ID="CWACT-19790140-ORD-3">
<title>TIME</title>
<section type="rule" lbl="1" ID="CWACT-19790140-ORD-3.1">
```

*The title gets marked up as Level "Heading Level 2". Dates get treated the same way as in Regs DTD Elements. See there for details.*

DIVISION

```
<!ELEMENT   division - - (title, (sub-division+ | section+)) >
<!ATTLIST   division id  ID       #REQUIRED
            lbl          CDATA    #IMPLIED
            insert-date  NUMBER   #IMPLIED
            insert-leg   IDREF    #IMPLIED
            repeal-date  NUMBER   #IMPLIED
            repeal-leg   IDREF    #IMPLIED
            amend-date   NUMBER   #IMPLIED
            amend-leg    IDREF    #IMPLIED
>
```

The insert-date attribute should be used to insert the date YYYYMMDD that the DIVISION was inserted. The insert-leg should be used to insert the ID of the legislation that inserted the DIVISION.

The repeal-date attribute should be used to insert the date YYYYMMDD that the DIVISION was repealed. The repeal-leg should be used to insert the ID of the legislation that repealed the DIVISION.

The amend-date attribute should be used to insert the date YYYYMMDD that the DIVISION was amended. The amend-leg should be used to insert the ID of the legislation that amended the DIVISION.

Example

1979 No. 140 FEDERAL COURT RULES - DIVISION 1<
    Division 1-General<
$$T
$$A
$$T
1979 No. 140 FEDERAL COURT RULES - RULE 1<
Cases for service of originating process<
<DIVISION lbl="1" ID="CWACT-19790140-DIV-1>
<title>General</title>

-66-

```
<RULE lbl="1" ID="CWACT-19790140-DIV-1.1">
<title> Cases for service of originating process </title>
```
*The title gets marked up as Level "Heading Level 3". Dates get treated the same way as in Regs DTD Elements. See there for details.*

SUB-DIVISION
```
<!ELEMENT    sub-division - -  (title, section+) >
<!ATTLIST    sub-division id ID #REQUIRED
             lbl CDATA #IMPLIED
             insert-date     NUMBER      #IMPLIED
             insert-leg      IDREF       #IMPLIED
             repeal-date     NUMBER      #IMPLIED
             repeal-leg      IDREF       #IMPLIED
             amend-date      NUMBER      #IMPLIED
             amend-leg       IDREF       #IMPLIED
>
```

The insert-date attribute should be used to insert the date YYYYMMDD that the SUB-DIVISION was inserted. The insert-leg should be used to insert the ID of the legislation that inserted the SUB-DIVISION.

The repeal-date attribute should be used to insert the date YYYYMMDD that the SUB-DIVISION was repealed. The repeal-leg should be used to insert the ID of the legislation that repealed the SUB-DIVISION.

The amend-date attribute should be used to insert the date YYYYMMDD that the SUB-DIVISION was amended. The amend-leg should be used to insert the ID of the legislation that amended the SUB-DIVISION.

*The title gets marked up with a Paragraph Style (see Folio Views Infobase Production Kit Manual for details) 'Subdivision'. Dates get treated the same way as in Regs DTD Elements. See there for details.*

PROVISIONS
```
<!ELEMENT    provisions    - -  (title, tblblk) >
```
Example
```
$$NTABLE
                             TABLE  OF  PROVISIONS<
$$P
Order<
$$P
    1.          Preliminary<
$$P
    2.  Sittings and Vacation<
```

```
<PROVISIONS>
<TITLE>TABLE OF PROVISIONS>
<TBLBLK>
  ..
</TBLBLK>
</PROVISIONS>
```

*Provisions get ignored. The Table of Provisions gets generated by the conversion program from the following Elements: Part, Chapter, Order, Division, Subdivision and Section. The generated Table of Provision is stored just before the first Part, Chapter, Order, Division, Subdivision and Section.*

CHAPTER

```
<!ELEMENT chapter - - (title, (%plevel;)*,
(part+|section+|article+)?)>
<!ATTLIST    chapter  id  ID  #REQUIRED
             lbl  CDATA  #IMPLIED
             insert-date     NUMBER    #IMPLIED
             insert-leg      IDREF     #IMPLIED
             repeal-date     NUMBER    #IMPLIED
             repeal-leg      IDREF     #IMPLIED
             amend-date      NUMBER    #IMPLIED
             amend-leg       IDREF     #IMPLIED
>
```

The insert-date attribute should be used to insert the date YYYYMMDD that the CHAPTER was inserted. The insert-leg should be used to insert the ID of the legislation that inserted the CHAPTER The repeal-date attribute should be used to insert the date YYYYMMDD that the CHAPTER was repealed. The repeal-leg should be used to insert the ID of the legislation that repealed the CHAPTER.

The amend-date attribute should be used to insert the date YYYYMMDD that the CHAPTER was amended. The amend-leg should be used to insert the ID of the legislation that amended the CHAPTER.

*The title gets marked up as Level "Heading Level 2". Dates get treated the same way as in Regs DTD Elements. See there for details.*

SECTION

This is a sub element of a Regulation. Its definition is :

```
<!ELEMENT section - - (title, (%unstruct-cont;))>
<!ATTLIST    section  id  ID  #REQUIRED
```

-68-

```
        lbl         CDATA   #IMPLIED
            insert-date     NUMBER      #IMPLIED
            insert-leg      IDREF       #IMPLIED
            repeal-date     NUMBER      #IMPLIED
            repeal-leg      IDREF       #IMPLIED
            amend-date      NUMBER      #IMPLIED
            amend-leg       IDREF       #IMPLIED
    >
```

That is, it contains a required title element, followed by unstructured content. It has a required lbl attribute and a required id attribute.

The insert-date attribute should be used to insert the date YYYYMMDD that the SECTION was inserted. The insert-leg should be used to insert the ID of the legislation that inserted the SECTION.

The repeal-date attribute should be used to insert the date YYYYMMDD that the SECTION was repealed. The repeal-leg should be used to insert the ID of the legislation that repealed the SECTION.

The amend-date attribute should be used to insert the date YYYYMMDD that the SECTION was amended. The amend-leg should be used to insert the ID of the legislation that amended the SECTION.

Examples

1979 No. 141 The charge to income tax - SECT. 1

Income Tax

1979 No. 141 The charge to income tax - REG 2

Tax

3. Income tax shall be charged...

```
<section lbl="1" id="CWACT-1979141-SEC-1">
<title>Income tax</>
<section type="reg" lbl="2" id="CWACT-1979141-SEC-
1.2"><title>Tax</title>
<p>Income tax shall be charged...</>
```

*The title gets marked up as Level "Heading Level 4". Dates get treated the same way as in Regs DTD Elements. See there for details.*

SCHEDULE

This is a sub element of a Regulation. Its definition is :

```
<!ELEMENT schedule  - - (title?, (%unstruct-cont;))>
<!ATTLIST   schedule id  ID      #REQUIRED
            lbl         CDATA   #IMPLIED
            insert-date     NUMBER      #IMPLIED
```

-69-

```
            insert-leg      IDREF     #IMPLIED
            repeal-date     NUMBER    #IMPLIED
            repeal-leg      IDREF     #IMPLIED
            amend-date      NUMBER    #IMPLIED
            amend-leg       IDREF     #IMPLIED
>
```

That is, it contains a required title element, followed by unstructured content. It has a required lbl attribute and a required id attribute.

The insert-date attribute should be used to insert the date YYYYMMDD that the SCHEDULE was inserted. The insert-leg should be used to insert the ID of the legislation that inserted the SCHEDULE.

The repeal-date attribute should be used to insert the date YYYYMMDD that the SCHEDULE was repealed. The repeal-leg should be used to insert the ID of the legislation that repealed the SCHEDULE.

The amend-date attribute should be used to insert the date YYYYMMDD that the SCHEDULE was amended. The amend-leg should be used to insert the ID of the legislation that amended the SCHEDULE.

Examples

1979 No. 141 The charge to income tax - SCHEDULE 1

Income Tax

1. Income tax shall be charged...

```
<schedule lbl="1" id="CWACT-1979141-SCH-1">
<title>Income tax</>
<p>Income tax shall be charged...</>
```

*The title gets marked up as Level "Heading Level 2". Dates get treated the same way as in Regs DTD Elements. See there for details.*

FORM

```
<!ELEMENT    form - -  (title, formreg, front, back?) >
<!ATTLIST    form %reqlbl;
             %reqid;>
```

Each form has a title, regulation, a front and an optional back. Each has a required lbl attribute and a required ID.

Example

FORM A<

Regulation 7<

(Front of Form)<

COMMONWEALTH OF AUSTRALIA<

Trade Practices Act 1974-Sub-section 88 (1)<

-70-

EXCLUSIONARY PROVISIONS:<
APPLICATION FOR AUTHORIZATION<
To the Trade Practices Commission: Application is hereby made under sub-section 88 (1) of the Trade
(Back of Form)<
DIRECTIONS<
1. Where there is insufficient space on this form to furnish the required information, the information is to be shown on separate sheets, numbered consecutively and signed by or on behalf of the applicant.
<FORM lbl="a" ID="CWACT-19790141-FORM-A">
<FORMREG>Regulation 7</FORMREG>
<FRONT>
<ASIS>
COMMONWEALTH OF AUSTRALIA<
    Trade Practices Act 1974-Sub-section 88 (1)<
EXCLUSIONARY PROVISIONS:<
APPLICATION FOR AUTHORIZATION<
To the Trade Practices Commission: Application is hereby made under sub-section 88 (1) of the Trade
</ASIS>
</FRONT>
<BACK>
<ASIS>
DIRECTIONS<
1. Where there is insufficient space on this form to furnish the required information, the information is to be shown on separate sheets, numbered consecutively and signed by or on behalf of the applicant.
</ASIS>
</BACK>
</FORM>

*Forms get marked up with a Paragraph Style 'Forms'. The markup of 'Front' and 'Back' gets inserted as hidden text (hidden text is visible on the screen but doesn't show when the Form gets printed.*

FORM ELEMENTS

FORMREG

```
<!ELEMENT    formreg - - (#PCDATA) >
```
see above example

FRONT

```
<!ELEMENT    front    - - (asis) >
```
see above example

BACK

```
<!ELEMENT    back- -  (asis) >
```
see above example

ASIS

```
<!ELEMENT    asis- -  (#PCDATA) >
```
date is displayed as-is see above example

HEADER ELEMENTS

HEADER

```
<!ELEMENT    header   - - (scope?, updated?) >
```

SCOPE

```
<!ELEMENT    scope    - - (%text;) >
```

UPDATED

```
<!ELEMENT    updated  - - (%text;) >
```

NOTE ELEMENTS

NOTES

```
<!ELEMENT    notes    - O (note+) >
```
List of notes at the start of an act

NOTE

```
<!ELEMENT    note- -  (%plevel;) >
<!ATTLIST note id ID #REQUIRED>
```
A single note

*Forms get marked up with a Paragraph Style 'Forms'. The markup of 'Front' and 'Back' gets inserted as hidden text (hidden text is visible on the screen but doesn't show when the Form gets printed.*

STRUCTURAL ELEMENTS

TITLE

A generic title, which may occur in several different contexts.

*Covered in Acts DTD Elements, Regs DTD Elements and so on.*

INLINE ELEMENTS

BOLD

Used to mark any inline text which is set in a bold face other than a title or a label. It may contain text or any inline elements other than <bold>.

It has no attributes.

-72-

ILEQN

An inline equation. This is a mathematical equation which is embedded in a line of text characters or other inline elements. See the attached description of equations for further details.

ITAL

Used to mark any inline text which is set in a italic face other than a title or a label. It may contain text or any inline elements other than <italic>.

It has no attributes.

QUOTE

A sequence of text characters or inline elements surrounded by single or double paired quotation marks. The quotation mark characters must not be entered as text characters or entity references as they will be generated automatically.

SUBSCR

A Subscript (inferior).

SUPER

A superscript (superior).

*Brought over from SGML to Folio Views with no changes.*

CROSS REFERENCES

NOTEREF

A reference to a NOTE element normally used in a TITLE element

*Implemented as a popup link.*

TEMPREF

A reference to a piece of legislation where the ID is not known. The tempref element will converted to an XREF element at a later date (when the ID is known).

*Not converted.*

RNGREF

A cross reference to a sequential range of targets, e.g. see Sections 3 to 7.

It has two required attributes, startref and endref. Startref is the id of the first of the targets referenced and endref is the id of the last target referenced. For a description of id strings, see the description of the xref element.

*Converted as a Query Link.*

XREF

A cross reference to a single target. It has a single attribute, ref, which must contain the id string of the target of the reference. Ids are not being entered on elements during keying, but will be generated automatically from the lbl attribute of elements. However, for xrefs it is necessary to work out what the id string of the target will be. The format of id strings is described below :

*Converted as a jumplink.*

ID Strings

Cross references to sections of Acts and Act Schedules should be marked up using the xref element as described above.

*********************************************************

Id strings are made up of four sequential fields separated by a "-" (dash) character as follows :

```
field1-field2-field3-field4
``` field 1 is the type of document which is being referenced. The current valid value is ACT.

field2 is an abbreviated form of the year and number of the Act, e.g. 19880001 is 1988 No. 1.

field3 identifies the type of object being referenced. Valid values are :

ORD     order
DIV   division
SCH  schedule in an Act
SEC  section in an Act
CH    chapter in an Act
PT    part in an Act
NOTE    a note field4 is the identifier of the element being referenced, which is formed by concatenating the values of the lbl attributes of the referenced element and its ancestor elements, separated by a "." (point) character. e.g. 1 or 1.1 or 1.1.a or 1.1.a.iv

Examples

```
<section lbl="1"><!-- id is ACT-19790141-SEC-1 -->
<title>The charge to income tax.</ />
<list>
<li lbl="1">
<p>Income tax shall be charged...</ />
```

*Implemented as jumpdestination.*

BLOCK LEVEL ELEMENTS

DPEQN

A display equation. This is a mathematical equation which is set on one or more lines by itself. See the attached description of equations for further details.

It has no attributes.

It has no attributes.

LIST

A list of related lines of text which are not sub, s-sub or ss-sub elements.

LI

An item in a list. This is a single line of text within a list.

It has a single attribute, marker, which has allowed values of bullet, dash or none, with a default of none. If a marker character precedes the list item then the relevant value should be entered for the attribute. The marker character should not be entered as text. If any marker character other than a bullet or dash is found, contact SGMLSE for a change to the DTD.

P

A single line of text.

BLOCKQUOTE

A non-inline quote. The quotation mark characters must not be entered as text characters or entity references as they will be generated automatically

TBLBLK

A container element for a table which has a title. It contains a required title element followed by a single table.

It has no attributes.

*The above elements get implemented either without conversion or using paragraph styles.*

TABLE ELEMENTS

General

Arbortext tables expressed in tagged ASCII form must follow this basic structure:

```
<table>
<rowrule>
for each row
{
    <tablerow>
    <cellrule>
    for each column
    {
        <tablecell>text</tablecell>
        <cellrule>
    }
    </tablerow>
    <rowrule>
}
</table>
```

TABLE

The <table> tag has three required attributes. They must be specified correctly or the table will not be handled properly.

ncols=NUMBER The number of columns in the table. This value MUST agree with the number of columns expressed by the required cwl attribute.

wdm=(25|50|75|100) The numbers indicate the width of the table as a percentage of the page width.

cwl=LIST where LIST is a list of integers each separated by a colon. Each integer represents the relative width of a column.

Example

A four column table which is the full width of the page. The second and third columns are twice the width of the first column, and the fourth column is three times the width of the first :

```
<table ncols="4" wdm="100" cwl="1:2:2:3">
``` or, equivalently,

```
<table ncols="4" wdm="100" cwl="5:10:10:15">
```

CELLRULE

Empty element. Specifies a vertical rule. It has a single attribute, rty, which specifies the type of rule. Valid values for rty are :

"." (point) for a blank rule,
"-" (dash) for a single rule,
"=" (equals) for a double rule,
"+" (plus) for a bold rule.

Example

```
<cellrule rty=".">
``` for a blank rule, or

```
<cellrule rty="-">
``` for a single rule.

ROWRULE

Empty element. Specifies a sequence of horizontal rules, one per cell in the row. It has a single attribute, rtl, which is a colon-delimited list of rule type specifiers. There must be one rule type specifier for each cell in the row. The valid specifiers are as for cellrule above.

Example

For a four-column table

```
<rowrule rtl="-:.:.:-">
``` would draw a horizontal rule above cells one and four.

TABLEROW

Specifies a row in the table. It has a single attribute, hdr, which specifies whether or not the row is a header row in a table which will be repeated over page breaks. The only valid value is "1" (one), which indicates that the row is a header row. An omitted value for hdr indicates that the row is not a header row. A value is only valid on the first <tablerow> in the table.

Example

```
<tablerow hdr="1">
``` indicates that the row is a header row (iff the <tablerow> is the first in the table, else it will generate an error).

```
<tablerow>
``` indicates that the row is not a header row if the <tablerow> is the first in the table.

TABLECELL

Indicates a cell in a row in a table. It has four optional attributes :

chj=(b|l|r|c)   Horizontal justification for that cell.
- b    for both right and left justified,
- l    for flush left,
- r    for flush right,
- c    for centred.

Default: left justified cvj=(t|c|b)   Vertical justification for that cell.
- t    for top justified,
- c    for centred, or
- b    for bottom justified.

Default: top justified spn=INTEGER  For horizontally spanned columns. VAL is a whole number representing how many columns are spanned. Note that for horizontal spans, the text appears in the LEFTMOST cell in the span, and all other cells in the span should be void of text.

Default: 1 vspn=INTEGER For vertically spanned rows. VAL is a whole number representing how many rows are spanned. Note that for vertical spans, the text appears in the LOWEST cell in the span, and all other cells in the span should be void of text.

Default: 1

Arbortext table example

```
---------------------------------------
 |foo          |       fum       |         |
```

-77-

```
|             |              |      fee|
---------------------------------------
|       spanned       |    ugh    |
|             |              |         |
---------------------------------------
```

```
<tbl>
<table wdm="100" cwl="3:4:3">
<rowrule rtl="-:-:-">
<tablerow hdr="1">
<cellrule rty="-">
<tablecell>foo</tablecell>
<cellrule rty="-">
<tablecell chj="c">fum</tablecell>
<cellrule rty="-">
<tablecell chj="r" cvj="b">fee</tablecell>
<cellrule rty="-">
</tablerow>
<rowrule rtl="-:-:-">
<tablerow>
<cellrule rty="-">
<tablecell spn="2" chj="c">spanned</tablecell>
<cellrule rty="-">
<tablecell chj="c">ugh</tablecell>
<cellrule rty="-">
</tablerow>
<rowrule rtl="-:-:-">
</table>
</tbl>
```

*Tables get converted to Microsoft Word tables and then converted into Folio Views.*

EQUATION ELEMENTS

General

This maths DTD is a subset of the Arbortext maths DTD, which itself is derived from the AAP maths DTD.

In maths mode, all spaces are ignored (except in a <phr> element as described below). Correct spacing is handled automatically.

All alphabetical characters and symbols are treated as variables and set in italic face, unless they occur within <phr>, <rm> or <rf> elements.

All numeric characters and operators are set in roman face, unless they occur within an <it> element.

Greek symbols should be entered using the <g> element rather than entity references. E.g. <g>a</g> produces alpha, <g>b</g> beta, etc. Any entity references for Greek characters which appear in equations will be flagged as errors by the parsing program.

B

Bold text in an equation.

DE

Denominator of a fraction.

F

Inline equation.

FD

Display equation.

FEN

Fence. A pair of bracketed delimiters. The attribute lp (left post) defines the type of the left delimiter as below, and the following element rp (right post) defines the type of the right delimiter.

```
<!ATTLIST fen  lp          (par|sqb|cub|ang|vb)    vb   --
          par    left parenthesis        (
          sqb    left square bracket     [
          cub    left curly brace        {
          ang    left angle bracket      <
          vb     left vertical bar       |
-->
```

FR

Fraction.

G

Greek character or characters. Valid characters are :

| char | equivalent entity |
|------|-------------------|
| a | alpha |
| b | beta |
| c | chi |
| d | delta |
| D | Delta |
| e | epsilon |
| 3 | epsiv |
| 4 | phiv |
| f | phis |

| | | |
|---|---|---|
| | F | Phi |
| | g | gamma |
| | G | Gamma |
| | h | eta |
| 5 | i | iota |
| | j | thetav |
| | k | kappa |
| | l | lambda |
| | L | Lambda |
| 10 | m | mu |
| | n | nu |
| | p | pi |
| | 2 | piv |
| | P | Pi |
| 15 | q | thetas |
| | Q | Theta |
| | r | rho |
| | s | sigma |
| | S | Sigma |
| 20 | 9 | rhov |
| | t | tau |
| | u | upsilon |
| | U | Upsilon |
| | v | sigmav |
| 25 | w | omega |
| | W | Omega |
| | x | xi |
| | X | Xi |
| | y | psi |
| 30 | Y | Psi |
| | z | zeta |

INF

Inferior. Subscript in an equation.

IT

35  Italic text in an equation.

NU

Numerator of a fraction.

-80-

OVL

Overline.

PHR

Phrase. In a phrase all characters are set in roman face and keyed space characters are preserved. A phrase is essentially a temporary escape out of maths mode back into normal text mode.

RAD

Radical or root. Contains a radicand (<rcd>), which is the constructs which appear beneath the top horizontal bar, and an optional radix (rdx), which is the power of the root (e.g. square, cube, 4, etc.).

RCD

Radicand. The content of a root construct.

RDX

Radix. The power of a root.

RF

Roman Function. A function name set in roman face, such as log, sin, cos, lim, arg, etc. It differs from the <rm> element in that preceding and following space characters are generated to separate it from surrounding characters.

RM

Roman face. Used to force an alpha character to be displayed in normal face rather than be treated as a variable and displayed in italic face.

RP

Right delimiter of a fence. It has a single attribute, post, which defines the type of the delimiter. Valid values are the same as for the lp attribute of the <fen> element, except that they specify the right hand match for the relevant left post.

SUP

Superior. A superscript in an equation.

UNL

Underline.

Arbortext equation examples

... by multiplying by the fraction -

A
B where -

```
<p>... by multiplying by the fraction -</>
<dpeqn><fr><nu><rm>A</></><de><rm>B</></></></>
<p>where -</p>
```

-81-

... by the formula -
    gross taxable income
    net assets

```
<p>... by the formula -</>
<dpeqn><fr><nu><phr>gross taxable income</></><de><phr>net assets</></></></>
```

*Equations get converted to Microsoft Word equations and then converted into Folio Views. Alternatively equations get converted to images and added to Folio Views as images.*

-82-

APPENDIX E

```
<!SGML "ISO 8879:1986"
--
    ArborText's default SGML declaration, modified to allow
    longer id/idref's, and to use a number of special characters
    within them.
--

CHARSET
    BASESET "ISO 646-1983//CHARSET
     International Reference Version (IRV)//ESC 2/5 4/0"
    DESCSET
                    0    9   UNUSED
                    9    2   9
          11     2   UNUSED
          13     1   13
          14    18   UNUSED
          32    95   32
          127    1   UNUSED
          128   128  "High-order characters"

CAPACITY SGMLREF
          TOTALCAP        200000
          ENTCAP          35000
          ENTCHCAP        35000
          ELEMCAP         35000
          GRPCAP          150000
          EXGRPCAP        35000
          EXNMCAP         35000
          ATTCAP          50000
          ATTCHCAP        35000
          AVGRPCAP        35000
          NOTCAP          35000
          NOTCHCAP        35000
          IDCAP           35000
          IDREFCAP        35000
          MAPCAP          35000
          LKSETCAP        35000
          LKNMCAP         35000

SCOPE   DOCUMENT

SYNTAX
          SHUNCHAR 0 1 2 3 4 5 6 7 8 9 10 11 12 13 14 15 16 17
               18 19 20 21 22 23 24 25 26 27 28 29 30 31 127
    BASESET "ISO 646-1983//CHARSET
          International Reference Version (IRV)//ESC 2/5 4/0"
    DESCSET 0    128   0
```

-83-

```
         128   128   "High-order characters"
    FUNCTION RE 13
             RS  10
             SPACE  32
             TABSEPCHAR 9
    NAMING  LCNMSTRT ""
             UCNMSTRT ""
             LCNMCHAR "-./[]"
             UCNMCHAR "-./[]"
             NAMECASE GENERAL YES
                      ENTITY  NO
    DELIM   GENERAL SGMLREF
             SHORTREF SGMLREF
    NAMES    SGMLREF
    QUANTITY SGMLREF
             ATTCNT      100
             ATTSPLEN    960
             BSEQLEN     960
             DTAGLEN         16
             DTEMPLEN    16
             ENTLVL      16
             GRPCNT      100
             GRPGTCNT    96
             GRPLVL      16
             LITLEN      800
             NAMELEN         64
             NORMSEP         2
             PILEN       1024
             TAGLEN      960
             TAGLVL      24

FEATURES
    MINIMIZE DATATAG NO   OMITTAG YES   RANK   NO   SHORTTAG
    YES
    LINK    SIMPLE NO   IMPLICIT NO   EXPLICIT NO
    OTHER   CONCUR NO   SUBDOC NO   FORMAL YES
    APPINFO NONE>

<!DOCTYPE legislation
    [
    <!--

DTD for Scantext/Abha Legislation - (C) Turn-Key Systems 1997

History:

1997-10-13: fix hist at beginning of regs
```

-84-

```
                1997-10-07: restore <target> tag
                1997-10-02: enhanced support for regulations (hist, unconv etc)
        -->

<!-- useful characters such as — -->
        <!ENTITY % ISOpub public "ISO 8879-1986//ENTITIES Publishing//EN" >
        %ISOpub;

<!-- PARAMETER ENTITIES USED TO SIMPLIFY DTD MARKUP -->
        <!entity % major
        "schedule|intcon|article|annex|clause|chapter|part|division|subdivn|section|subsec|
        reg|subreg"
                -- major levels -->

<!entity % minor "defn|para|subpar1|subpar2|subpar3|subpar4|point"
                -- minor levels -->

<!entity % secreg "section | reg"
                -- used where either sections or regs are appropriate -->

<!entity % level "%major;|%minor;"
                -- all levels -->

<!entity % refs "term|l.ref|h.ref"
                -- references which can be found in normal text -->

<!entity % raw "(rawtext|rawtable|unconverted)*"
                -- material such as forms which remains as raw text -->

<!entity % effect "sc"
                -- typographical effects (more to be added later) -->

<!entity % text "(%refs;|%effect;|#PCDATA)*"
                -- normal text (including refs defined above) -->

<!entity % hnote "hist | note"
                -- hist and note are temporarily interchangeable -->

<!entity % body "(p+|repealed), (%hnote;)*"
                -- body of a legislative element -->

<!entity % lev.id "((label, desc?) | (desc, label?))"
                -- reversible level id -->

<!-- MASTER ELEMENT -->
```

-85-

```
<!element legislation - - (act | regulations)+
    -- Acts and Regs are currently supported -->

<!-- DEFINITIONS OF ACTS AND CONSTITUENT ELEMENTS -->
<!element act        - - (desc, (%hnote; | %raw;)*,
            longtitle, preamble?,
            (chapter+ | part+ | section+),
            schedule*, hist*)>
<!element longtitle  - - (#PCDATA)>
<!element preamble   - - (p+) +(para)>

<!element regulations - - (desc, (%hnote; | %raw;)*,
            (chapter+ | part+ | reg+),
            schedule*, hist*)>

<!-- MAJOR LEVELS -->
<!element chapter  - - (label, desc, (%hnote;)*,
            (((%secreg;)*, part*)   | article+))>
<!element part     - - (label?, desc, hist*,
            (((%secreg;)*, division*) | (article+ | clause+)))>
<!element division - - (label?, desc, (p | %hnote;)*,
            (((%secreg;)*, subdivn*) | clause+))>
<!element subdivn  - - (label?, desc, (%hnote;)*,
            ((%secreg;)+ | clause+))>
<!element section  - - (%lev.id;,
            ((subsec+, (modules | module+)?) | repealed))>
<!element subsec   - - (%lev.id;,
            ((p, (p | note)*, hist*) | (repealed, note*, hist*)))>
<!element modules  - - (%lev.id;,
            module+)>
<!element module   - - (%lev.id;,
            (submod+ | repealed))>
<!element submod   - - (%lev.id;,
            ((p, (p | %hnote; | method | tabloid)*) | (repealed, (%hnote;)*)))>
<!element reg      - - (label?, desc, hist?,
            (subreg+ | repealed))>
<!element subreg   - - (label, desc?, hist?,
            ((p, (p | note)*, hist*) | (repealed, note*, hist*)))>

<!-- SCHEDULES, CONVENTIONS etc -->
<!element schedule - - (label?, desc?, hist*,
            (chapter+ | part+ | section+ | item+ | p+ | tabloid+ | intcon)?,
            %raw;)>
<!element intcon   - - (desc, preamble,
            (part+ | division+ | subdivn+ | article+), annex*)>
<!element annex    - - (label?, desc, p*,
            (part* | division* | clause* | para*))>
```

-86-

```
<!element article  - - (label, desc, p*,
              (division* | clause* | para*))>
<!element clause   - - (((label, desc?) | (desc, label)), p+)>
<!element item     - - (label?, desc?, %body;)>

<!-- DEFINITIONS AND MINOR LEVELS -->
<!element defn     - - (%body;)>
<!element note     - - (label?, p+)>
<!element hist     - - (label?, (p+ | %raw;))>
<!element point    - - (p+)>

<!element para     - - (label?, %body;)>
<!element subpar1  - - (label?, %body;)>
<!element subpar2  - - (label?, %body;)>
<!element subpar3  - - (label?, %body;)>
<!element subpar4  - - (label?, %body;)>

<!element method   - - (%lev.id;, (p | %hnote; | step)+)>
<!element step     - - (label, %body;)>

<!-- COMMON CONSTITUENT ELEMENTS -->
<!element label    - - (%text;)
          -- chapter number, section number, etc. -->
<!element desc     - - (%text;)
          -- chapter name, section name, etc. -->
<!element term     - - (%text;)
          -- defined term -->
<!element repealed - o EMPTY
          -- indicates that the enclosing level has been repealed -->
<!element p        - - (%minor| %refs; | %effect | tabloid | amend | target | #PCDATA)*
          -- textual paragraph at any level -->

<!-- UNCONVERTED MATERIAL -->
<!element unconverted - - CDATA
          -- yet to be converted (eg. complex schedules) -->
<!element rawtext  - - CDATA
          -- unconverted text (eg. forms) -->
<!element rawtable - - CDATA
          -- unconverted tables (eg. amended provisions) -->

<!-- CROSS-REFERENCES -->
<!element l.ref    - - (%text;)   -- legislation ref -->
<!element h.ref    - - (%text;)   -- history ref -->
```

-87-

```
    <!-- AMENDMENT MARKUP -->
    <!element amend    - - (%refs|%effect|quote|#PCDATA)*
        -- amendment = action + text -->
    <!element target   - - (#PCDATA)
5       -- target of amendment -->
    <!element quote    - - (label|desc|p|%level|%refs|%effect|#PCDATA)*
        -- quoted material -->

<!-- PSEUDO-TABLES -->
10  <!element tabloid - - (label?, desc?, (head | row)+)>
    <!element head     - - (cell+)>
    <!element row      - - (cell+)>
    <!element cell     - - (#PCDATA|p)*>

15
    <!-- EFFECTS -->
    <!element sc       - - (#PCDATA) -- small caps -->

20  <!-- ATTRIBUTE LISTS -->
    <!attlist act     juris (cth|nsw|vic|qld|sa|wa|tas|act|nt|imp)
                            #REQUIRED -- jurisdiction     --
                    year   CDATA  #REQUIRED -- year assented  --
                    number CDATA  #REQUIRED -- act number    --
25                  reps   CDATA  #IMPLIED  -- 2nd reading (HR) --
                    senate CDATA  #IMPLIED  -- 2nd reading (Sen) --
                    assent CDATA  #IMPLIED  -- assent date   --
                    cdate  CDATA  #IMPLIED  -- commencement  -->
    <!attlist regulations juris (cth|nsw|vic|qld|sa|wa|tas|act|nt|imp)
30                          #REQUIRED -- jurisdiction     --
                    year   CDATA  #REQUIRED -- year assented  --
                    number CDATA  #REQUIRED -- act number    --
                    reps   CDATA  #IMPLIED  -- 2nd reading (HR) --
                    senate CDATA  #IMPLIED  -- 2nd reading (Sen) --
35                  notified CDATA #IMPLIED -- notification date --
                    cdate  CDATA  #IMPLIED  -- commencement  -->
    <!attlist schedule id   ID     #IMPLIED  -- legislation id --
                    cdate  CDATA  #IMPLIED  -- commencement  --
                    refsec CDATA  #IMPLIED  -- referring section -->
40  <!attlist chapter  id   ID     #IMPLIED  -- legislation id --
                    cdate  CDATA  #IMPLIED  -- commencement  -->
    <!attlist part     id   ID     #IMPLIED  -- legislation id --
                    cdate  CDATA  #IMPLIED  -- commencement  -->
    <!attlist division id   ID     #IMPLIED  -- legislation id --
45                  cdate  CDATA  #IMPLIED  -- commencement  -->
    <!attlist subdivn  id   ID     #IMPLIED  -- legislation id --
                    cdate  CDATA  #IMPLIED  -- commencement  -->
    <!attlist section  id   ID     #IMPLIED  -- legislation id --
```

```
                cdate   CDATA  #IMPLIED  -- commencement  -->
<!attlist subsec  id      ID     #IMPLIED  -- legislation id --
                cdate   CDATA  #IMPLIED  -- commencement  -->
<!attlist reg     id      ID     #IMPLIED  -- legislation id --
                cdate   CDATA  #IMPLIED  -- commencement  -->
<!attlist subreg  id      ID     #IMPLIED  -- legislation id --
                cdate   CDATA  #IMPLIED  -- commencement  -->
<!attlist l.ref   ref     IDREF  #IMPLIED  -- legislation idref -->
<!attlist term    id      ID     #IMPLIED  -- term id        -->
]>
```

We claim:

1. A computer-implemented system for publishing an electronic publication using text-based data, comprising:
- a plurality of predefined portions of text-based data with each predefined portion being stored;
- at least one predefined portion being modified and stored;
- a plurality of linking means of a markup language, each predefined portion of said text-based data and said at least one modified predefined portion of text-based data being encoded with at least one linking means; and
- a plurality of attributes, each attribute being a point on an axis of a multidimensional space for organising said plurality of predefined portions and said at least one modified predefined portion of said text-based data.

2. The system according to claim 1, comprising means for searching within the system.

3. The system according to claim 2, wherein said searching means uses one or more attributes.

4. The system according to claim 2, wherein said searching means uses any predefined portion, any modification of a predefined portion, or any word or phrase within such predefined portion or such modification.

5. The system according to claim 1, further comprising means for searching at least one of said text-based predefined portions of said data using said plurality of attributes, wherein said plurality of attributes are coupled to each of said predefined portions by said respective linking means, and for retrieving one or more of said predefined portions using said plurality of attributes to define a point in said multidimensional space.

6. The system according to claim 1, wherein said markup language is Standard Generalised Markup Language (SGML) or eXtensible Markup Language (XML).

7. The system according to claim 6, wherein said text-based data is encoded using one or more Document Type Definitions (DTD) or Style Sheet Mechanisms (SSM).

8. The system according to claim 1, wherein said linking means comprises any piece of information additional to the body of the text-based data.

9. The system according to claim 8, wherein said linking means is a code or markup that allows departure and destination points to be created between portions of said text-based data.

10. The system according to claim 1, wherein said at least one linking means comprises an identification code for said respective predefined portion.

11. The system according to claim 1, wherein a first database comprises said plurality of predefined portions of text-based data.

12. The system according to claim 11, wherein a second database comprises said plurality of attributes for managing said first database.

13. The system according to claim 1, wherein said predefined portions are encoded with one or more attributes.

14. The system according to claim 1, wherein said respective predefined portion is changed by performing one of the group consisting of adding at least one attribute to said respective predefined portion, deleting at least one attribute from said respective predefined portion, and modifying at least one of the attributes of said respective predefined portion.

15. The system according to claim 1, wherein said respective predefined portion is changed by performing one of the group consisting of adding data to said respective predefined portion, deleting data from said respective predefined portion, and modifying data of said respective predefined portion.

16. The system according to claim 1, wherein said text-based data comprises legislation.

17. The system according to claim 16, wherein each of said plurality of predefined portions of said text-based data is a respective provision of said legislation.

18. The system according to claim 17, wherein said provision is a section or schedule of an Act, or a regulation or schedule of a Regulation(s).

19. The system according to claim 1, wherein each predefined portion is a block of said text-based data, said block being larger than a single word and less than an entire document of said text-based data.

20. A computer readable recording medium for publishing an electronic publication using text-based data, comprising:
- a plurality of predefined portions of text-based data with each predefined portion being stored;
- at least one predefined portion being modified and stored; and
- a plurality of linking means of a markup language, each predefined portion of said text-based data and said at least one modified predefined portion of text-based data being encoded with at least one linking means; and
- a plurality of attributes, each attribute being a point on an axis of a multidimensional space for organising said plurality of predefined portions and said at least one modified predefined portion of said text-based data.

21. The recording medium according to claim 20, wherein means for searching can be used to search the recording medium.

22. The recording medium according to claim 21, wherein said searching means uses one or more attributes.

23. The recording medium according to claim 21, wherein said searching means uses any predefined portion, any modification of a predefined portion, or any word or phrase within such predefined portion or such modification.

24. The recording medium according to claim 20, further comprising means for searching at least one of said predefined portions of said text-based data uses said plurality of attributes, wherein said plurality of attributes are coupled to each of said predefined portions by said respective linking means, and for retrieving one or more of said predefined portions using said plurality of attributes to define a point in said multidimensional space.

25. The recording medium according to claim 20, wherein said markup language is Standard Generalised Markup Language (SGML) or eXtensible Markup Language (XML).

26. The recording medium according to claim 25, wherein said text-based data is encoded using one or more Document Type Definitions (DTD) or Style Sheet Mechanisms (SSM).

27. The recording medium according to claim 20, wherein said linking means comprises any piece of information additional to the body of the text-based data.

28. The recording medium according to claim 27, wherein said linking means is a code or markup that allows departure and destination points to be created between portions of said text-based data.

29. The recording medium according to claim 20, wherein said at least one linking means comprises an identification code for said respective predefined portion.

30. The recording medium according to claim 20, wherein a first database comprises said plurality of predefined portions of said text-based data.

31. The recording medium according to claim 30, wherein a second database comprises said plurality of attributes for managing said first database.

32. The recording medium according to claim 20, wherein said predefined portions are encoded with one or more attributes.

33. The recording medium according to claim 20, wherein said respective predefined portion is changed by performing one of the group consisting of adding at least one attribute to said respective predefined portion, deleting at least one attribute from said respective predefined portion, and modifying at least one of the attributes of said respective predefined portion.

34. The recording medium according to claim 20, wherein said respective predefined portion is changed by performing one of the group consisting of adding data to said respective predefined portion, deleting data from said respective predefined portion, and modifying data of said respective predefined portion.

35. The recording medium according to claim 20, wherein said text-based data comprises legislation.

36. The recording medium according to claim 35, wherein each of said plurality of predefined portions of said text-based data is a respective provision of said legislation.

37. The recording medium according to claim 36, wherein said provision is a section or schedule of an Act, or a regulation or schedule of a Regulation(s).

38. The recording medium according to claim 20, wherein said recording medium is made from one of the group consisting of magnetic media, optical media, and magneto-optical media.

39. The recording medium according to claim 20, wherein each predefined portion is a block of said text-based data, said block being larger than a single word and less than an entire document of said text-based data.

40. A computer-implemented method for publishing an electronic publication using text-based data, comprising the steps of:

providing a plurality of predefined portions of text-based data with each predefined portion being stored;

encoding each predefined portion of said text-based data with at least one linking means of a markup language;

providing at least one predefined portion being modified and stored;

providing a plurality of attributes, each attribute being a point on an axis of a multidimensional space for organising said plurality of predefined portions and said at least one modified predefined portion of said text-based data.

41. The method according to claim 40, comprising the step of searching said text-based data.

42. The method according to claim 41, wherein said searching step uses one or more attributes.

43. The method according to claim 41, wherein said searching step uses any predefined portion, any modification of a predefined portion, or any word or phrase within such predefined portion or such modification.

44. The method according to claim 40, further comprising the step of searching at least one of said predefined portions of said text-based data using said plurality of attributes, wherein said plurality of attributes are coupled to each of said predefined portions by said respective linking means, and for retrieving one or more of said predefined portions using said plurality of attributes to define a point in said multidimensional space.

45. The method according to claim 40, wherein said markup language is Standard Generalised Markup Language (SGML) or eXtensible Markup Language (XML).

46. The method according to claim 45, wherein said text-based data is encoded using one or more Document Type Definitions (DTD) or Style Sheet Mechanisms (SSM).

47. The method according to claim 40, wherein said linking means comprises any piece of information additional to the body of the text-based data.

48. The method according to claim 47 wherein said linking means is a code or markup that allows departure and destination points to be created between portions of said text-based data.

49. The method according to claim 40, wherein said at least one linking means comprises an identification code for said respective predefined portion.

50. The method according to claim 40, wherein a first database comprises said plurality of predefined portions of said text-based data.

51. The method according to claim 50, wherein a second database comprises said plurality of attributes for managing said first database.

52. The method according to claim 40, wherein said predefined portions are encoded with one or more attributes.

53. The method according to claim 40, wherein said respective predefined portion is changed by performing one of the group consisting of adding at least one attribute to said respective predefined portion, deleting at least one attribute from said respective predefined portion, and modifying at least one of the attributes of said respective predefined portion.

54. The method according to claim 40, wherein said respective predefined portion is changed by performing one of the group consisting of adding data to said respective predefined portion, deleting data from said respective predefined portion, and modifying data of said respective predefined portion.

55. The method according to claim 40, wherein said text-based data comprises legislation.

56. The method according to claim 55, wherein each of said plurality of predefined portions of text-based data is a respective provision of said legislation.

57. The method according to claim 56, wherein said provision is a section or schedule of an Act, or a regulation or schedule of a Regulation(s).

58. The method according to claim 40, wherein each predefined portion is a block of said text-based data, said block being larger than a single word and less than an entire document of said text-based data.

* * * * *

(12) EX PARTE REEXAMINATION CERTIFICATE (6801st)
United States Patent
Schnelle et al.

(10) Number: US 6,233,592 C1
(45) Certificate Issued: May 5, 2009

(54) SYSTEM FOR ELECTRONIC PUBLISHING

(75) Inventors: Christoph Schnelle, New South Wales (AU); Abha Lessing, New South Wales (AU); Peter Mariani, New South Wales (AU)

(73) Assignee: Time Base Pty Limited, Sydney, New South Wales (AU)

Reexamination Request:
No. 90/008,450, Jan. 29, 2007

Reexamination Certificate for:
Patent No.: 6,233,592
Issued: May 15, 2001
Appl. No.: 09/108,999
Filed: Jul. 1, 1998

Related U.S. Application Data

(63) Continuation of application No. PCT/AU98/00050, filed on Jan. 30, 1998.

(51) Int. Cl.
*G06F 17/30* (2006.01)
*G06F 17/21* (2006.01)

(52) U.S. Cl. .............................. 715/205; 707/E17.013; 715/848

(58) Field of Classification Search ................. 715/205, 715/848; 707/E17.013
See application file for complete search history.

(56) References Cited

U.S. PATENT DOCUMENTS

| | | | |
|---|---|---|---|
| 4,558,413 A | 12/1985 | Schmidt et al. |
| 4,627,019 A | 12/1986 | Ng |
| 4,714,992 A | 12/1987 | Gladney et al. |
| 4,853,843 A | 8/1989 | Ecklund |
| 4,875,159 A | 10/1989 | Cary et al. |
| 5,287,496 A | 2/1994 | Chen et al. |
| 5,302,660 A | 4/1994 | Klinksiek et al. |
| 5,355,472 A | 10/1994 | Lewis |
| 5,732,257 A | 3/1998 | Atkinson et al. |
| 5,740,425 A | 4/1998 | Povilus |
| 5,835,087 A | 11/1998 | Herz et al. |
| 5,892,513 A | 4/1999 | Fay |
| 5,935,210 A | 8/1999 | Stark |
| 5,963,208 A | 10/1999 | Dolan et al. |
| 6,026,388 A | 2/2000 | Liddy et al. |
| 6,144,962 A | 11/2000 | Weinberg et al. |
| 6,185,576 B1 | 2/2001 | McIntosh |
| 6,189,019 B1 | 2/2001 | Blumer et al. |
| 6,421,656 B1 | 7/2002 | Cheng et al. |
| 6,502,101 B1 | 12/2002 | Verprauskus et al. |
| 6,529,905 B1 | 3/2003 | Bray et al. |
| 6,542,911 B2 | 4/2003 | Chakraborty et al. |
| 6,581,062 B1 | 6/2003 | Draper et al. |
| 6,584,459 B1 | 6/2003 | Chang et al. |
| 6,584,480 B1 | 6/2003 | Ferrel et al. |
| 6,601,065 B1 | 7/2003 | Nelson et al. |

(Continued)

OTHER PUBLICATIONS

Kim, H. et al., "OOHS: An Object–Oriented Hypermedia System", 20th Annual International Computer Software and Applications Conference (Compsac), Seoul, Korea, Aug. 21–23, 1996, pp. 496–501, XP000684382 IEEE Comp. Soc. Los Alamitos, California, US ISBN: 0–8186–7579–9.

(Continued)

*Primary Examiner*—Majid A. Banankhah

(57) ABSTRACT

The present invention relates to a method, apparatus and system for publishing electronic information. The system includes a plurality of predefined portions of data with each predefined portion being encoded with at least one linking means. For each predefined portion, each predefined portion is stored and, where such predefined portion has been modified, each such modified predefined portion is stored. Further, the system has a plurality of attributes. Each attribute is a point on an axis of a multidimensional space for organizing the data. The plurality of predefined portions of the data may be encoded using Standard Generalized Markup Language (SGML) OR XML. Still further, the data is encoded using one or more Document Type Definitions (DTD) or Style Sheet Mechanisms (SSM).

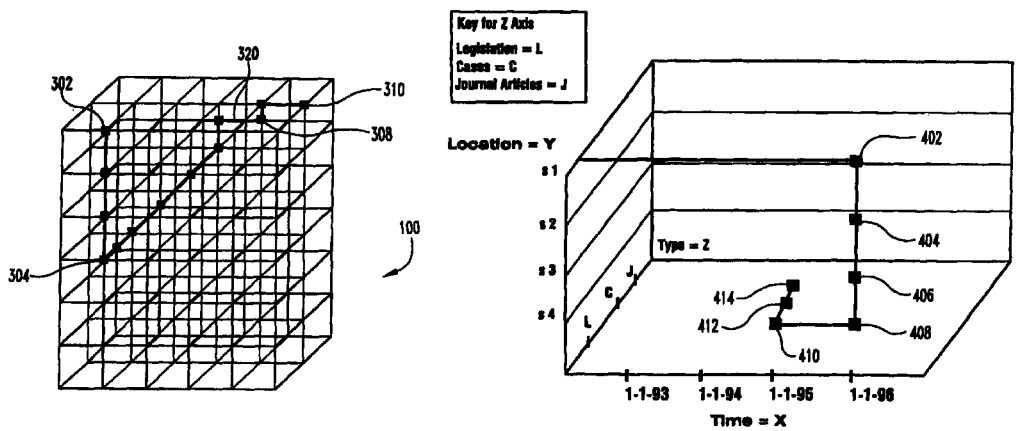

U.S. PATENT DOCUMENTS

| | | | |
|---|---|---|---|
| 6,606,653 | B1 | 8/2003 | Ackermann, Jr. et al. |
| 6,636,845 | B2 | 10/2003 | Chau et al. |
| 6,643,633 | B2 | 11/2003 | Chau et al. |
| 6,708,186 | B1 | 3/2004 | Claborn et al. |
| 6,721,727 | B2 | 4/2004 | Chau et al. |
| 6,772,139 | B1 | 8/2004 | Smith, III |
| 6,823,495 | B1 | 11/2004 | Vedula et al. |
| 6,826,726 | B2 | 11/2004 | Hsing et al. |
| 6,832,219 | B2 | 12/2004 | Lal |
| 6,836,778 | B2 | 12/2004 | Manikutty et al. |
| 6,853,997 | B2 | 2/2005 | Wotring et al. |
| 6,886,005 | B2 | 4/2005 | Davis |
| 6,944,817 | B1 | 9/2005 | Danneels |
| 6,947,945 | B1 | 9/2005 | Carey et al. |
| 7,075,536 | B1 | 7/2006 | Goldschmidt |
| 7,281,206 | B2 | 10/2007 | Schnelle et al. |
| 7,293,228 | B1 | 11/2007 | Lessing et al. |
| 7,363,310 | B2 | 4/2008 | Schnelle et al. |
| 2001/0047372 | A1 | 11/2001 | Gorelik et al. |
| 2002/0010700 | A1 | 1/2002 | Wotring et al. |
| 2002/0010711 | A1 | 1/2002 | Nakanishi et al. |
| 2002/0023091 | A1 | 2/2002 | Silberberg et al. |
| 2002/0116371 | A1 | 8/2002 | Dodds et al. |
| 2002/0120630 | A1 | 8/2002 | Christianson et al. |
| 2002/0129052 | A1 | 9/2002 | Glazer et al. |
| 2002/0133484 | A1 | 9/2002 | Chau et al. |
| 2002/0133497 | A1 | 9/2002 | Draper et al. |
| 2002/0156811 | A1 | 10/2002 | Krupa |
| 2002/0169788 | A1 | 11/2002 | Lee et al. |
| 2002/0194357 | A1 | 12/2002 | Harris et al. |
| 2003/0041305 | A1 | 2/2003 | Schnelle et al. |
| 2003/0070144 | A1 | 4/2003 | Schnelle et al. |
| 2003/0140308 | A1 | 7/2003 | Murthy et al. |
| 2003/0167456 | A1 | 9/2003 | Sabharwal |
| 2003/0177443 | A1 | 9/2003 | Schnelle et al. |
| 2003/0226108 | A1 | 12/2003 | Oezgen |
| 2004/0139327 | A1 | 7/2004 | Brown et al. |
| 2004/0183831 | A1 | 9/2004 | Ritchy et al. |
| 2004/0220927 | A1 | 11/2004 | Murthy et al. |
| 2005/0278475 | A1 | 12/2005 | Karatal et al. |
| 2006/0181531 | A1 | 8/2006 | Goldschmidt |
| 2007/0192246 | A1 | 8/2007 | Futamase |

OTHER PUBLICATIONS

Arnold–Moore, T. et al., "The ELF Data Model and SGQL Query Language for Structured Document Databases", 6th Australasian Database Conference, ADC '95, Adelaide, AU, vol. 17, No. 2, Jan. 30–31, 1995, pp. 17–26, XP002204886 Australian Computer Science Communications ISSN: 0157–3055.

Promenschenkel, G., "Steps Toward a New Era in Electronic Publishing", OCLC Newsletter No. 216, published by OCLC, MC104, 6565 Frantz Road, Dublin, Ohio 43017–3395 Jul./Aug. 1995.

"DB2 Universal database XML extender: Web–Enabling you Data with XML", IBM product information sheet 200, 2pages.

ActiveText Datasheet, available at: http://web.archive.org/web/19970630042435/www.ais.co.uk/atds.html, 1997.

Arnold–Moore et al. "Connected to the Law: Tasmanian Legislation Using EnAct", InQuirion Pty Ltd., 2002.

Arnold–Moore et al. "Models for Structured Document Database Systems", Royal Melbourne Institute of Technology, 1998.

Arnold–Moore, "Automatic Generation of Amendment Legislation", ACM 1997.

Arnold–Moore, "Automatically, Processing Amendments to Legislation", ACM 1995.

Search Report of Corresponding European Appl. No. 98 901 249.7—1527.

Shanmugasundaram et al., Efficiently Publishing Relational Data as XML Documents, Google Apr. 2001, pp. 133–154.

Arnold–Moore, Timothy and Sacks–Davis, Ron; Databases of Legislation: the Problems of Consolidations, Collaborative Information Technology Research Institute, May 15, 1994.

Azaria, "SGML: A Lifesaver in a Sea of Electronic Documents," Network World, 11/50, Dec. 12, 1994, 67.

Baru, Chaitanya, "Xviews: XML Views of Relational Schemas" San diego Supercomputer Center Technical Report, SDSC TR–100–3, Oct. 1999, 18 pages.

Communication pursuant to Article 115(2) and responsive to "WR Communication pursuant to Article 115(c) EPC, Nov. 30, 2006" EPC, Jan. 26, 2007.

Davis, "Hypertext Link Integrity", Dec. 1999, pp. 1–6.

Dayen, Igor, "Storing XML is Relational Databases", XML.com, www.xml.com/lpt/a/803, Jun. 20, 2001, pp. 1–13. Also Available at: http://www.xml.com/pub/a/2001/06/20/databases.html.

DeRose et al., XML.Xlink Requirements Version 1.0, Feb. 1999, W3C, pp. 1–15.

Office Action of Corresponding European Appl. No. 98 901 249.7—1527, Jan. 25, 2007.

Office Action of Corresponding European Appl. No. 98 901 249.7—1527, Jan. 28, 2005.

DeRose, W3C: XML Linking Language Xlink, Dec. 20, 2000, W3C, Version 1.0 pp. 1–27.

Duchame, "Links that are More Valuable than the Information they Link", Jul. 25, 1998, xml.com, pp. 1–3.

Duhig, "Separating Links from Content using XML, Xlink and Xpointer", May 2001, Internationales Congress Centrum (ICC), pp. 1–19.

Eisenberg et al., "SQL/XML is Making Good Progress", SIGMOD Record, vol. 31, No. 2, Jun. 2002, pp. 101–108.

Eckert, "Processing Hypertext Links after Xlink", 2004, pp.1–58.

Fong et al., "Converting Relational Databases into XML Document", IEEE 2001, pp. 61–65.

Freeman, Simon and Callum, Euan; A Brief History of Time Travel; Legal Information Management 4 (2004) pp. 28–30.

Harold, Elliotte Rusty, XML: Extesible Markup Lnguage, IDG Boks Worldwide Inc., Foster City 1198, pp. 32–39, 57–59, 66–70 and 96–99.

http://www.butterworths.com/about/index.htm, 2006.

http://www.complinet.com/home/about, 2006.

http://www.complinet.com/home/news_rules/, 2006.

http://www.complinet.com/home/share/pdf/news_rules/uk/companylaw_NR_insert.pdf, 2006.

http://www.pendragon.co.uk/perspective, 2001.

http://www.pendragon.co.uk/perspective/perspective2.htm, 2001.

http://www.pendragon.co.uk/perspective/perspective3.htm, 2001.

http:/www.sweetandmaxwell.co.uk/about/history.html, 2006.

http://www.sweetandmaxwell.co.uk/westlaw/about.htm, 2006.

http://www.sweetandmaxwell.co.uk/westlaw/pdfs/user_guide.pdf, 2006.

Jan. 18, 2007 letter enclosing website entitled "The Information Society Creative Awards 1996", available at: http://met.open.ac.uk/isca/, 1996.

Jan. 19, 2007 letter in response to Jan. 18, 2007 letter enclosing website entitled "The Information Society Creative Awards 1996", available at: http://met.open.ac.uk/isca/, 1996.

Khan et al., "A performance Evaluation of Storing XML Data in Relational Database Management Systems", ACM 2001, pp. 31–38.

Legal Database program entitled Status utilizing Folio Bound Views, Pub 1994.

Lim et al., "An Automated Approach for Retrieving Hierarchical Data from HTML Tables", CIKM '99, Nov. 1999, Kansas City, MO, USA, pp. 466–474.

Lowe et al., "Improving Web Linking Using Xlink", Jul. 2001, pp. 1–19.

Maioli C. et al., "Versioning Issues in a Collaborative Distributed Hypertext System" Technical Report Universita Di Bologna, Apr. 1993.

Maler, "XML and Broken Links (How can the XML Pointer Language, Xlink and Xpointer help Solve the Problem of Broken Links on the Net?", Mar. 1998, p. 1.

McFall et al. "Automatically Finding and Repairing Broken Links Between XML Documents", Dec. 1998, Department of Computer Science, Michigan State University, pp. 1–18.

Morrison Michael et al. XML Unleashed, Sam's Publishing Indianapolis, IN, Dec. 1999, pp. 398–415, 482–489, 506–507 and 518–519.

Nambiar et al., "Current Approaches to XML Management", IEEE 2002, pp. 43–51.

Office Action of Corresponding European Appl. No. 98 901 249.7—1527, Feb. 27, 2008.

P. Francois, "Generalized SGML repositories: Requirements and modeling", Computer Standards and Interfaces, vol. 18, No. 1, 1996 pp. 11–24, XP004006104, Elsevier Sequoia, Lausanne, CH ISSN: 0920–5489.

Sacks–Davis et al. "Database Systems for Structured Documents", International Symposium on Advanced Database Technologies and Their Integration, Japan, 2002.

Sacks–Davis et al., "A Standards–Based Approach to Combining Information Retrieval and Database Functionality", International Journal of information Technology, 1(1):1–15, 1995.

Simpson, "Top Ten Tips to using Xpath and Xpointer", Aug. 21, 2002, xml.com, pp. 1–12.

Sturm, Jake Developing XML Solutions, Microsoft Press, Redmond, WA 2000, pp. 287–289, 347–348 and 359–366.

Third Party Observation Under Article 115 EPC filed Apr. 11, 2007 in EP 98901249.7.

Third Party Observation Under Article 115 EPC filed Nov. 23, 2006 in EP 98901249.7.

Wang, Wen Qiang et al., "XstorM: A Scalable Mapping Scheme for XML Data", World Wide Web, vol. 4, Nos. 1–2, Mar. 2001, pp. 101–119.

XML–Sitemaps, Find and Fix Broken Links, 2005–2005, XML–Sitemaps, pp. 1–8.

Xsoft Astoria—http://www.architag.com/tag/Article.asp?v=10&i=4&p=8&s=1.

Xsoft Premieres Astoria: A simpler Way to Manage "Mega–Documents" dated Mar. 12, 1996—http://www.highbeam.com/doc/1G1–18079234.html.

Xsoft, A division of Xerox updated Jul. 12, 1996—http://xml.coverpages.org/duCharme–sgmldbms.html.

Zhu, Yan et al., "Data Transformation for Warehousing Web Data", WECWIS, Jun. 21–22, 2001, pp. 74–85.

Communication from Applicant Responsive to Jul. 25, 2002 Search Report in in EP 98901249.7., Oct. 1, 2002.

Communication from Applicant Responsive to Sep. 8, 2005 Communication in in EP 98901249.7., Sep. 19, 2005.

Communication from Applicant Responsive to Jan. 25, 2007 Communication in in EP 98901249.7., Apr. 5, 2007.

Communication from Applicant Responsive to Apr. 23, 2007 Communication in in EP 98901249.7., Jun. 25, 2007.

Arnold–Moore T. et al: ("The ELF data Model and SGQL Query Language for Structured Document Databases", Sixth Australasian Database Conference, ADC '95, Adelaide, AU, vol. 17, No. 2, Jan. 30, 1995–Jan. 31, 1995, pp. 17–26—with annotations.

Rule 26(f) Report dated Jun. 21, 2007 for *Timebase Pty Ltd.* v. *The Thomson Corp.*, Case No. 07 CV 1687 (D. Minn.).

Electronic Discovery Protocol filed with Rule 26(f) Report dated Jun. 21, 2007 for *Timebase Pty Ltd.* v. *The Thomson Corp.*, Case No. 07 CV 1687 (D. Minn.).

Plaintiff's Proposed Protective Order filed with Rule 26(f) Report dated Jun. 21, 2007 for *Timebase Pty Ltd.* v. *The Thomson Corp.*, Case No. 07 CV 1687 (D. Minn.).

Defendant's Proposed Protective Order filed with Rule 26(f) Report dated Jun. 21, 2007 for *Timebase Pty Ltd.* v. *The Thomson Corp.*, Case No. 07 CV 1687 (D. Minn.).

Transcript of Proceedings filed Feb. 26, 2008 for *Timebase Pty Ltd.* v. *The Thomson Corp.*, Case No. 07 CV 1687 (D. Minn.).

Letter from Grey Plant & Moody dated Jun. 1, 2007 for *Timebase Pty Ltd.* v. *The Thomson Corp.*, Case No. 07 CV 1687 (D. Minn.).

Letter from Niro, Scavone, Haller & Niro dated Dec. 21, 2007 for *Timebase Pty Ltd.* v. *The Thomson Corp.*, Case No. 07 CV 1687 (D. Minn.).

Letter from Faegre and Benson dated Dec. 20, 2007 for *Timebase Pty Ltd.* v. *The Thomson Corp.*, Case No. 07 CV 1687 (D. Minn.).

Letter from Faegre and Benson dated Apr. 1, 2008 for *Timebase Pty Ltd.* v. *The Thomson Corp.*, Case No. 07 CV 1687 (D. Minn.).

Letter from Niro, Scavone, Haller & Niro dated Apr. 17, 2008 for *Timebase Pty Ltd.* v. *The Thomson Corp.*, Case No. 07 CV 1687 (D. Minn.).

Motion to Stay Litigation Pending Reexamination Proceedings dated Jun. 14, 2007 for *Timebase Pty Ltd.* v. *The Thomson Corp.*, Case No. 07 CV 1687 (D. Minn.).

Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 1 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 2 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 3 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 4 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 5 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 6 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 7 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 8 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Exhibit 9 for Defendant's Memorandum in Support of Motion to Stay Litigation Pending Reexamination Proceedings dated Jun. 14, 2008 for *Timebase Pty Ltd.* v. *The Thomson Corp.*, Case No. 07 CV 1687 (D. Minn.).

Timebase's Response to Thompson's Motion to Stay dated Jun. 21, 2007 for *Timebase Pty Ltd.* v. *The Thomson Corp.*, Case No. 07 CV 1687 (D. Minn.).

Exhibit A for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit B for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit C for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit D for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit E for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit F for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit G for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit H for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit I for Timebase's Response to Thompson's Motion to Stay dated Jun. 21, 2007 for *Timebase Pty Ltd.* v. *The Thomson Corp.*, Case No. 07 CV 1687 (D. Minn.).

Exhibit J for Timebase's Response to Thompson's Motion to Stay dated Jun. 21, 2007 for *Timebase Pty Ltd.* v. *the Thomson Corp.*, Case No. 07 CV 1687 (D. Minn.).

Order dated Feb. 7, 2008 for *Timebase Pty Ltd.* v. *The Thomson Corp.*, Case No. 07 CV 1687 (D. Minn.).

Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Exhibit 1 for Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Exhibit 2 for Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Exhibit 3 for Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Exhibit 4 for Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Exhibit 5 for Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Exhibit 6 for Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Exhibit 7 for Index to Exhibits for Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 1687 (D. Minn.).

Complaint dated Jan. 24, 2007 for *Timebase Pty Ltd.* v. *The Thomson Corp.*, Case No. 07 CV 1687 (D. Minn.).

Document 19–3 Complaint dated Mar. 28, 2007 for *Timebase Pty Ltd.* v. *The Thomson Corp.*, Case No. 07 CV 1687 (D. Minn.).

Plaintiff's Motion for Leave to Serve and File Amended Complaint dated May 10, 2007 for *Timebase Pty Ltd.* v. *The Thomson Corp.*, Case No. 07 CV 1687 (D. Minn.).

Exhibit A Amended Complaint dated May 10, 2007 for *Timebase Pty Ltd.* v. *The Thomson Corp.*, Case No. 07 CV 1687 (D. Minn.).

Plaintiff's Memorandum in Support of Motion for Leave to Serve and File Amended Complaint dated May 10, 2007 for *Timebase Pty Ltd.* v. *The Thomson Corp.*, Case No. 07 CV 1687 (D. Minn.).

Stipulation to Plaintiff's Amended Complaint dated Jun. 1, 2007 for *Timebase Pty Ltd.* v. *The Thomson Corp.*, Case No. 07 CV 1687 (D. Minn.).

Order dated Jun. 6, 2007 for *Timebase Pty Ltd.* v. *The Thomson Corp.*, Case No. 07 CV 1687 (D. Minn.).

Amended Complaint dated Jun. 18, 2007 for *Timebase Pty Ltd.* v. *The Thomson Corp.*, Case No. 07 CV 1687 (D. Minn.).

Defendants' Joint Answer and Defenses to Plaintiff's Amended Complaint dated Jun. 18, 2007 for *Timebase Pty Ltd.* v. *The Thomson Corp.*, Case No. 07 CV 1687 (D. Minn.).

Notice of Motion dated Feb. 9, 2007 for *Timebase Pty Ltd.* v. *The Thomson Corp.*, Case No. 07 CV 1687 (D. Minn.).

Defendant Thompson Corporation's Motion to Transfer Venue to the District of Minnesota and for a More Definite Statement dated Feb. 9, 2007, for *Timebase Pty Ltd.* v. *The Thomson Corp.*, Case No. 07 CV 1687 (D. Minn.).

Declaration of Andrew Martens dated Feb. 9, 2007 for *Timebase Pty Ltd.* v. *The Thomson Corp.*, Case No. 07 CV 1687 (D. Minn.).

Declaration of Chad Drown dated Feb. 9, 2007 for *Timebase Pty Ltd.* v. *The Thomson Corp.*, Case No. 07 CV 1687 (D. Minn.).

Exhibits A–D for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).

Exhibits E–H for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).

Exhibit I for Defendant Thompson Corporation's Motion to Transfer Venue to the District of Minnesota and for a More Definite Statement dated Feb. 9, 2007 for *Timebase Pty Ltd.* v. *The Thomson Corp.*, Case No. 07 CV 1687 (D. Minn.).

Timebase's Response to The Thompson Corporation's Motion to Transfer dated Feb. 26, 2007 for *Timebase Pty Ltd.* v. *The Thomson Corp.*, Case No. 07 CV 1687 (D. Minn.).

Exhibits 1–5 for Timebase's Response to The Thompson Corporation's Motion to Transfer dated Feb. 26, 2007 for *Timebase Pty Ltd.* v. *The Thomson Corp.*, Case No. 07 CV 1687 (D. Minn.).

Defendant Thompson Corporation's Reply Brief in Support of its Motion to Transfer Venue to the District of Minnesota and for a More Definite Statement dated Mar. 5, 2007 for *Timebase Pty Ltd.* v. *The Thomson Corp.*, Case No. 07 CV 1687 (D. Minn.).

Second Declaration of Andrew Martens dated Mar. 5, 2007 for *Timebase Pty Ltd.* v. *The Thomson Corp.*, Case No. 07 CV 1687 (D. Minn.).

Certificate of Service dated Mar. 5, 2007 for *Timebase Pty Ltd.* v. *The Thomson Corp.*, Case No. 07 CV 1687 (D. Minn.).

Court Docket Entry dated Mar. 9, 2007 for *Timebase Pty Ltd.* v. *The Thomson Corp.*, Case No. 07 CV 1687 (D. Minn.).

Memorandum Opinion and Order dated Mar. 9, 2007 for *Timebase Pty Ltd.* v. *The Thomson Corp.*, Case No. 07 CV 1687 (D. Minn.).

Document 19–1 Copy of Memorandum Opinion and Order dated Mar. 28, 2007 for *Timebase Pty Ltd.* v. *The Thomson Corp.*, Case No. 07 CV 1687 (D. Minn.).

Cover Letter for Transfer of Case dated Mar. 26, 2007 for *Timebase Pty Ltd.* v. *The Thomson Corp.*, Case No. 07 CV 1687 (D. Minn.).

Rule 26(f) Report (Patent Cases) for *Timebase Pty Ltd.* v. *The Thomson Corp.*, Case No. 07 CV 4551 (D. Minn.).

Timebase's First Set of Requests for the Production of Documents (Nos. 1–40) to The Thompson Corporation dated Mar. 3, 2008 for *Timebase Pty Ltd.* v. *The Thomson Corp.*, Case No. 07 CV 4551 (D. Minn.).

Timebase's First Set of Requests for the Production of Documents (Nos. 1–40) to West Publishing Corporation dated Mar. 3, 2008 for *Timebase Pty Ltd.* v. *The Thomson Corp.*, Case No. 07 CV 4551 (D. Minn.).

Timebase's First Set of Requests for the Production of Documents (Nos. 1–40) to West Services Inc. dated Mar. 3, 2008 for *Timebase Pty Ltd.* v. *The Thomson Corp.*, Case No. 07 CV 4551 (D. Minn.).

Defendant The Thompson Corporation's Objections to Plaintiff Timebase's First Set of Requests for Production of Documents (Nos. 1–40) dated Apr. 7, 2008 for *Timebase Pty Ltd.* v. *The Thomson Corp.*, Case No. 07 CV 4551 (D. Minn.).

Defendants' First Set of Requests for Production of Documents and Things to Plaintiff Timebase Pty Ltd. dated Apr. 3, 2008 for *Timebase Pty Ltd.* v. *The Thomson Corp.*, Case No. 07 CV 4551 (D. Minn.).

Defendant Thompson Corporation's Objections and Responses to Plaintiff Timebases's First Set of Requests for Production of Documents (Nos. 1–40) dated Apr. 24, 2008 for *Timebase Pty Ltd.* v. *The Thomson Corp.*, Case No. 07 CV 4551 (D. Minn.).

Defendant West Corporation's Objections and Responses to Plaintiff Timebase's First Set of Requests for Production of Documents (Nos. 1–40) dated Apr. 24, 2008 for *Timebase Pty Ltd.* v. *The Thomson Corp.*, Case No. 07 CV 4551 (D. Minn.).

Defendant West Services, Inc.'s Objections and Responses to Plaintiff Timebase's First Set of Requests for Production of Documents (Nos. 1–40) dated Apr. 24, 2008 for *Timebase Pty Ltd.* v. *The Thomson Corp.*, Case No. 07 CV 4551 (D. Minn.).

Timebase's Response to Defendant's First Set of Requests for Production of Documents (Nos. 1–49) dated May 5, 2008 for *Timebase Pty Ltd.* v. *The Thomson Corp.*, Case No. 07 CV 4551 (D. Minn.).

Transcript of Proceedings Re. Defendants' Motion to Consolidate dated Jan. 24, 2008 for *Timebase Pty Ltd.* v. *The Thomson Corp.*, Case No. 07 CV 4551 (D. Minn.).

Transcript of Proceedings Re. Defendants' Motion to Consolidate (filed Feb. 26, 2008) dated Jan. 24, 2008 for *Timebase Pty Ltd.* v. *The Thomson Corp.*, Case No. 07 CV 4551 (D. Minn.).

Transcript of Proceedings Re. Defendants' Motion to Stay (filed Feb. 26, 2008) for *Timebase Pty Ltd.* v. *The Thomson Corp.*, Case No. 07 CV 4551 (D. Minn.).

Timebase's Interrogatories Nos. 1–5 for the Defendant, The Thompson Corporation dated Mar. 24, 2008 for *Timebase Pty Ltd.* v. *The Thomson Corp.*, Case No. 07 CV 4551 (D. Minn.).

Timebase's Interrogatories Nos. 1–5 for the Defendant, West Publishing Corporation dated Mar. 24, 2008 for *Timebase Pty Ltd.* v. *The Thomson Corp.*, Case No. 07 CV 4551 (D. Minn.).

Timebase's Interrogatories Nos. 1–5 for the Defendant, West Services, Inc. dated Mar. 24, 2008 for *Timebase Pty Ltd.* v. *The Thomson Corp.*, Case No. 07 CV 4551 (D. Minn.).

Defendant West Publishing Corporation's Objections to Plaintiff Timebase's First Set of Requests for Production of Documents (Nos. 1–40) dated Apr. 7, 2008 for *Timebase Pty Ltd.* v. *The Thomson Corp.*, Case No. 07 CV 4551 (D. Minn.).

Defendant West Services Inc.'s Objections to Plaintiff Timebase's First Set of Requests for Production of Documents (Nos. 1–40) dated Apr. 7, 2008 for *Timebase Pty Ltd.* v. *The Thomson Corp.*, Case No. 07 CV 4551 (D. Minn.).

The Thompson Corporation's Objections and Answers to Timebase's First Set of Interrogatories (Nos. 1–5) dated Apr. 28, 2008 for *Timebase Pty Ltd.* v. *The Thomson Corp.*, Case No. 07 CV 4551 (D. Minn.).

West Publishing Corporation's Objections and Answers to Timebase's First Set of Interrogatories (Nos. 1–5) dated Apr. 28, 2008 for *Timebase Pty Ltd.* v. *The Thomson Corp.*, Case No. 07 CV 4551 (D. Minn.).

West Services Inc.'s Objections and Answers to Timebase's First Set of Interrogatories (Nos. 1–5) dated Apr. 28, 2008 for *Timebase Pty Ltd.* v. *The Thomson Corp.*, Case No. 07 CV 4551 (D. Minn.).

Letter from Faegre and Benson enclosing Verification Pages dated May 5, 2008 for *Timebase Pty Ltd.* v. *The Thomson Corp.*, Case No. 07 CV 4551 (D. Minn.).

Letter from David J. F. Gross dated Apr. 1, 2008 for *Timebase Pty Ltd.* v. *The Thomson Corp.*, Case No. 07 CV 4551 (D. Minn.).

Letter from Niro, Scavone, Haller & Niro dated Apr. 17, 2008 for *Timebase Pty Ltd.* v. *The Thomson Corp.*, Case No. 07 CV 4551 (D. Minn.).

Defendants' Memorandum in Support of Motion to Consolidate with Case No. 07–CV–1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).

Timebase's Response to Thompson's Motion to Stay and Consolidate dated Jan. 17, 2008 for *Timebase Pty Ltd.* v. *The Thomson Corp.*, Case No. 07 CV 4551 (D. Minn.).

Order (filed Feb. 12, 2008) dated Feb. 7, 2008 for *Timebase Pty Ltd.* v. *The Thomson Corp.*, Case No. 07 CV 4551 (D. Minn.).

Defendant's Appeal of and Objections to Orders Denying a Stay of the '228 Case (No. 07–4551) and Lifting the Stay of the '592 Case (No. 07–1687) dated Feb. 26, 2008 for *Timebase Pty Ltd.* . v *The Thomson Corp.*, Case No. 07 CV 4551 (D. Minn.).

Defendant's Memorandum in Support of Appeal of and Objections to Orders Denying a Stay of the '228 Case (No. 07–4551) and Lifting the Stay of the '592 Case (No. 07–1687) dated Feb. 26, 2008 for *Timebase Pty Ltd.* v. *The Thomson Corp.*, Case No. 07 CV 4551 (D. Minn.).

Order (Exhibit 1) dated Feb. 7, 2008 for *Timebase Pty Ltd.* v. *The Thomson Corp.*, Case No. 07 CV 4551 (D. Minn.).

Order (Exhibit 2) dated Feb. 7, 2008 for *Timebase Pty Ltd.* v. *The Thomson Corp.*, Case No. 07 CV 4551 (D. Minn.).

Timebase's Response to Defendant's Memorandum in Support of Appeal of and Objections to Orders Denying a Stay of the '228 Case (No. 07–4551) and Lifting the Stay of the '592 Case (No. 07–1687) dated Mar. 11, 2008 for *Timebase Pty Ltd.* v. *The Thomson Corp.*, Case No. 07 CV 4551 (D. Minn.).

Order dated Apr. 18, 2008 for *Timebase Pty Ltd.* v. *The Thomson Corp.*, Case No. 07 CV 4551 (D. Minn.).

Defendant's Memorandum Addressing Issues Related to the Reconsideration of the Orders Denying a Stay of the '228 Case (No. 07–4551) and Lifting the Stay of the '592 Case (No. 07–1687) dated Apr. 25, 2008 for *Timebase Pty Ltd.* v. *The Thomson Corp.*, Case No. 07 CV 4551 (D. Minn.).

Order dated May 6, 2008 for *Timebase Pty Ltd.* v. *The Thomson Corp.*, Case No. 07 CV 4551 (D. Minn.).

Complaint dated Nov. 7, 2007 for *Timebase Pty Ltd.* v. *The Thomson Corp.*, Case No. 07 CV 4551 (D. Minn.).

Defendant's Answer to Plaintiff's Complaint dated Nov. 29, 2007 for *Timebase Pty Ltd.* v. *The Thomson Corp.*, Case No. 07 CV 4551 (D. Minn.).

Order of Direction to the Clerk of the Court for Reassignment of Related Case dated Nov. 28, 2007 for *Timebase Pty Ltd.* v. *The Thomson Corp.*, Case No. 07 CV 4551 (D. Minn.).

Defendant's Motion to Consolidate with Case No. 07–CV–1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).

Defendant's Memorandum in Support of Motion to Consolidate with Case No. 07–CV–1687 and Stay Pending Reexamination of U.S. Patent No. 6,233,592 dated Jan. 10, 2008 for *Timebase Pty Ltd.* v. *The Thomson Corp.*, Case No. 07 CV 4551 (D. Minn.).

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–58 is confirmed.

New claims 59–61 are added and determined to be patentable.

*59. A computer-implemented system for publishing an electronic publication using text-based data, comprising:*
  *a plurality of predefined portions of text-based data with each predefined portion being stored;*
  *at least one predefined portion being modified and stored so that the at least one predefined portion and a corresponding modified predefined portion are both stored;*
  *a plurality of linking means of a markup language, each predefined portion of said text-based data and said at least one modified predefined portion of text-based data being encoded with at least one linking means; and*
  *a plurality of attributes, each attribute being a point on an axis of an multidimensional space for organizing and retrieving said plurality of predefined portions and said at least one modified predefined portion of said text-based data;*
  *wherein said plurality of predefined portions and said at least one modified predefined portion can be directly retrieved using said plurality of attributes to define the point in said multidimensional space that corresponds to one of said plurality of predefined portions or said at least one modified predefined portion.*

*60. A computer readable recording medium for publishing an electronic publication using text-based data, comprising:*
  *a plurality of predefined portions of text-based data with each predefined portion being stored;*
  *at least one predefined portion being modified and stored so that the at least one predefined portion and a corresponding modified predefined portion are both stored;*
  *a plurality of linking means of a markup language, each predefined portion of said text-based data and said at least one modified predefined portion of text-based data being encoded with at least one linking means;*
  *a plurality of attributes, each attribute being a point on an axis of a multidimensional space for organizing and retrieving said plurality of predefined portions and said at least one modified predefined portion of said text-based data;*
  *wherein said plurality of predefined portions and said at least one modified predefined portion can be directly retrieved using said plurality of attributes to define the point in said multidimensional space that corresponds to one of said plurality of predefined portions or said at least one modified predefined portion.*

*61. A computer-implemented method for publishing an electronic publication using text-based data, comprising the steps of:*
  *providing a plurality of predefined portions of text-based data with each predefined portion being stored;*
  *encoding each predefined portion of said text-based data with at least one linking means of a markup language;*
  *providing at least one predefined portion that is modified and stored so that the at least one predefined portion and a corresponding modified predefined portion are both stored; and*
  *providing a plurality of attributes, each attribute being a point on an axis of a multidimensional space for organizing and retrieving said plurality of predefined portions and said at least one modified predefined portion of said text-based data;*
  *wherein said plurality of predefined portions and said at least one modified predefined portion can be directly retrieved using said plurality of attributes to define the point in said multidimensional space that corresponds to one of said plurality of predefined portions or said at least one modified predefined portion.*

\* \* \* \* \*